US005519590A

United States Patent [19]

Crookham et al.

[11] Patent Number: 5,519,590

[45] Date of Patent: May 21, 1996

[54] MEANS AND METHOD FOR HIGHLY CONTROLLABLE LIGHTING

[75] Inventors: Joe P. Crookham; Myron K. Gordin, both of Oskaloosa, Iowa

[73] Assignee: Musco Corporation, Oskaloosa, Iowa

[21] Appl. No.: 242,745

[22] Filed: May 13, 1994

Related U.S. Application Data

[63] Continuation-in-part of Ser. No. 855,606, Mar. 20, 1992, Pat. No. 5,337,221, which is a continuation-in-part of Ser. No. 820,486, Jan. 14, 1992, Pat. No. 5,402,327, and a continuation-in-part of Ser. No. 4,693, Jan. 14, 1993, Pat. No. 5,343,374, which is a division of Ser. No. 820,486, Jan. 14, 1992, Pat. No. 5,402,327.

[51] Int. Cl.$^{6}$ ........................................ B64F 1/20

[52] U.S. Cl. ........................ 362/62; 362/139; 362/277; 362/298

[58] Field of Search ........................ 362/62, 138, 139, 362/66, 67, 298, 277

[56] References Cited

U.S. PATENT DOCUMENTS

| | | | |
|---|---|---|---|
| 860,451 | 7/1907 | Donnelly | 362/296 |
| 1,535,985 | 8/1920 | Clark | 362/341 |
| 1,814,326 | 7/1931 | Melton | 362/243 |
| 2,228,329 | 1/1941 | Reynolds | 362/284 |
| 2,280,640 | 11/1938 | Shockey | 240/103 |
| 2,390,109 | 12/1945 | Liebmann | 362/247 X |
| 2,520,445 | 5/1948 | Sponsler | 177/329 |
| 2,821,393 | 2/1954 | Hoppe | 272/10 |
| 3,065,336 | 10/1959 | Stevens | 240/9 |
| 3,586,851 | 6/1971 | Rudolph | 362/301 |
| 4,233,652 | 11/1980 | Oswald | 362/63 |
| 4,272,799 | 6/1981 | Downing | 362/145 |
| 4,344,120 | 8/1982 | Bradley et al. | 362/349 |
| 4,367,514 | 1/1983 | Large | 362/62 |
| 4,408,266 | 10/1983 | Sclippa | 362/297 |
| 4,436,372 | 3/1984 | Schmidt et al. | 350/293 |
| 4,447,862 | 5/1984 | Shanks | 362/267 |
| 4,460,946 | 7/1984 | Tinz | 362/319 |
| 4,663,698 | 5/1987 | Tomlinson | 362/284 X |
| 4,712,167 | 12/1987 | Gordin et al. | 362/67 X |
| 4,809,147 | 2/1989 | Negishi | 362/347 |
| 4,890,208 | 12/1989 | Izenour | 362/301 |
| 5,067,062 | 11/1991 | Rulke | 362/364 |
| 5,117,343 | 5/1992 | Kerscher et al. | 362/297 |
| 5,122,798 | 6/1992 | Kaolian | 362/62 X |
| 5,134,550 | 7/1992 | Young | 362/298 |

FOREIGN PATENT DOCUMENTS

| | | |
|---|---|---|
| 1399448 | 4/1965 | France . |
| 562370 | 4/1931 | Germany . |
| 03536583 | 4/1986 | Germany . |
| 3447136 | 6/1986 | Germany . |
| 3446917 | 7/1986 | Germany . |
| 3534285 | 2/1987 | Germany . |
| 3711568 | 10/1988 | Germany . |
| 3820926 | 12/1989 | Germany . |
| 459308 | 9/1950 | Italy . |
| 373814 | 1/1964 | Switzerland . |
| 193515 | 2/1923 | United Kingdom . |
| 536563 | 5/1941 | United Kingdom . |
| 862073 | 3/1961 | United Kingdom . |
| 2048166 | 12/1980 | United Kingdom . |

*Primary Examiner*—Stephen F. Husar
*Attorney, Agent, or Firm*—Zarley, McKee, Thomte, Voorhees & Sease

[57] ABSTRACT

A highly controllable way to light target areas includes a primary reflector which generates a defined primary beam in association with a light source. The primary beam, or at least a portion of the primary beam, is directed onto a target reflector which generates a secondary beam to the target space. The secondary reflector can be configured in any number of contours, shapes, secularities, or other characteristics to alter and control the characteristics of the secondary beam. Other options, enhancements, alternatives, and features are possibly utilized with the principles of the present invention or by a primary light source is reflected off a secondary reflector means. This invention supplies a way to light the underside of an airplane while, for example, a wing is being painted. A light source is place a substantial distance away from the wing of the airplane to be painted. The light source includes a primary reflector to direct the light. A secondary reflector is placed at such a location that light emitting from the light source would be reflected to the underside of the airplane wing.

20 Claims, 28 Drawing Sheets

MEANS AND METHOD FOR HIGHLY CONTROLLABLE LIGHTING

CROSS REFERENCE TO RELATED APPLICATIONS

This is a continuation-in-part of co-owned and Ser. No. 07/855,606, filed Mar. 20, 1992, now U.S. Pat. No. 5,337,221; which is a continuation-in-part of commonly owned and U.S. Ser. No. 07/820,486, filed Jan. 14, 1992, now U.S. Pat. No. 5,402,327; and a continuation-in-part application from co-owned and U.S. Ser. No. 08/004,693, filed Jan. 14, 1993, now U.S. Pat. No. 5,343,374; which was a divisional of U.S. Ser. No. 07/820,486, filed Jan. 14, 1992, now U.S. Pat. No. 5,402,327.

BACKGROUND OF THE INVENTION

A. Field of the Invention

This invention also pertains to lighting systems and in particular, allows the user to illuminate the underside of an airplane, for example the fuselage and wings, while it is being painted or attended to by workers. Additionally, it allows the underside of a large aircraft to be visible while being painted without the placing of electrical devices on the underside of the wing, and allowing electrical devices to be located outside the area adjacent to the wing in which explosive danger exists.

The present invention relates to lighting systems, and in particular, to concentrated light sources and reflectors.

A wide variety of lighting applications could benefit from precise control of light.

Following are several additional examples of situations where precise control of light would be advantageous.

B. Problems in the Art

Over the years a wide variety of different types of lighting fixtures have been developed for a variety of different lighting purposes. In the case of lighting relatively large areas, it is conventional to utilize concentrated lamps and to surround them with a reflective material to gather and direct light energy from the lamp in a desired direction. One or more of these combined light sources is then directly aimed towards the area to be lighted.

Light energy spreads over distance. The illumination of a remote area therefore varies inversely as the square of the distance from the light source. Additionally, light fixtures directing light to a relatively large target area are usually many times smaller than the area to be lighted. The beam of light energy produced by each fixture most times must therefore cover a substantial area.

These characteristics present certain lighting problems. First of all, to maintain a given light level at a distant target area, the light source must produce a much higher level of light energy at the source. This can contribute to glare problems for those viewing the fixtures. Secondly, the use of diverging or converging beams generally results in a significant amount of light falling outside the target area. This results in spill and glare light. Spill and glare light are inefficient use of the light and are frequently objectionable. Spill light is the illumination of non-targeted areas. Glare light is the relatively bright luminance viewed when looking towards the light source.

An example of these problems can be illustrated by referring to conventional sports field lighting. Sports fields such as football fields, softball fields, baseball fields, or the like, constitute large areas. Not only must the two dimensional area of the field be lighted to a sufficient level for playability, a third dimension, the substantial volume of space above the field, must also have a minimum amount of light for playability. One solution would be to basically place vertical walls of individual fixtures on opposite sides of the field so that light would fill up the space between the walls to create the necessary light values throughout the three dimensional volume. This, of course, is impractical and virtually impossible. Therefore, a conventional solution has been to place several large poles in spaced apart positions around the field. Clusters of a number of light fixtures are placed at the top of the pole. Fixtures are aimed in various directions to try to fill up the volume to be lighted, and fill it up in a way to maintain a suitable light intensity through the volume.

To accomplish this very high intensity lamps and very efficient reflectors are required. As discussed previously, this presents glare and spill problems as the lights, of necessity, are generally angled down towards the field, players, spectators, and surrounding areas. The light emitted from the face of conventional reflector systems for high intensity lamps forms generally an output of a constantly expanding hemisphere, generally of greater intensity at more central locations of the hemisphere and of decreasing intensity at outer edges. This output is of such a shape and size, however, that it can not be precisely limited at the edges of the volume defining the playing area, and therefore light spills outside the volume. In other words, light emanating from an elevated light fixture on a pole at a remote distance from the playing space generally will have higher light values at the center of the expanding hemisphere of light radiating from it. Thus, to create approximately the same light values at the edge of the playing space as in the center, requires the light energy from a number of the fixtures to be aimed so that the high intensity center portion of the radiating hemisphere is directed towards distance points of the space. Of necessity, this means that even if the more intense areas of the light energy are maintained in the target space, at least portions of some of the less intense areas away from the center of the radiating hemispheres will fall outside the playing space creating glare and spill light problems.

Another example is automobile racetracks. For cars traveling at very high speeds at night, a high level of light is needed at and immediately above the track for safety considerations as well as for viewing considerations. In today's world, also, the ability for television to produce a high quality picture at night for such events is also a prime consideration. Although only the track needs to be provided with this high level of light, economic considerations and conventional technology generally results in a lighting solution similar to that used for athletic fields. Individual lighting fixtures are clustered on as few light poles as possible, spaced around the track either on the infield side or outside the perimeter of the track or both. The fixtures are angled downwardly in different directions to try to direct enough light to the track to meet lighting requirements all the way along the track, some being a mile or more in length. Such lights, especially when installed on the infield side, cause glare to spectators positioned around the outside of the track, or conversely lights outside the track can cause glare for spectators in the infield or outside the opposite side of the track. Still further, spill light outside the track itself is substantial. Additionally, poles around the infield side of the track constitute visual obstructions to spectators and television cameras.

Many times lights are installed on the inside of a race track to better illuminate the track (many times banked inwardly), assist spectators' view, or illuminate the cars in the same direction as television cameras are viewing the cars. These lights are essentially aimed in the wrong direction at shallow angles with respect to the spectators, causing glare for the spectators outside or on the opposite side of the track from the infield.

Additionally, conventional grouping of lights on top of light poles causes large shadows. If lights for lighting the track could be spaced closely together it would eliminate or substantially diminish any shadows. Additionally, closely spaced lights could fill in lights between race cars as they are running on the track. This could be beneficial for spectators to more clearly see and differentiate between the cars, as well as help drivers as they draft other cars. Drafting involves driving directly behind a car, only inches away, even though traveling at great speeds. Such lighting would therefore be very beneficial. Such closely spaced lighting is simply not economically feasible when using lights elevated on poles.

The control of high intensity light sources by elevating them in clusters on poles or other structures, to allow the aiming and alignment of the fixture to reduce spill or glare is costly because structures become substantially more expensive as they become taller. Higher mounting heights on structures of lighting fixtures also creates additional maintenance problems and objectionable visual problems as the lights become visible from greater distances.

These are the types of problems (by no means inclusive) involved in this type of lighting. Again, the problems are primarily caused by the lack of ability to control light and glare because of the factors involved in lighting wide areas and volumes of space.

Problems also exist because of the inherent nature of conventional lighting fixtures. There is only so much light that can be generated from a single light source. Without a primary reflector such light is difficult to control at all. Even with a primary reflector, the inherent nature of light results in diminishment of intensity over distance and spreading of light with distance. There is only so much light that can be generated and applied to an area or a volume of space from one fixture at any given location. This also applies to utilizing plurality of individual lighting fixtures, especially when they are clustered on the top of poles. Also, the control of light from conventional fixtures can be difficult, including control of problems such as glare and spill light.

1. Highway Lighting

For example difficulty in controlling street and highway lighting results in wide-scale lighting of areas, which creates spill light outside of the roadway. This makes the actual roadway less distinct from surrounding areas. Additionally, lack of control also translates, in many applications, into the utilization of more light poles and lighting fixtures, which is expensive and consumes substantial resources.

Also, most existing light systems have the following problems. They broadcast or spread light over as much of the highway or roadway as possible. However, by doing so, some light is most times projected toward the driver rather than away from the driver in the driver's viewing direction for each lane of the highway. This can contribute to glare or vision problems for drivers on the roadway. Also, economy and efficiency are both considerations for roadway lighting. Cost for light poles and their erection can be a considerable and even primary expense. Therefore, it is generally most economical to use as few poles as possible. The shorter the pole, the less the ability to spread light. The higher the pole, light can be spread but it also disperses more readily. An ongoing struggle exists, therefore, between minimizing the number of poles but maximizing the efficient use of light; and providing enough light for safety purposes. The height-to-spacing ratio for poles is a critical consideration. The higher up the lights are placed, the farther they can be placed apart. Shorter poles would be advantageous, however, because they would be cheaper, easier to erect, but with conventional lights would require more fixtures with more potential for glare and their spacing would have to be closer.

Conventional lights for streets and highways cannot be controlled sufficiently to, for example, cut it off at the center line so that light from one fixture is going with the traffic in one lane but does not present glare problems or does not spill over significantly into the oncoming lane.

Additionally, present lighting systems tend to project light or at least a portion of their light down onto the pavement. In many situations this causes substantially intense light to bounce off the pavement also creating glare problems. A significant safety issue with street and highway lighting is therefore to minimize the amount of light going directly into a driver's eyes or bouncing or otherwise glaring into driver's eyes.

2. Sign and Building Lighting

Another example is in the stationary lighting of objects such as signs and buildings. It is difficult to control light effectively so that the light is predominantly applied to the target; and to control light so that a desired lighting effect is achieved. For example, for a large or tall object, it is difficult to light the entire object at a relatively uniform level with a minimum number of fixtures. This is directly related to the fact that intensity of light diminishes over distance.

A specific example would be a tall building. Because light from traditional fixtures spreads and disperses over distance, generally the most intense center proportion of the light beam is aimed toward the top of the building. Substantial spill light then exists. That same light fixture, if aimed at a point much farther down the building, would appear much brighter because more light intensity would exist because of the shorter distance between fixture and the building. Uniformity of lighting is therefore difficult to achieve.

To light a significantly tall building requires a very narrow controlled beam, if one attempts to light the building only and not have a significant amount of spill or stray light that falls on either side of the building. Also, because it is not economically possible to elevate lights all along the height of the building, problems exist with getting sufficient intensity of light from a fixture placed near the ground up to the top of the building.

3. Up Lighting

Another aspect of lighting which presents difficulties involves sports field lighting. Conventional methods of lighting elevate lighting fixtures (usually on poles) around the perimeter of the field. The fixtures are aimed downwardly and planned so that cumulatively the field and area just above the field is lighted to, as uniform a level as possible. One problem exists, however, in that certain sports (such as baseball, football, tennis) require light not only at or directly above the field or playing surface, but the balls and therefore playability requires lighting substantially above the field. This allows both players and spectators to adequately see the ball and maintain a uniform light level throughout the volume above the field so there are not drastic light level differences which could cause difficulty in viewing the ball in flight.

4. Double-mirror Lighting

Another problem with conventional lighting fixtures involves the adaptability and flexibility of aiming or orienting the light energy itself to a given location. Because light does not bend in free space, once issued from the lighting fixture, it is difficult or impossible to further control it.

5. Inside/Outside Lighting

Another problem encountered in some situations is the difficulty in providing lighting which provides sufficient lighting levels and which does not produce difficult shadows. Still further, it is difficult to achieve large area lighting levels which are satisfactory for television coverage.

6. Construction Tower Lighting

Many times construction sites could advantageously utilize lighting to either allow continued construction when sunlight alone is not adequate, or to provide security for the construction site. Such lighting can either be portable or semi-permanent. If utilized in towers (either semi-permanent or portable) it reduces the ability to vandalize the lighting, and allows for more coverage by elevating the lights to a greater height. In such situations, however, more precise control of light could be advantageous not only from the standpoint of efficient lighting of an area but also reduction of glare or spill light which could present a safety problem.

7. Special Effects Lighting

Precise control of light is also very advantageous in situations relating to arenas, theaters, or similar spectator events. For example, precise lighting of portions of a theater stage or an area involved with a spectator event, is difficult to achieve with the present lighting systems. As previously discussed, lighting from present systems that is needed to light an area to a sufficient substantial intensity where the light fixtures are a substantial distance away many times results in using high intensity lights to get enough intensity to the area but results in spill light out of the area to be lighted and glare to the participants and/or spectators. Still further, it would be advantageous to have highly controllable light that could also be turned fully or partially on or off or repositioned or rotated for special effects.

8. Adjustable Lighting

With respect to any of the above discussed potential uses for highly controllable lighting, another deficiency in the prior art is the ability to easily and flexibly adjust or modify the light issuing from the fixture. Some of the prior art utilizes focusing or beam width adjustment mechanisms, however, similar problems exist as discussed above because a relatively conventional fixture is utilized which still results in glare, spill, and otherwise in a light pattern which is not highly controllable over substantial distances. It would be advantageous to be able with a fixture which initially allows high control of light to be substantially easily adjusted as to its light pattern, for example, the vertical height and width of the light pattern from the total fixture or even parts of the fixture.

Therefore, there is a real need in the art for a system which can improve upon the deficiencies of conventional large area lighting or solve some of the problems involved in large area lighting.

It is therefore a principle object of the present invention to improve upon at least some of the deficiencies in conventional lighting systems and solve some of the problems involved with the same.

Another object of the present invention is to provide a means and method for highly controllable lighting which provides flexible and precise control of light to a target area or three-dimensional space.

Another object of the present invention is to provide a means and method as above described which allows light energy to be used much more efficiently and effectively.

Another object of the present invention is to provide a means and method as above described which can allow increased light energy from a light source to be directed to a given space or area over that which is generally possible with a conventional single fixture. The invention also allows spreading of the light energy of a light source, or other manipulation and reconfiguration of the light energy.

A still further object of the present invention is to provide a means and method as above described which allows a wide variety of flexibility and options with regard to controlling light.

Another object of the present invention is to provide a means and method as above described which is generally as economical or more economical than conventional systems.

Another object of the present invention is to provide a means and method as above described which can produce very beneficial results regarding glare control and spill light control.

A still further object of the present invention is to provide a means and method as above described which can allow for significantly different placement of light sources than conventional systems with resulting benefits to lighting to the target space or area, spectators, television coverage, or persons outside the target area.

Another object of the present invention is to provide a means and method as above described which provides improved and beneficial lighting for visual tasks for participants and events within a lighted target area, for example car drivers or players, as well as beneficial lighting for spectators, video requirements of television, film requirements for still photography, and motion picture film, and which minimizes spill and glare light for persons outside the target who are visually impacted by the lighting.

Another object of the present invention is to provide a means and method as above described which can produce lighting for a large target area which can be controlled as to adequate quantity, level, uniformity and smoothness across the entire area or volume, and predictably controls shadows or varying intensity areas for modeling effect, such as might be desired.

These and other objects, features, and advantages of the present invention will become more apparent with reference to the accompanying specification and claims.

Problems also sometimes exist with regard to the flexibility of conventional lighting systems. For example, if one or more fixtures needs to be elevated to any substantial distance, it is difficult to adjust it if placed on a permanently installed pole. If a crane or mechanical arm is used, it involves substantial expense regarding such equipment.

Another lack of flexibility is the fact that each fixture has a certain output of light. It can be directed to a certain location. The fixture can be modified to alter the beam pattern. Individual fixtures can also be combined to produce a composite beam. However, control of the composite beam for multiple fixtures is primarily a function of the structure and make up of each individual fixture. Therefore, glare control and cutoff solutions require equipment structured to be built into each individual lighting fixture. This can contribute to significant cost and maintenance.

Still further, conventional lighting systems with one or more lighting fixtures are somewhat difficult to transport. For example, some portable lighting for construction sites or highway repair utilize arrays of lighting fixtures on an extendable arm. The generator powers the lighting fixtures. The use and environment for this type of arrangement presents high risk that the fixtures will be damaged. It is also cumbersome to position and erect such lights. Still further, it is difficult to produce lighting which does not generate glare and spill light problems.

It is therefore another object of the present invention to provide a means and method which allows substantial flexibility in generation of different lighting outputs in an economical and efficient manner.

Another object of the present invention is to provide a means and method which is flexible in the sense that it lends itself to easy portability while being durable and allowing high level control of light output with regard to glare and spill light.

9. Airplane Lighting

This invention specifically addresses problems which have plagued the aircraft industry for a number of years. After an airplane is constructed, the wings are painted and repainted by workmen on scaffolding. Normally such things as large jet aircraft and the like are taken into a hanger which is set up for such painting. There is a need to paint these large air vehicles efficiently and effectively.

While painting the wings, the scaffolding is placed underneath the wing, thereby elevating the workmen above the floor to an appropriate height, approximately seven feet below the wing. The wing can be as high as thirty feet off the ground or higher. This scaffolding must be custom designed to follow the wing and to avoid such things as the engines hanging up to seven feet or more down from the wings and to adjust for the slope of the wing while the plane is at rest. Also, due to the different shapes, designs, and lengths of the wings, the workmen must continually adjust and redesign the configuration of the scaffolding from plane type to plane type. Additionally, while the underwing of a plane is being painted, paper or other masking material usually must be draped over portions of the wing to block paint from traveling to undesired (such as leading and trailing edges) or already painted locations. The paper must be dropped distances varying from a few inches to a few feet down from the edge of the wing to prevent undesirable paint travel. The combination of the scaffolding and the masking material draped over the wing block off most light reaching the underside of the wing from currently used lighting sources. This makes it difficult for the area underneath the wings to be adequately lighted so that the painters can effectively paint those areas of the plane.

This problem is complicated by the fact that the painting process has the potential of explosion. The installation of any electrical devices near the wing significantly increase the danger of igniting airborne paint particles. Therefore, conventional lights and other electrical devices usually must be placed at a safe distance from the airplane wing. Electrical devices such as lights and electrically powered scaffolding should be placed approximately twenty-five feet or more away from the surface to be painted to avoid any potential explosion. In any event, placement of lights or other equipment directly underneath the wings presents the problem of moving and positioning such equipment.

There are lights which purportedly are configured to be safe and essentially explosion proof. Such lights, however, are very expensive and use of such lights would not eliminate explosion problems related to electrical cords or heat. Still further, placing lights underneath the wings on the scaffolding again presents a problem of placing and maneuvering such lights in such relatively closed and difficult quarters.

Other needs and problems with regard to lighting around airplanes have been identified. For example, when a plane is in a hanger for servicing, again it is difficult to adequately light its underside without special lighting and special positioning of such lighting. Still further, when such plans are on the tarmac, for example for loading and unloading and fueling, it is difficult to adequately light their under side. The size of the planes and safety considerations dictate that any lighting of the tarmac be substantial distances away. To eliminate glare up into the pilot's eyes or to the workers, such lighting is also usually positioned quite high, making it further difficult to direct adequate lighting to the under side of the plane. Lighting is a safety concern for the various workers and vehicles that must maneuver by and under their planes.

Another concern for airport tarmac lighting is to try to eliminate any glare into the pilot's eyes whether landing, maneuvering on the runway or taxi ways, or maneuvering up to a hanger or airport terminal. Similar concerns exist for workers. Substantial intensity needed to light substantial spaces can cause different types of glare which raises safety concerns.

There is a need in the art for a device which would be able to illuminate the underside of a wing or fuselage while the light fixture is placed at a significant distance from the plane. It is also desirable that this light be as uniform as possible while, at the same time, preventing undue glare and spill from effecting the vision of pilots or workmen underneath the wing. There is furthermore a need for an economical solution to such lighting problems, and want and a solution which is flexible and adaptable for a variety of situations. Still further need is a lighting solution which is easily maneuverable and adjustable while at the same time being durable and capable of easy and economical maintenance.

It is therefore a principle object of the present invention to provide a means and method for lighting the underside of a plane while placing the light source at a significant distance from the plane.

It is a further object of this invention to provide a means and method to light the underside of a plane that casts light in a uniform smooth pattern. It is a further object of this invention to provide a means and method for lighting the underside of an airplane, which precisely controls light while preventing unnecessary glare or spill light.

As a further object of this invention to provide such a method or means that can be portable and compact, allowing use at various locations.

Another objective of the present invention is a provision of means and method for lighting the underside of an airplane which is economical to manufacture, durable, safe, and efficient in use.

A still further objective of the present invention is to provide a means and method which controls and directs light to the places where needed, while minimizing directing light where it is not needed or where it would or could present glare problems.

Another object of the present invention is to provide a means and method to light difficult to light areas.

Another object of the present invention is to provide a means and method which is flexible as to type of light pattern, control of light pattern, placement of components used to create the light pattern, and as to the type of use.

Another object of the present invention is to provide a means and method which is economical in its configurations, utilization of energy, and ease of maintenance, while at the same time providing significantly high levels of lighting in an efficient manner.

These and other features, objects, and advantages of the invention will become apparent to those skilled in the art with reference to the accompanying specification.

SUMMARY OF THE INVENTION

The present invention includes both means and methods for highly controllable lighting such that desired areas or objects may be illuminated and nearby areas and objects are not. Also, the source of the luminance is not a visible glare source from non-target locations. One application of this lighting is for large area or large space lighting. Examples are athletic fields, arenas, race tracks, street, roadway, or highway lighting, parking lot lighting, exterior building lighting, other lighting of defined areas or space, and the like. The applicability of the invention is not limited, however, to this extent.

The method of the invention includes generating a primary light beam from a light source and a primary reflector. The term "light beam" or "beam" will be used in this application to define the light energy emanating from a lamp and reflector combination or the light energy being reflected from a reflector. Therefore, these terms are not being used scientifically, but rather simply to allow better visualization and description of different portions of light energy used with the invention.

The primary beam is of a defined nature such as direction, shape, and intensity. As previously discussed, the term "primary beam" will refer to the controlled light energy emanating from a primary reflector associated with a light source or lamp. The primary reflector has a predetermined size and shape. The primary beam is directed to a secondary reflector spaced a predefined distance from the first primary reflector.

The secondary reflector also has a shape, contour, and size of a predetermined nature to generate a secondary beam of a desired nature. Again, the term "secondary beam" refers to the light energy reflected from the secondary reflector.

The secondary beam is used to provide light to at least a portion of the target area. Alteration of the shape, size, orientation, and distance of the secondary reflector with respect to the primary beam and primary reflector allows a high degree of control of the resulting secondary beam in terms of beam shape, direction, and intensity. It also allows a high degree of control as to the cutoff of light which directly relates to spill and glare light problems in the prior art. It also allows selective utilization of the primary beam in a way that is most advantageous for a given situation and in ways that would not have been possible with just the primary beam. It allows for the opportunity in many circumstances to apply more of the primary beam light energy to the target area from the secondary reflector than could have been applied directly by the primary beam, which results in more efficient use of the light energy.

The invention allows a specifically selected portion of the primary beam to be intercepted by the secondary reflector, which secondary reflector can be of various shapes and sizes. The secondary reflector is located apart from the primary light source and reflector at various defined and adjustable distances. The secondary reflector has a shape, contour, size, and location relative to the primary beam and the target area of a calculated and predetermined nature to generate the secondary beam of a desired nature.

The means of the invention includes utilization of a light source and primary reflector at a first location. The secondary reflector is positioned at second location and is of a predefined size, shape, and orientation.

The secondary reflector can be designed of a size and spacing to utilize precisely those portions of the primary beam which are desired and to allow those portions of the primary beam which would otherwise have been spill or glare light to be absorbed or continue on in a manner which is not objectionable to the various potential viewers such as participants, spectators, or off-sight persons who do not desire to be impacted by the lighting. This selective utilization of the primary beam is also beneficial for consideration of television, video, and film requirements. Light from the primary source strikes the secondary reflector in nearly a relatively unidirectional pattern so that it is highly controllable as compared to light directly from a conventional lamp, which radiates in a nearly universal spherical pattern, and therefore can only be controlled in a much more limited degree by a primary reflector.

Additional aspects of the invention include the ability to place the primary and secondary reflectors in a variety of positions. They may be placed on the ground, at a small elevational height, or at a large height. Still further, both the primary and secondary reflectors, as well as the light source, can take on different configurations. Still further, the central axis of the primary and secondary beams can be aligned opposite each other or at varying angles relative to each other. Still further, individual primary and secondary reflectors can be used in combination with other primary and secondary reflector combinations to provide composite lighting of a beneficial and highly controlled nature.

Additionally, the primary reflector and light source can be selected to have certain characteristics of light intensity, beam shape, and orientation. Still further, selective portions of the primary source of the light source can be blocked, absorbed, or otherwise configured to choice. The specularity of the surfaces of the primary and secondary reflectors can also be varied.

The present invention therefore involves utilization of a light source such as a lamp, and a primary reflector associated with the light source, to create a primary light beam of a certain shape and intensity, and a secondary reflector which redirects at least a portion of the primary beam to a target area. The secondary reflector is selected to be of a certain size, shape, and configuration relative to the primary reflector and light source to produce a secondary beam of a precisely known nature. This combination allows generation of a secondary beam which can have a variety of different predictable characteristics such as precise cutoffs in one or more directions, a desired shape, a desired intensity pattern, a desired direction, or a desired coverage. The ability to control light in this manner also allows advantages of glare and spill control. It also allows gains in efficiency.

The present invention can be applied to many different situations and uses and can take on many different forms of configurations.

Other configurations and alternatives for the invention are possible. For example, multiple fixtures can utilize one secondary reflector. The secondary reflector can be shaped so that it has a plurality of flat surfaces facing in different directions.

The invention also lends itself to such uses as portable lighting similar to that which is now used for construction site lighting or highway repair lighting.

1. Highway Lighting

Another aspect of the invention involves utilization of primary light sources and secondary reflectors to effectively light streets and highways. The primary and secondary components can be elevated on light poles along the street or roadway. The configuration of the combination can be such that light can be precisely controlled to either cover one half of a two-lane roadway, or one side of a divided highway. Alternatively, the combination can light both sides of a two-way roadway or both sides of a divided highway without producing significant glare or spill light for drivers in either direction.

An extension of this application would be lighting of roadways. The precise control of light without glare and spill light can effectively light the pathways for drivers without projecting light on areas adjacent to the roadway. This would allow the level of lighting and thus the cost of lighting to be reduced because of the ability to create a precisely and relatively uniformity lighted roadway, and on the other hand, leave unlighted and therefore highly contrasting the areas off the roadway.

Such a system would not only allow control of light to keep out of driver's eyes by precise cut off and by issuing light in the direction of travel of the driver, it would also minimize any glare caused by the direct bouncing of light off of the pavement into the driver's eyes. Still further, precise control of light could allow economies in better pole height-to-light fixture spacing ratios. In other words, shorter poles could be used with substantial spacing between poles to save significant dollars in poles themselves and their erection. Still further, such a system having precise control of light could allow for light from the same pole or even the same fixture to light opposite sides of a road in two different directions, both keeping light out of the driver's eyes; or to overlay light to the same location to get increased intensity. Still further, such precise control of lighting could be utilized to direct light to the areas it is needed only for efficiency and economy. For example, presently light in clover leaf exchanges on interstate or multi-lane roads utilize a number of fixtures which basically broadcast light around the whole area of the interchange. By having precise control of light it could be cut off at definite boundaries, only the roadway would need to be lighted which would save use of light energy. Also, because only the roadway would be lighted, the level of light needed for safety purposes could be reduced because drivers would have the dark areas outside the roadway for contrast purposes.

2. Sign and Building Lighting

Another aspect of the invention allows for the effective lighting of large structures such as billboards and buildings. The precise control of lighting would allow minimization of spill light and glare, still further, precise control would allow placement of light for special effects, or in a manner which would allow uniform lighting of a large structure with a minimum of fixtures.

3. Up Lighting

Another aspect of the invention allows for what will be called effective up lighting. As previously discussed, in some applications a significant amount of light is needed in the area above the main lighted area, such as a playing field. The field and the area directly above the field could be lighted by either conventional fixtures or by the fixtures utilizing the primary source and a secondary reflector at the top of poles. Conventional-type fixtures or primary and secondary combination fixtures could also be installed near the bottom of the pole to project light upwardly to fill the volume substantially above the playing field.

4. Double-mirror Lighting

Another aspect of the invention would involve utilizing one or more primary light sources projecting light energy onto a first secondary reflector, and thereafter projecting part or all the light reflected from the first secondary reflector to a second secondary reflector. This would enhance the flexibility and control of light from these types of arrangements. This concept could further be extended by using a third secondary reflector, or even additional secondary reflectors.

5. Inside/Outside Lighting

Another aspect of the invention would allow the compound utilization of primary and secondary combinations to achieve desired lighting effects. For example, in a racetrack application or roadway application, primary/secondary combinations could be positioned on both sides of the road. The control of light from these combinations could then be used to effectively illuminate a racetrack, for example, to eliminate shadows regardless of viewing angle.

6. Construction Lighting

Another aspect of the invention would allow utilization of the primary and secondary combinations advantageously to light construction sites or projects, either on a potable basis or a semi-permanent basis. The precise control of light would help both work at the site as well as efficiency and economy of the lights.

7. Special Effects Lighting

Another aspect of the invention would utilize such things as removable covers over secondary reflectors to allow either all or a portion of the secondary reflectors to allow further control of light by turning on or off light issuing from the combination for special effects. Such a system would allow the turning off of light at the secondary reflector and therefore would allow the primary light source to continue uninterrupted, which many times is a more efficient and reliable method as opposed to turning off and on the primary light source. It also would eliminate any covers or shields at the primary light source which generates a lot of heat and therefore may be undesirable. Another aspect could involve the rotation or osculation of the secondary reflector or a portion of it, to rotate or move light issuing from the fixture while maintaining its precise control.

8. Adjustable Lighting

Another aspect of the invention would allow a secondary reflector or a portion of it to be adjustable in its shape and configuration to in turn allow adjustable yet highly controllable lighting from each fixture or portion thereof. For example, mechanisms may be utilized to manually or by some sort of powered actuator to adjust the shape (for example to convert a flat secondary mirror into a convex or concave shape) to in turn change the beam pattern. A still further aspect of the invention could involve portions of the secondary reflector which are individually adjustable in shape and configuration. By allowing this, each fixture could be adjustable as far as cut off either horizontally or vertical or both.

9. Airplane Lighting

The present invention also relates to means and method of lighting the underside of an airplane. Such lighting is advantageous when, for example, painting or otherwise servicing the airplane. The invention allows workmen to place a light source at a distance away from the plane and reflect the light from that light source up to the underside of the plane, thereby lighting the underside even while the plane or other things, such as when the wing is draped with paper, plastic or other masking material, significantly enclose the working area and block light to it. Scaffolding, for example, set up for the working area enclosed by the masking material also has a tendency of obstructing light to the plane underside. The invention can be used, for example, to divert light between the scaffolding and the underside of an airplane.

The invention includes a light source capable of producing a beam of light that is placed at an adequate distance from the plane. Typically, this light source is a lamp with a primary reflector to direct spherically emerging light in a hemispherical or conical pattern. Other light sources are possible though. At least one secondary reflector means is positioned generally apart from the light source to receive at least a portion of the beam of light from the light source and further control and alter the light energy to direct or reflect that portion of light onto the underside of the plane. The light source can be elevated above the plane, for example, above the leading edge of the airplane wing or located any direction from the wing by adjusting the reflector means so that the position of the reflector means is adequate to receive a portion of the light, the light can be directed to the appropriate location. A plurality or a combination of light sources may be utilized to further enhance visibility of the underside of the airplane. Multiple secondary reflector means, mounted on bases constructed of a relatively lightweight material, are easily positioned on scaffolding or on the ground near or underneath the plane. Reflector inserts can be contained within the secondary reflector means which can include removable reflective surfaces for easy replacement and maintenance. The secondary reflector means can be adjusted to focus the light to a predetermined location and the reflective inserts can be removed for cleaning and/or replacement following the painting operation.

The invention is easy to operate, is economical, and is flexible. It can be used for a wide variety of tasks. Various numbers and types can be used. A plurality of secondary reflector means can be used off of a single light source or visa versa. The secondary reflectors can be conveniently moved by workmen during painting and can be conveniently broken down and transported.

DETAILED DESCRIPTION OF PREFERRED EMBODIMENT

Figure 1:
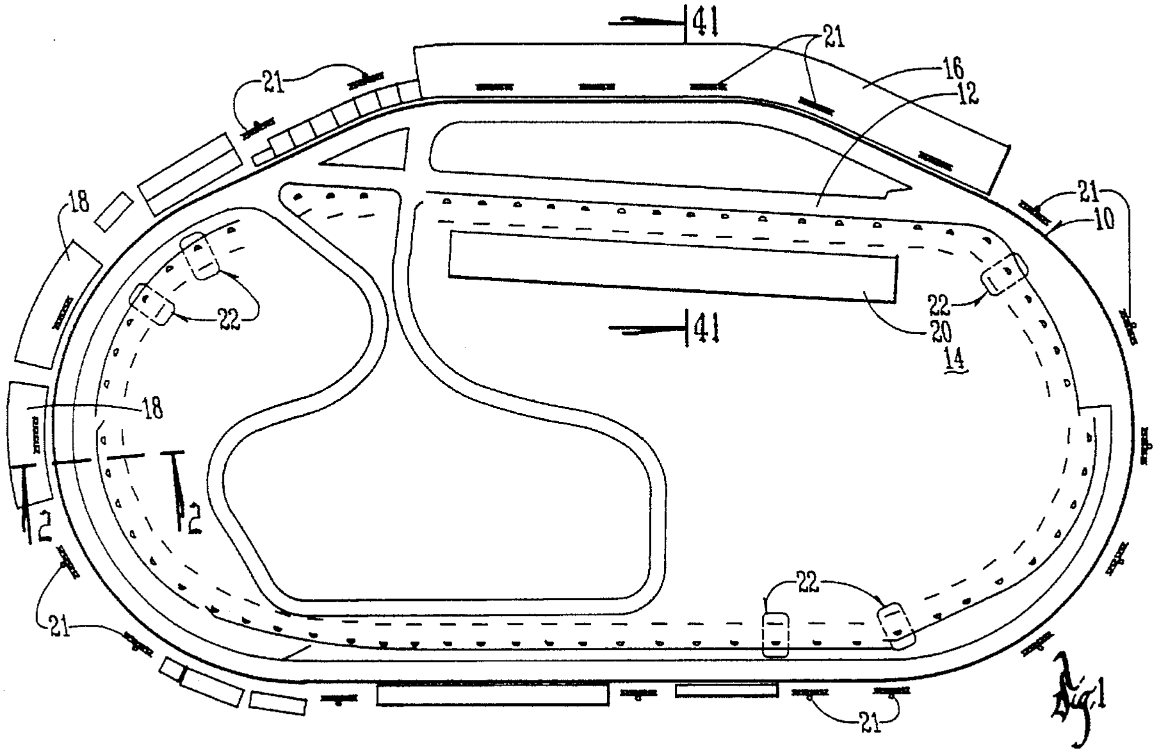
FIG. 1 is top plan diagrammatical view of an automobile race track including lighting system according to the present invention.

To assist in better understanding of the invention a specific example of the invention will now be described in detail. This preferred embodiment is, however, given by way of example only and not by way of specific limitation to the invention.

The drawings will be referred to in this description. Reference numerals, letters, or combinations thereof are utilized to indicate specific parts or locations in the drawings. The same reference designations will be used throughout all of the drawings for the same parts or locations unless otherwise indicated.

A. Overview

The present invention relates to highly controllable lighting for target areas. In this detailed description, one preferred embodiment will be discussed primarily. However, before beginning that discussion, a brief description of some of the basic principles involved with the present invention will be set forth.

Regardless of whether the invention is utilized in the manner of the preferred embodiment, or with other uses, the invention consists of a lighting system that begins with placement of a light source which radiates light energy. In the preferred embodiment this light source comprises an arc lamp that radiates light energy in a generally spherical manner; that is light energy is emitted in basically all directions from the light source. Other types of light sources can be used, however.

A primary reflector is associated with the light source to capture a substantial portion of the light source light energy. In the preferred embodiment this is basically a bowl shaped reflector with the lamp centered in the reflector. The spherical radiation of light energy from the lamp is then captured substantially by the reflector which directs the captured light, and any directly emitted light, out the face of the reflector in a generally hemispherically radiating manner. This reflector associated with the light source will be referred to as the primary reflector. Other types of light sources and/or reflectors can be used.

The system of the present invention then utilizes another reflector, called the secondary reflector, positioned in at least a portion of the light energy emitted from primary reflector and light source (referred to as the "primary beam"). The secondary reflector is usually positioned at a distance spaced apart from the primary reflector such that the light energy is striking the secondary reflector in a relatively substantially unidirectional pattern. In other words, the secondary reflector is usually positioned far enough away from the primary reflector and light source that it will capture only a portion of the hemispherically expanding and radiating light energy of the primary beam, and that portion of the primary beam at that spaced apart distance would be traveling generally or substantially unidirectionally relative to the hemispherical primary beam. The secondary reflector then creates what will be referred to as a secondary beam, which is really a reflection of the light energy of the primary reflector and light source. This secondary beam is of substantially fewer degrees of arc than a hemisphere. In other words the secondary beam also is generally unidirectional as opposed to radiating in all directions in a hemisphere, and therefore can be precisely defined and controlled. It has been found that in directing the secondary beam to a remote target location for lighting, that location can be defined and the secondary beam controlled so that the outer perimeter of the secondary beam can have a substantially precise cutoff. In other words, within only a few inches or feet one can either be within the beam or outside the beam. As an example, in some applications, there can be a cutoff of greater then 95% of the light intensity in less than a foot at the edge of such a beam at a distance of more than 100 feet from the secondary reflector. This allows very precise control of where the light goes and where the light does not go. Such precise control can be achieved by a number of different options for individual primary and secondary reflector systems, or combinations of several primary and secondary reflector systems.

Furthermore, this invention has the ability to utilize more of the light energy onto the target area by redirecting onto the target area portions of the primary beam which would have been spill light if the primary beam were aligned directly towards the target area.

The shape, size, and intensity of the secondary beam is determined by at least the following factors:

a. The type and characteristic of the light source.

b. The distance from the primary reflector to the secondary reflector.

c. The size of the primary reflector.

d. The shape of the primary reflector.

e. The size of the secondary reflector.

f. The shape of the secondary reflector.

g. The reflective properties of the primary reflector.

h. The reflective properties of the secondary reflector.

i. The orientation of the secondary reflector relative to the primary reflector.

j. The amount of the primary beam which is redirected by the secondary reflector.

As will be further explained below, the shape of the secondary reflector can take on many different configurations for different lighting purposes. For example, the secondary reflector can be a flat planar rectangular mirror. Alternatively it could be curved in any direction or combination of directions. It could have convex surfaces or concave surfaces or any combination thereof. Still further, instead of one single reflecting mirror, it could be made up of a plurality of segments. The segments in of themselves could be planar or curved or otherwise shaped. The segments could be aligned generally in a plane or aligned along some other non-planar configuration. Still further, each of the segments could be angularly tilted in different directions from one another. There can be any combination of the above options with regard to secondary reflectors.

It should be appreciated also that reflecting properties of the primary or secondary reflector or any portion thereof can be specular or diffuse or some reflective characteristic therebetween.

It is to be further understood that generally portions of the primary beam from the primary reflector and light source are not needed or are not desired to be utilized by the secondary reflector. Therefore the secondary reflector can select portions of the primary beam that are desired to be redirected to the target space or area. Unwanted portions of the primary beam can be blocked or absorbed or simply not used by the secondary reflector to avoid light energy being transmitted to undesired areas or undesired ways.

The system of the invention thereby allows lighting of target areas at distances substantially remote from the secondary reflector with a high degree of control as to spill and glare light. There is also a higher degree of control as to direction of the light and selection of portions of the light energy that are to be directed to the target space or area than would be possible with a conventional light source and primary reflector alone. There is also, in many conditions, a greater utilization efficiency of the light energy by collection and control by the secondary reflector of a greater portion of the primary beam than would have been utilized by the primary reflector alone. An application of this system in a preferred embodiment will now be described.

The preferred embodiment consists of a lighting system for an automobile race track. A description will be given generally of the race track and surroundings. Specific considerations for the race track will be discussed.

Thereafter, specific aspects of the invention and the concept behind the invention will be set forth. Finally, alternatives and options for the invention will be described.

B. Race Track Generally

FIG. 1 shows race track 10 as viewed from above. In this particular instance track 10 is called a tri-oval track and is used for high speed NASCAR type racing. Track 10 includes a pit 12, infield 14, main grandstand 16, curve grandstands 18, and infield stands 20.

It is to be understood that normally tracks such as this would be lighted by utilizing a plurality of very tall light poles with clusters of fixtures positioned near the top of the poles. These poles could either be like poles 21 shown in FIG. 1; that is positioned around the perimeter of the track, or could be placed around the interior perimeter of track 10. The lights would be angled downwardly to illuminate different portions of the track. Some of these lights-might also be attached to the top of the grandstands as shown in FIG. 1.

In the preferred embodiment of the present invention, however, the primary source of lighting track 10 is with a plurality of light systems 22 which are placed around the outer edge of infield 14. Only a few of these systems 22 are identified with reference number 22 in FIG. 1 but a number are shown to give an idea of their position relative to track 10 and each other which could be a mile and a half long.

These systems 22 serve to illuminate track 10 instead of conventional systems which would have utilized poles 21 with corresponding fixtures (or grandstand lights). It is to be understood that in the preferred embodiment poles 21 and a certain number of fixtures could still be used if desired to add more light or to add what might be called fill light to the track and the space above the track, for the infield, or for other uses. Such fill light from conventional lamp/reflector fixtures clustered on the top poles is generally utilized only if the poles are positioned in a location that are not an obstruction and where the potential for glare or spill is not a significant factor. It is to be understood, however, that even such fill lighting from these outer locations could instead use a primary and secondary reflector system according to the invention from the elevated position if desired. This shows the flexibility of the present invention. It is to be understood with regard to the race track example, that down lighting from conventional fixtures on top of poles could be used to light areas around the cars in the pits, for example, or to light other selected locations as desired but is not essential to lighting race track 10.

Figure 2:
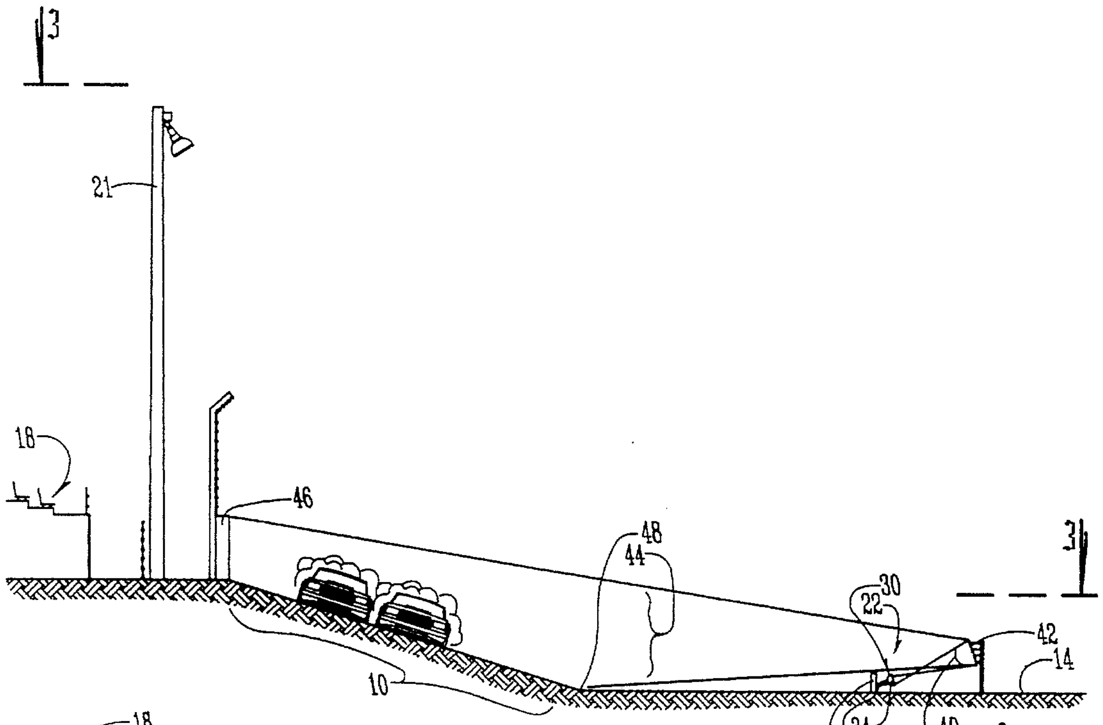
FIG. 2 is an enlarged elevational view taken along line 2—2 of FIG 1.

FIG. 2 depicts an elevational view of one position along track 10. System 22 as shown is comprised of a light source 30 which includes a lamp 32 (see FIG. 4) and primary reflector 34. Light source 30 Generally will have some sort of a mounting elbow 36 that would allow source 30 to be mounted to a support. In this case the support is the infield guardrail 38 for track 10. One reason for mounting sources 32 to infield guard rails 38 is to protect the fixtures from the race cars and debris. They could be mounted independently from the guard rail.

Reflector 34 faces away from track 10 and produces a primary beam 40. Beam 40 is protected at least partially onto secondary reflector 42. Secondary reflector 42 produces a secondary beam 44 which is then directed to illuminate a portion of track 10.

C. Race Track Lighting

FIG. 2 illustrates that secondary beam 44 can be very accurately controlled to illuminate the width of track 10 from outside retaining wall 46 to inner edge 48 of track 10. The beam, however, does not pass over retaining wall 46 into grandstand 18 to cause glare or otherwise spill light off of track 10. In essence, secondary beam 44 can be so precisely controlled that it will illuminate track 10 and virtually nothing else.

Additionally, as will be explained in more detail below, the light level or intensity of light across track 10 and immediately above track 10 can be at a sufficient level as is needed for car racing, for spectator viewing, and for television, without obstruction of spectator view or television cameras, and with minimal or no glare or spill light.

By quick comparison, if the only lighting were from poles 21 (and not systems 22), it might be possible to direct light to track 10, but a substantial amount of light would spill onto the infield 14 and could cause glare to infield spectators. If poles 21 were in the infield, a substantial amount of light would spill into the bleachers or off of track 10 and cause glare to those outside the track. The reason that there would be substantial spill light is that clusters of conventional fixtures would require aiming of individual fixtures of each cluster in various directions to try to cover the track. Because the control of light from each of the fixtures is not precise, in order to adequately light the entire the track, some of the light will spill outside the boundaries of the track. Also, the high intensity fixtures would be directly visible and therefore cause glare at least from some viewing positions.

It should be noted also that if only light source 30 with primary reflector 34 were positioned on the track side of the guard rail 38 and aimed directly towards track 10, either a substantial amount of light would spill over retaining wall 46 (and cause glare), or the fixture would have to be tilted down so much that the primary portion of the beam 40 would fall low on track 10 and not provide the type of lighting needed across track 10 and above track 10.

Figure 3:
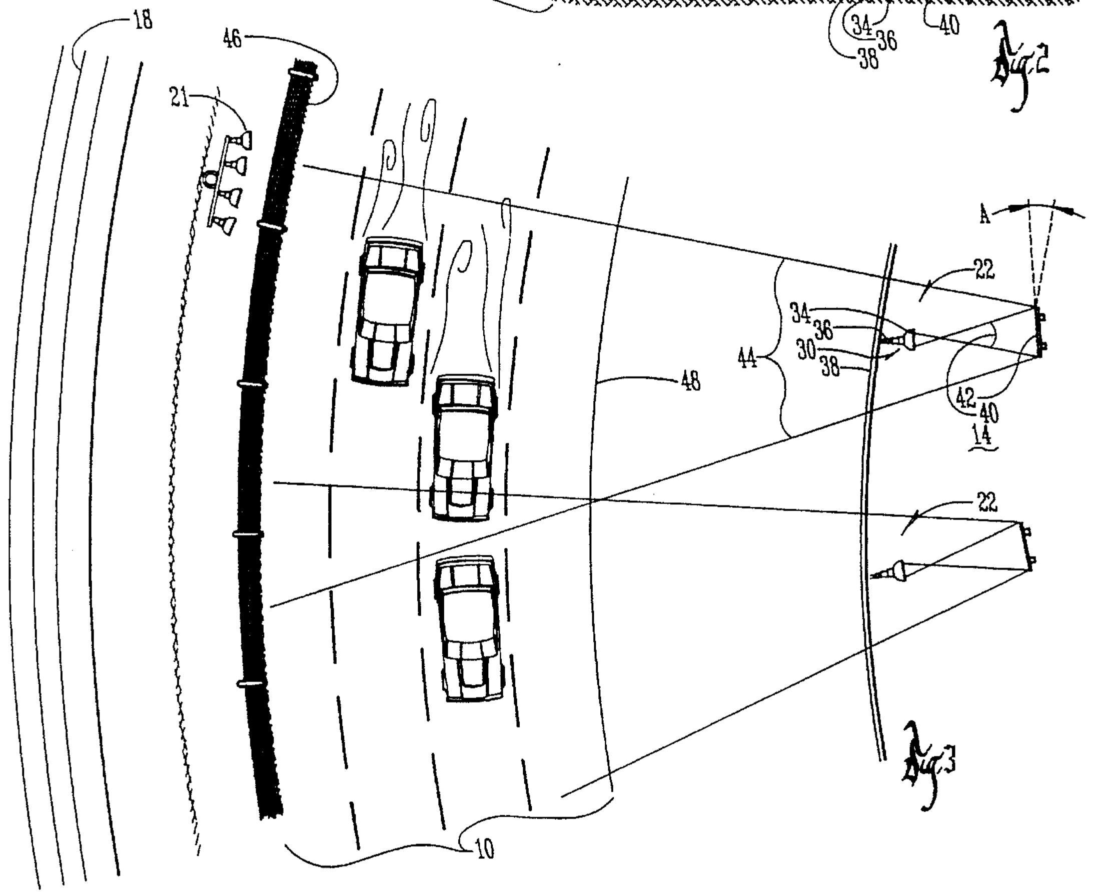
FIG. 3 is a top plan view of a portion of the track of FIG. 1 viewed in the direction of line 3—3 of FIG. 2.

FIG. 3 diagrammatically illustrates a view of a portion of track 10 from above and shows that a plurality of systems 22 could be utilized to cover succeeding portions of track 10. Therefore, not only is the vertical cutoff of light accomplished to eliminate glare and spill (see FIG. 2), systems 22 allow substantial and even coverage of the entire length of track 10 by placement of primary and secondary reflector combinations all around track 10. This is not possible with fixtures clustered on poles.

FIG. 3 also shows how the light emanating from secondary reflectors 42 to the track 10 is directed in such a way that a leading edge of each secondary beam 44 impacts the cars basically perpendicular to the cars and spreads out in front of the cars. This diminishes or eliminates glare into the drivers eyes from a direction up a track.

D. Primary and Secondary Reflector Options

Figure 4:
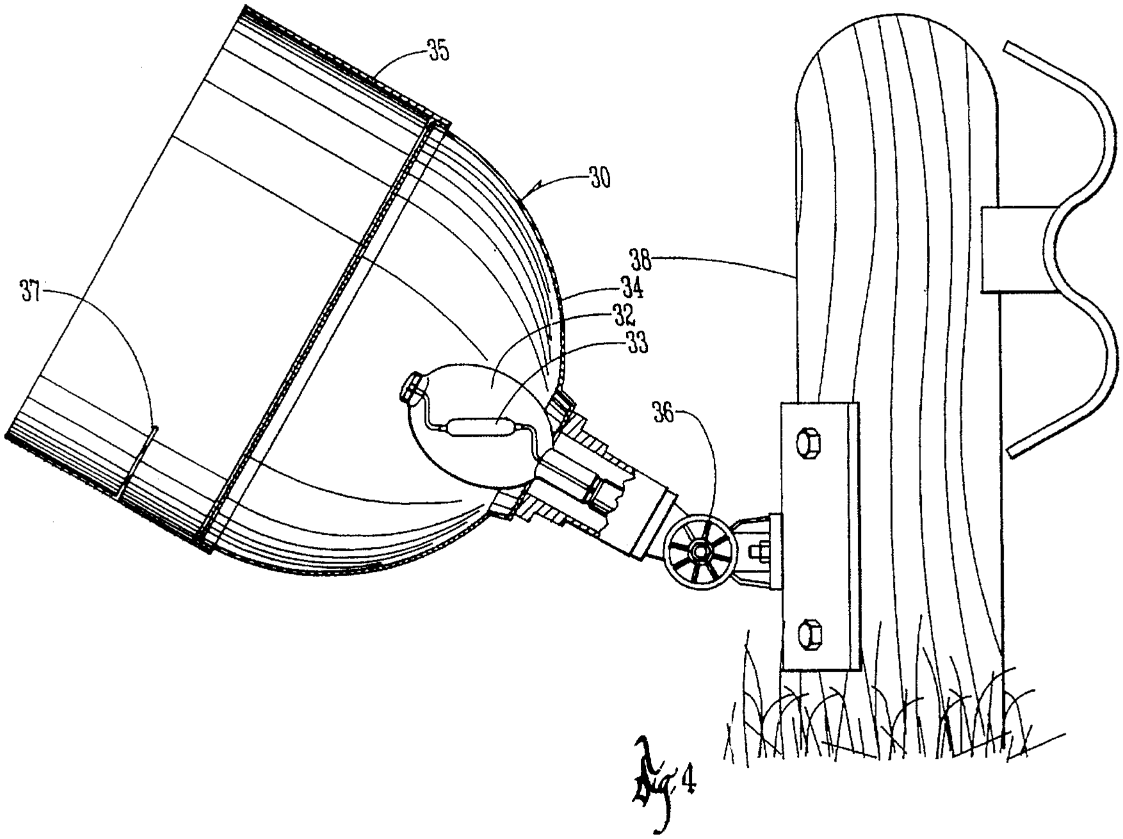
FIG. 4 is an enlarged sectional view of an individual light fixture (including primary reflector taken along line 4—4 of FIG. 5.

FIGS. 5–16 attempt to illustrate a few possible configurations for secondary reflector 42. In each of FIGS. 5–16, the light source 30 could be a fixture similar to that shown in FIG. 4. It is to be understood, however, that a variety of different light sources can be utilized. In FIG. 4 there is shown a basically symmetrical bowl shaped reflector 34 with an axially mounted arc lamp 32. A variety of alternatives can be used. One alternative, for example, could be an asymmetrical reflector with a linear light source. Others are possible.

The fixture in FIG. 4 consists of a lamp 32, a primary reflector 34, and a mounting elbow 36. Primary reflector 34 is a bowl or dish shaped generally hemispherical reflector. Lamp 32 is an axially mounted high intensity (for example 1500 Watt) arc lamp which radiates a majority of its light energy from the equator of arc tube 33 in the lamp (that is, the 360° around the center of the lamp along its longitudinal axis). This substantial majority of light energy is therefore captured, collected, and reflected by primary reflector 34 into a defined primary beam 40.

In FIG. 4, several additional optional features are illustrated. Arc tube 33 can be tilted with respect to the longitudinal axis of lamp 32 as shown so that it is in a substantially horizontal position. This will beneficially impact on the performance and longevity of lamp 32 by eliminating what is called "tilt factor", as well as present a slightly different beam pattern to reflector 34 than would occur if arc tube 33 was axially aligned. Still further, a visor 35 could be installed around the face of the reflector 30 to block and redirect light emanating at severe angles out the face of reflector 30 or to block vision of the lamp 32 or interior sides of the reflector from spectators, drivers, or cameras to reduce or eliminate that as a potential glare source. Visor 35 could extend outwardly from any portion of the perimeter of face of reflector 30. Additionally, a block 37 could be installed in the interior of visor 35 to block light emanating from the bottom of reflector 30 and some of the light emanating directly from lamp 32. Block 37 could also be installed in reflector 34 (block 37 could be in any position and of varying size). Reasons for using these types of features will be explained in more detail later. It is to be understood, however, that these features are not required with the invention, and it is reiterated that different types of light sources, namely lamps and reflector combinations, can be used.

All primary reflectors which surround a lamp light source are limited in their control of light by the universal direction of the output of light energy (generally spherical) from the lamp and the resulting generally expanding hemisphere of light output from the face of the reflector where the lamp is positioned completely within the face of the reflector. Even greater uncontrolled light energy would occur if the lamp were positioned in part outside the face of the reflector. This is a primary reason conventional lamp and reflector systems lack the light control possible with the present invention.

By placing a secondary reflector at a distance spaced apart from the primary light source, the light striking the secondary reflector is basically unidirectional. It is therefore easier to control. This is a primary benefit of the present invention.

Figure 5:
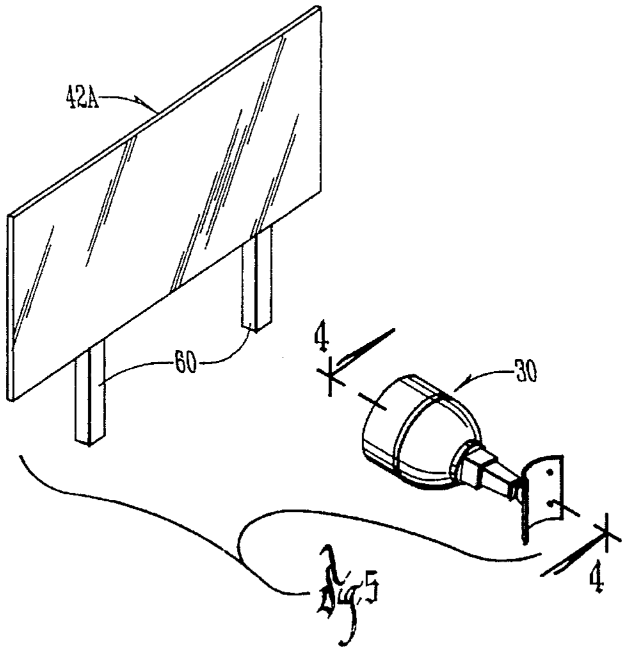
FIGS. 5–15 are isolated perspective views of primary and secondary reflectors according to the present invention.

FIGS. 5–16 illustrate examples of some secondary reflectors 42 that could be used with the invention. Other configurations are possible. Fixtures 30 according to FIG. 4 are shown with some of these figures in association with a secondary reflector 42. Secondary reflectors 42 in these figures differ as follows. Secondary reflector 42A of FIG. 5 is simply a flat mirror which can be suspended slightly off the ground by legs 60. It could also be supported by other means or structure. It is to be understood that reflector 42A, or any of the reflective surfaces of any secondary reflector 42 according to the present invention, can be a conventional mirror, or any material with at least a somewhat reflective surface. Examples are aluminum reflective sheet, mylar type mirrors, silver-backed glass, acrylic, or polycarbonate. Others are possible. It is to be further understood that the reflective surface or any portion of reflector 42 can be specular or diffuse or something in between. Where highly specular secondary reflector mirror surfaces are used, the reflected portion of the beam from the secondary reflector will be nearly an exact image of that portion of the primary beam which has been selected for redirection. Where it is desired to reconfigure that portion of the primary beam which is directed off the secondary reflector, one way to do so is to use less specular and more diffuse surfaces. Various shaping of the secondary reflector can also be used to alter the reflected beam pattern off of the secondary reflector. Changing of size of the secondary reflector can also be used. Other ways and methods are also possible.

Figure 6:
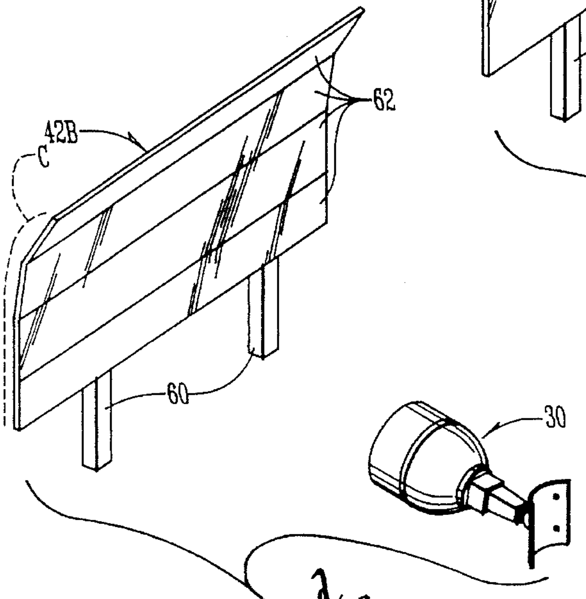

FIG. 6 illustrates reflector 42B made up of elongated narrow sections 62. Each of these sections is planar but they are arranged on legs 60 generally along a curve C. Alternatively, each of the sections could be planar and disposed generally along a plane, but each of the planar sections could be pivoted or tilted with respect to that plane (see FIGS. 11 and 13 for example). They could each be tilted a similar degree vertically or horizontally, or different degrees depending on what is desired.

Figure 7:
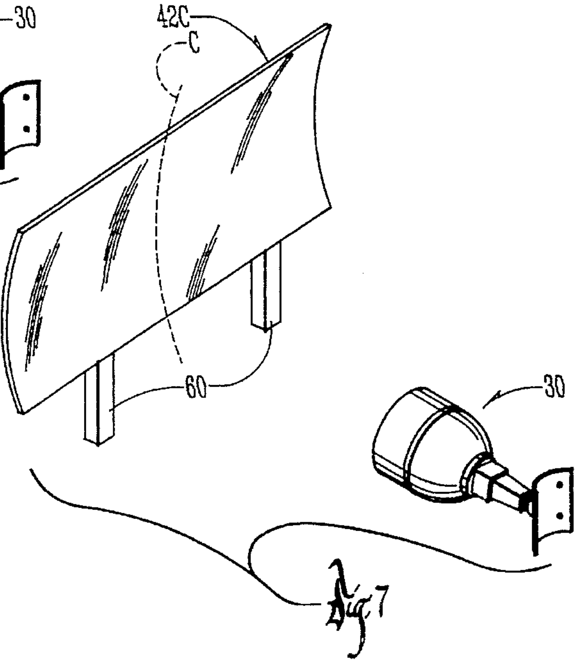

FIG. 7 illustrates a reflector 42C that is elongated along a longitudinal axis, but is curved along a transverse axis C.

Figure 8:
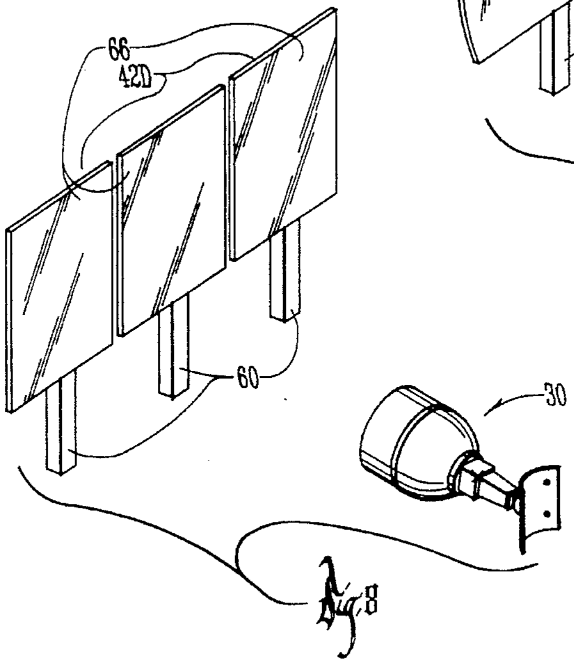

FIG. 8 illustrates that reflector 42D could be made up of sections 66 spaced apart horizontally. Each section 66 could be oriented generally in the same plane as shown, or at different angles to light source 30, or their surfaces could be of varying specularity. It is to be understood that each section 66 could alternatively be elongated, narrow flat planar sections or curved sections. Each of the sections could also be tilted in one or more directions.

Figure 9:
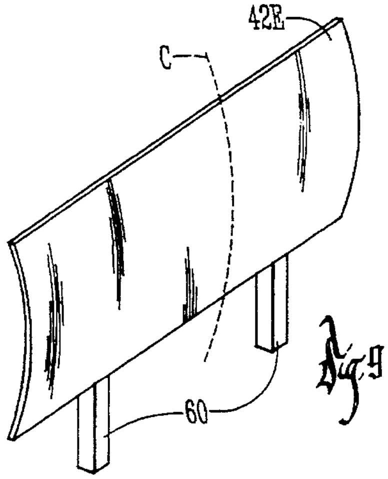

FIG. 9 shows secondary reflector 42E having a reflective surface that is convex in nature along a curve C.

Figure 10:
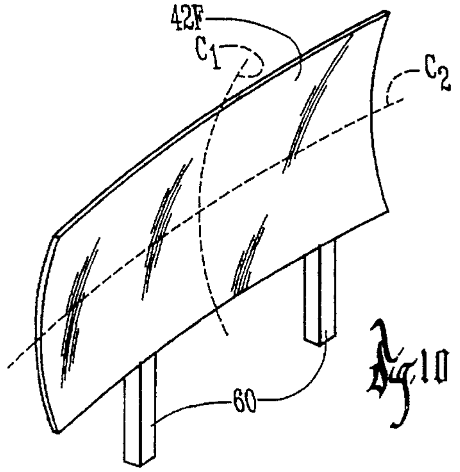

FIG. 10 illustrates secondary reflector 42F could be curved in two directions as shown by curve C1 (along transverse axis) and C2 (along longitudinal axis).

Figure 11:
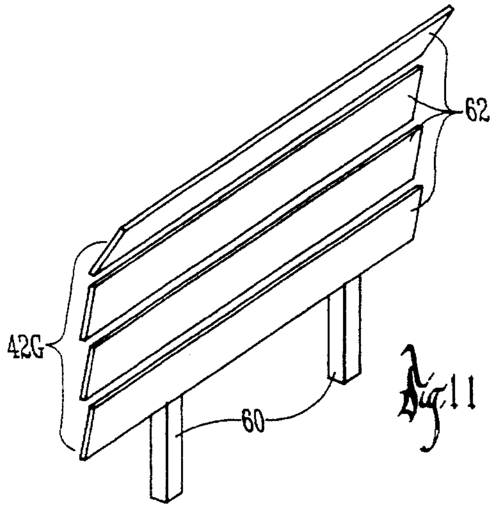

FIG. 11 shows secondary reflector 42G could be made up of individual planar segments 62 disposed generally in a vertical plane, but each rotated around its longitudinal horizontal axis with respect to that plane. Each section 62 could be tilted similarly or in varying degrees with respect to one another or the plane in which they are positioned.

Figure 12:
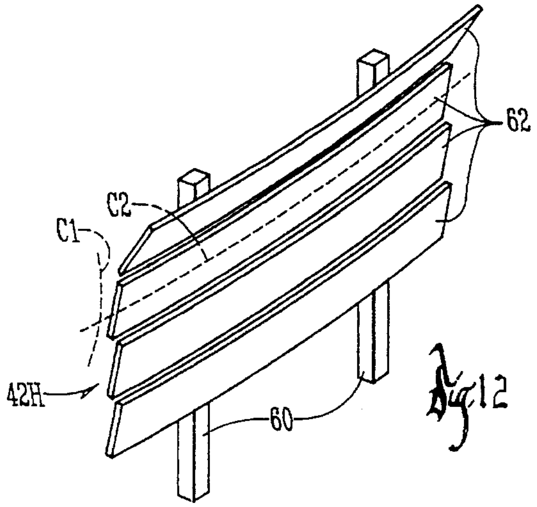

FIG. 12 shows secondary reflector 42H having individual sections 63. Each of these individual sections 63, however, could individually be curved in one or more dimensions (for example, curved along C2, its long axis, and C1, its transverse axis).

Figure 13:
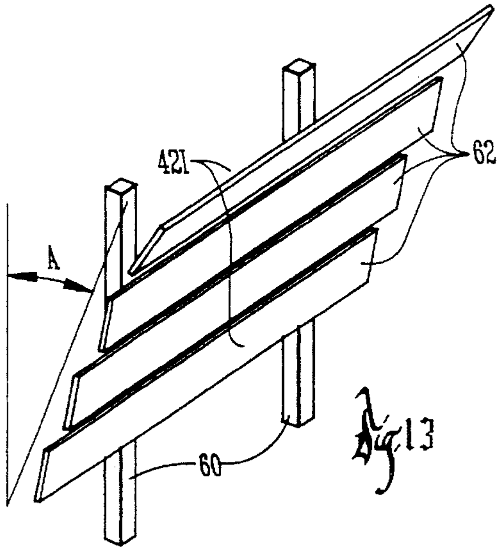

FIG. 13 is similar to FIG. 11 except it shows that individual planar sections 62 could be tilted relative to one another along generally a plane which is angularly offset from a vertical plane (see angle a).

Figure 14:
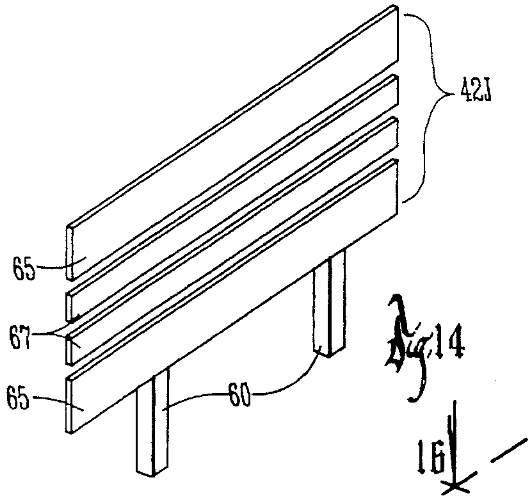

FIG. 14 illustrates a secondary reflector 42J similar to that of FIG. 11 except showing that segments 65 and 67 could be aligned in a plane and the perimeter dimensions of portions 65 could be different than the perimeter dimensions of portions 67 if desired.

Figure 15:
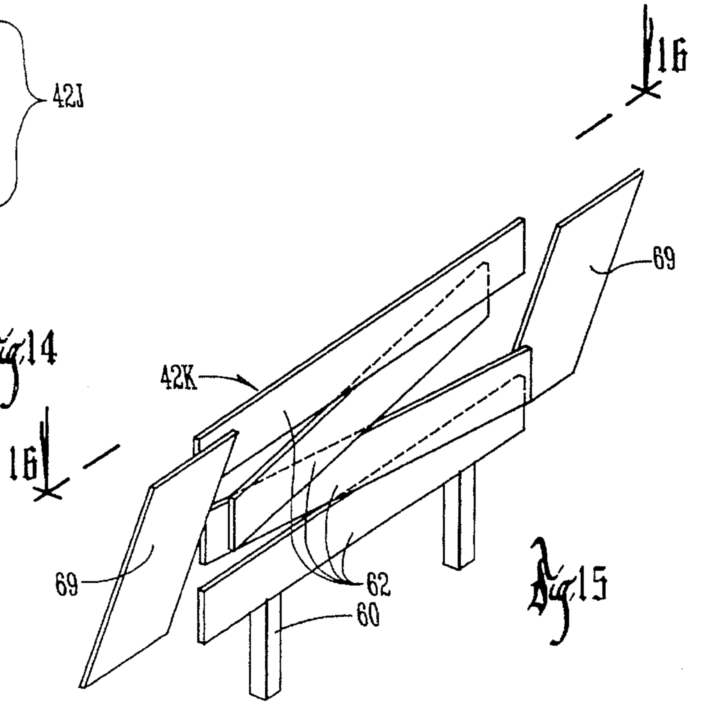

FIG. 15 depicts a secondary reflector 42K having individual planar sections 62; several sections 62, however, are pivoted around vertical axes with respect to others of those sections. Additionally, FIG. 15 includes more rectangular sized reflecting panels 69 which could be positioned at the ends of sections 62 and tilted differently (around vertical and/or horizontal axes) from sections 62. This combination would then allow variety of different reflections of the light from light source 30. For example, it could allow portions of light energy from a source 30 to be selectively directed to distinct areas.

Figure 16:
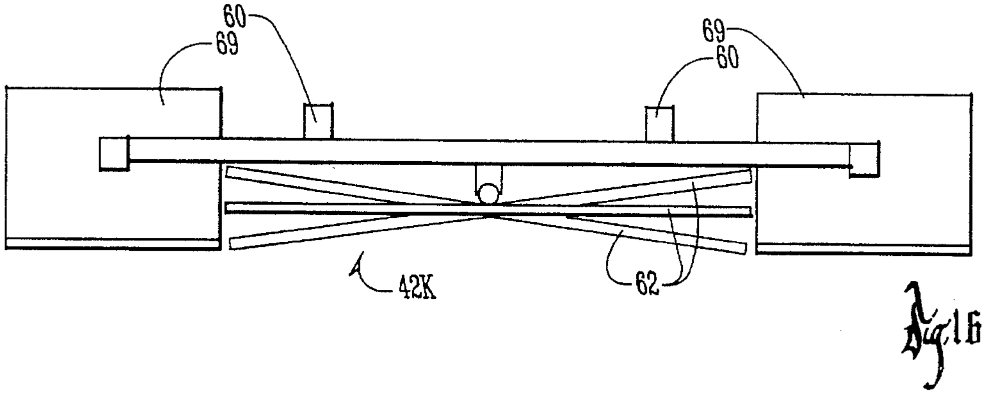
FIG. 16 is a top plan view taken along line 16—16 of FIG. 15.

FIG. 16 shows a top plan view of FIG. 15 to better illustrate pivoting of sections 62 with regard to one another and the tilting of sections 69.

These different examples are shown only to illustrate a few types of reflectors 42. It is also to be understood that different types of light sources and primary reflectors 34 can be utilized.

It is to be understood that the reflectors 42 shown in FIGS. 5 through 16 each have a unique effect on light energy incident upon them from a light source 30. As will be described further, basic factors such as the perimeter size of reflector 42, its distance away from light source 30, as well as the size of light source 30 and the nature of the primary beam 40 from light source 30, contribute to the shape and characteristics of the light energy which is directed into a secondary beam 44 from secondary reflector 42. FIGS. 5–16 illustrate a few of the ways in which secondary reflector 42 can be configured to form different types of secondary beams 40. As previously stated, a flat mirror in FIG. 5 would basically reflect an exact image of the light energy striking mirror 42A. It is to be understood, however, that it may be designed that only a portion of the primary beam 40 from light source 30 is incident on mirror 42A. Mirror 42A would therefore only reflect what is incident upon it according to the fundamental principle of angle of incidence equals the angle of reflection. Any light from source 30 that does not strike mirror 42A will, of course, simply pass by and not form a portion of secondary beam 44. This allows selection of portions of primary beam 40 which are desired to be used.

Mirror 42B of FIG. 6 would tend to bring down the top level of secondary beam 44 because the top few sections 62 are angled forwardly towards the light source 30. Mirror 42C of FIG. 7 would tend to condense or converge secondary beam 44 from both top and bottom because of its curved nature from top to bottom in a concave manner. Mirror 42D of FIG. 8 would function similarly to 42A of FIG. 5 unless panel 66 were rotated around vertical or horizontal axes. Mirror 42E of FIG. 9 would accomplish basically the opposite of FIG. 7, that is spread the top and bottom portions of secondary beam 44 because of its convex nature along curve C. FIG. 10 merely shows that secondary beam 44 could be condensed or converged both top to bottom and side to side by mirror 42F which is concave both along curve C1 and along C2.

Mirror 42G of FIG. 11 would produce a reflected secondary beam 44 similar to FIG. 6 but it may be easier to build because all of panels 62 are aligned along generally a vertical plane which does not require building the panel 62 along a curve C such as shown in FIG. 6.

FIG. 12 is similar to FIG. 11 except showing panels 62 could be curved along lines C1 and C2.

FIG. 13 simply shows that segments 62 could be tilted with respect to one another while all of segment 62 could be positioned in generally a plane which is tilted from vertical. That plane could also be tilted in other directions.

FIGS. 14–16 show that secondary reflector mirror 42 can be made of segments of varying sizes or orientations with respect to one another to take selected portions of the beam and create different components of the secondary beam 44 (for example in FIG. 14, the secondary reflections from larger segments 65 would in turn be larger than those of segments 67). For whatever purpose, this could allow redirection of larger portions of primary beam 40 to certain locations and smaller portions of primary beam 40 to smaller locations. Additionally, it may be that it is desired to take higher intensity portions of primary beam 40 and direct those to a certain location or locations whereas less intensity portions of primary beam 40 could be directed to other locations. FIG. 15 shows that different segment sizes between segments 62 and 69 could exist in one mirror in that configuration. Others are possible. FIG. 15 also shows that by rotating segments 62 along a vertical axis, different portions of primary beam 40 can be spread horizontally in different directions.

Figure 17:
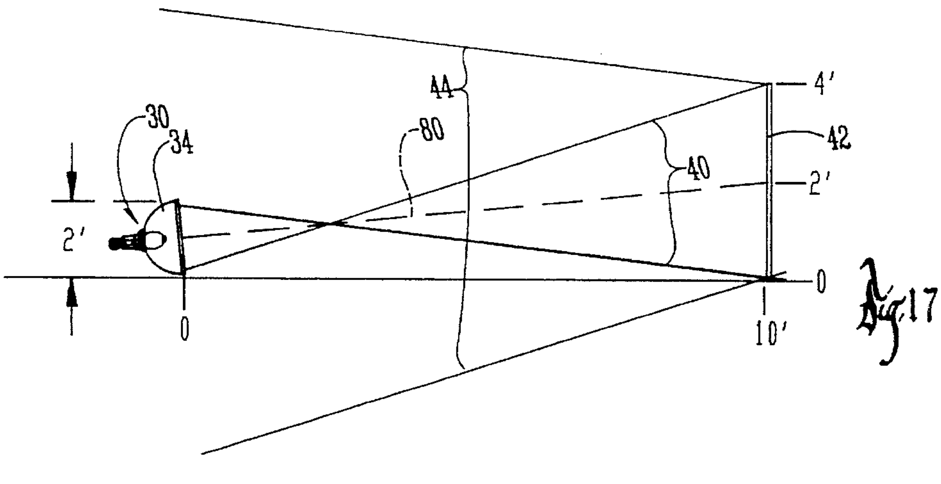
FIG. 17 is a diagram illustrating the positional and dimensional relationships between a primary and secondary reflector according to one embodiment of the present invention.

FIG. 17 diagramatically depicts the relationship between primary light source 30 and mirror 42A similar to that which might be used on race track 42 for system 22. In the preferred embodiment with regard to race track 10 of FIG. 1, reflector 34 is two feet in diameter and its lower edge is placed generally close to the ground. Mirror 42 (here shown to be flat, but preferred to be made out of segments 62, each tiltable and rotatable with respect to each other similar to FIG. 11) is placed generally about 10 feet away from reflector 34. The total height of mirror 42 is around 4 feet. Each panel could therefore be 1 foot in height. In the preferred embodiment, the width of mirror 42 can be 6 feet or so.

FIG. 17 shows that light source 30 would have to be tilted upwardly slightly so that its central aiming axis 80 would impact generally in the center of mirror 42. However, it is to be understood that it may be desired to direct light source 30 in a different manner than mirror 42. In any event, FIG. 17 shows that under the laws of angle of incidence equals angle of reflection, primary beam 40 will strike mirror 42 and reflect secondary beam 40 having very defined outer edges. This will be true both vertically as shown and horizontally which is not shown.

E. Optic Principles

FIGS. 18–40 depict some of the optical principles upon which systems 22 operate and the relationships between primary and secondary reflectors and how those affect the resulting reflected light energy from the secondary reflectors.

Figure 18A:
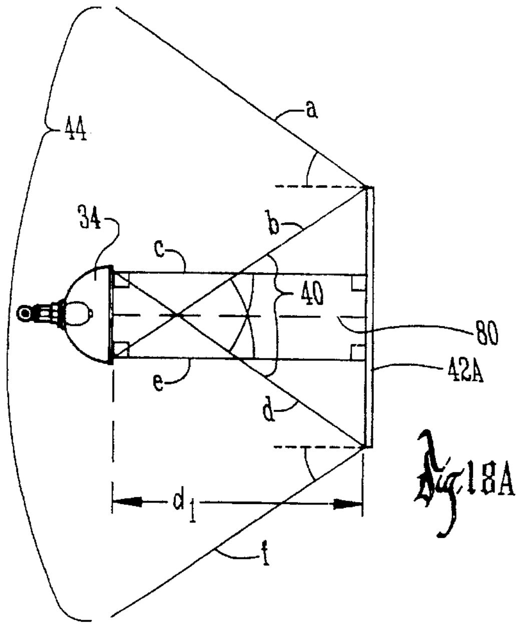
FIGS. 18A, 18B, 19–21 are diagrammatical views of primary and secondary beam patterns generated by primary and secondary reflectors similar to that of FIG. 5.

FIG. 18A diagrammatically depicts a side elevational view of primary reflector 34 and a flat secondary reflector 42A, having height dimensions of r1 and m1 respectively. In this example, central or aiming axis 80 of primary reflector 34 is generally centered on mirror 42A. However, a significant feature of the present invention is that the primary beam from primary reflector 34 can alternatively be aimed so that only a portion of the beam impacts on the secondary reflector to selectively just use a portion of that primary beam. For example, some primary beams have much greater candle power or intensity at the center of the beam with decreasing intensity towards the edges of the beam. In some uses, it is desirable to utilize only a portion of the high intensity center portion of the primary beam. The primary beam could then be aimed so that, for example, only one half of the primary beam impacts on the secondary reflector. The other half would simply pass by the secondary reflector and not be used.

As another example, to generate greater or lesser candle power reflections to a particular target area, the greater candle power portion of the primary beam could be reflected from a secondary reflector to a distance farther away whereas a lower candle power portion of the primary beam could be aimed at distances closer. Because light intensity decreases with distance, careful selection of these portions of the beam and their placement at different positions at the target area would assist in creating uniform lighting across the area or space.

In FIG. 18A, the distance between reflector 34 and the plane of mirror 42A is defined as d1. It is to be understood that a significant relationship to determine the type of beam created by this combination is the relationship of r1, m1, and d1 as will be further described later.

The shape and intensity of primary beam 40 from primary reflector 34 is a function of reflector 34 and lamp 32. In this instance, primary beam 40 is a slightly converging beam having a shape defined by the interior reflecting surface shape of reflector 34. In FIG. 18, as well as other Figures, as is well understood in the art, primary beam 40 is represented by two lines extending from opposite edges of reflector 34 each to an opposite edge of secondary reflector 42. This is not representative of the exact primary beam 40 pattern issuing from reflector 34, but instead is used to illustrate how the outer dimensions of secondary beam 44 are formed. As is well known, angle of incidence equals angle of reflection for reflecting surfaces. Therefore, the outer edges of secondary beam 44 will be defined by the largest angle of incidence from primary beam 40. The largest angle of incidence would be from the farthest edge of reflector 34 to the farthest edge of a secondary reflector 42. Therefore, by drawing the lines as shown in FIG. 18A for primary beam 40 the outer dimensions of secondary beam 44 can be illustrated. To further this point, FIG. 18A shows a dashed line originating between the outer edges of reflector 34 and then going to mirror 42. This illustrates that any light ray from an interior point in reflector 34 will not have an angle of incidence greater than those from opposite edges of reflector 34 to corresponding opposite edges of secondary reflector 42, validating that the outer edges of secondary beam 44 are defined in this manner. Actual primary beam 40 of FIG. 18A is symmetrical with regard to axis 80. It is to be understood, however, that primary beam 40 could be created to be asymmetrical in shape by using items such as shown in FIG. 4. For example, the use of visors, blocks, and tilted arc lamps could create an asymmetrical beam pattern which could be used for primary beam 40.

Figure 18B:
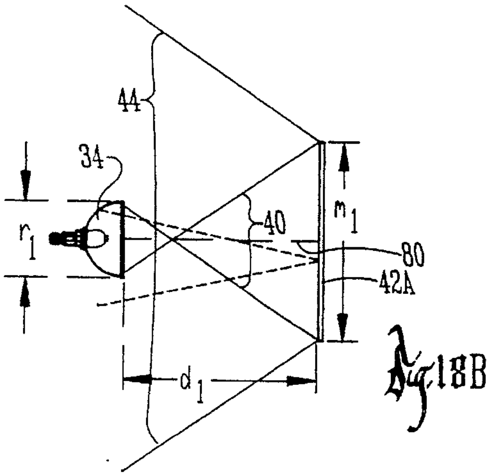

Therefore as shown in FIG. 18A, light rays from the top and bottom edges of the inside of reflector 34 drawn to the opposite top and bottom points on reflector 42A define primary beam 40. Primary beam 40 is then shown reflecting from reflector 42A as secondary beam 44. The angle of incidence of the rays of the outer edges of beam 40 results in an equal angle of reflectance from flat mirror 42A in FIG. 18A to create secondary beam 44. Thus, secondary beam 44 will essentially be a "mirror-image" of the primary beam. If a flat secondary reflector 42 is utilized, the total angle of secondary beam 44 will be equivalent to that of the first primary beam. FIG. 18B illustrates how the total secondary beam 44 is determined. For flat mirror 42A of FIG. 18A, where the aiming axis 80 of reflector 34 is basically perpendicular to the center of mirror 42A, secondary beam 44 is defined as follows. Two perpendicular lines from mirror 42A to the opposite outer edges of reflector 34 are drawn. These lines are indicated by "c" and "e". Lines b and d represent the light rays from each side of reflector 34 to opposite edges of mirror 42A. Lines a and f represent the reflected rays from lines b and d. The angle between lines a and f is defined by the sum of the angles between lines c and d and b and e. In the case of FIG. 18B, the angle between b and e and c and d, are equal because of the perpendicular relationship of reflector 34 to flat mirror 42A. However this shows the basic relationship for this situation. It is to be understood, however, that if secondary reflector 42 were curved or segmented with the segments tilted with respect to one another, that secondary beam 44 could be altered in its configuration.

If sectioned flat secondary reflectors rotated differently from one another are utilized or a curved secondary reflector is utilized, the beam spread of secondary beam 44 can be altered from primary beam 40. FIG. 18A shows however that even with a flat mirror secondary reflector 42A, a very defined and controlled beam shape from primary beam 40 of reflector 34 can be produced.

Figure 19:
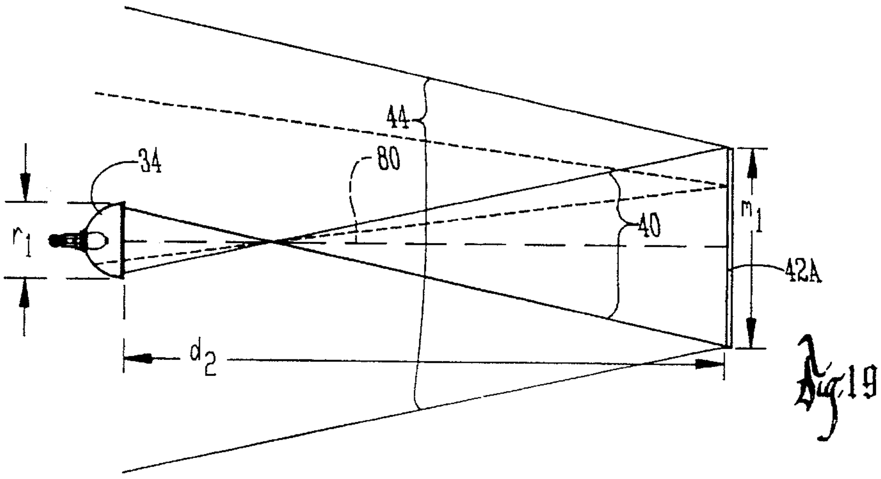

FIG. 19 shows that for an identical mirror 42A and primary reflector 34, but for a different (longer) distance d2, secondary beam 44 will be narrower from top to bottom than for the arrangement of FIG. 18A. This is because the angle of incidence of the outer limits of primary beam 40 to the top and bottom edges of mirror reflector 42A, are less than those in FIG. 18A. Therefore, altering the distance between primary and secondary reflectors 34 and 42, in and of itself, can change the beam pattern of secondary beam 44 for a given size of mirror (if m1 and r1 remain constant) because the viewing angle of the secondary reflector changes with the distance.

Figure 20:
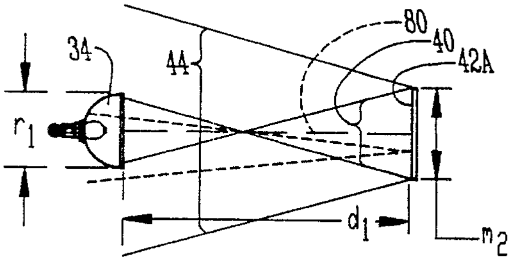

Similarly, FIG. 20 shows that for a secondary reflector 42A which has a much smaller dimension m2 than m1 of FIGS. 18 and 19 (d1 and r1 remain constant), secondary beam 44 will be narrower than that of FIG. 18A, again because of the optics regarding the angles of incidence and angles of reflection.

Figure 21:
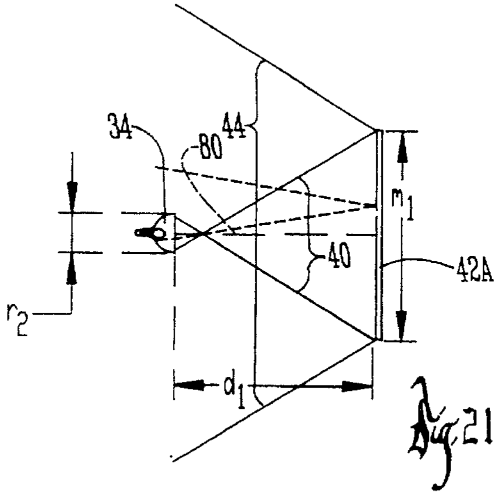

FIG. 21 simply shows that for a small dimension r2 for primary reflector 34, secondary beam 44 can be made narrower (if m1 and d1 remain constant).

FIGS. 18–22 show that the reflected light off of the secondary reflector would be of an angle proportional to the number of degrees of the light radiating from the primary reflector which are intercepted on the mirror surface of the secondary reflector. This phenomenon can be affected by either the size of the mirror (secondary reflector) or the distance of the mirror from the primary reflector. A single planar, specular surface secondary mirror induces a secondary beam which is substantially described as shown in FIG. 18B.

FIGS. 18–22 also show that secondary reflectors 42 take the relatively unidirectional rays encompassed in primary beam 40 and in a very precisely controlled manner issues a well defined secondary beam 44 with precise edges. The shape and intensity of secondary beam 44 is influenced significantly by the size of primary and secondary reflectors 34 and 42 as well as the distance between them and the nature of the light issuing from primary reflector 34 and light source 30.

Figure 22A:
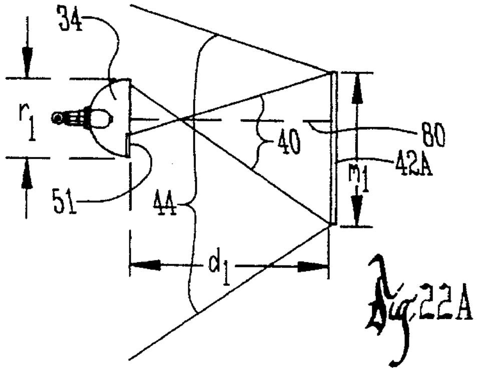
FIGS. 22A, 22B and 22C are similar to FIG. 18A, but illustrate modified primary reflectors.
Figure 22B:
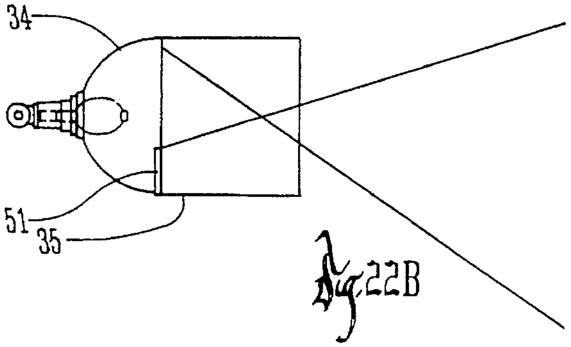
Figure 22C:
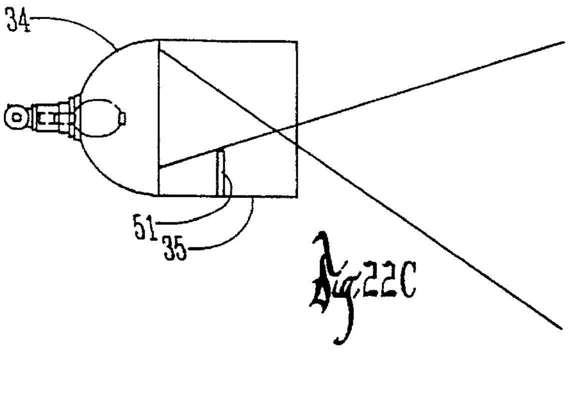

FIGS. 22A, 22B, and 22C show an additional concept. If light source 30 or primary reflector 34 itself is altered, this can in turn alter the type of secondary beam 44 issuing from secondary reflector 42.

FIG. 22A shows the resulting secondary beam 44 would be narrower than beam 44 of FIG. 18A if a substantial portion of the face of reflector 34 was blocked by block 51 even though the reflector diameter is r1 and the mirror height is m1; and the distance between those two items is d1. As can be seen, the blocking off of basically the lower hemisphere of reflector 34 narrows the primary beam 40 which in turn narrows secondary beam 44.

FIG. 22B is similar to 22A in that a block 51 effectively reduces the diameter of reflector 34, narrows the angle of primary beam 40, and thereby narrows the resulting secondary beam 44 from flat mirror 42A. FIG. 22B, shows, however, that a visor 35 could be positioned around the lower portion of reflector 34 (and extend outwardly therefrom). Such a visor could basically shield the direct view of the interior of light source 30 from the sides to reduce glare. It could also block light as desired. It also could assist somewhat in reconfiguring the shape of the primary beam 40 depending on what type of visor 35 is utilized. It is to be understood that visor 35 could take on many different shapes and configurations and be positioned extending from reflector 34 at any position desired.

FIG. 22C simply shows a similar configuration to FIG. 22B except that block 51 is positioned out along visor 35. This could further change the primary beam 40 and in turn change the secondary beam 44.

By referring back to FIGS. 2 and 3, these top and elevational views of a portion of track 10 show how systems 22 can cover the length of track 10 with light, as well as direct light onto and throughout a defined space above the track 10, but with a very precise cut off that does not spill light anywhere else.

It is to be understood that to cut light off at the top of the retaining wall 46 (see FIG. 2), a flat mirror such as shown in FIG. 5 or FIGS. 18–22 may not be desired. A tilted, segmented, or curved mirror such as shown in FIGS. 6, 11, and 13, could be utilized. If mirror 42B of FIG. 6 is used, the top of mirror 42B has a more severe vertical angle than the bottom portion. It receives light rays from primary reflector 34 and is configured so that the angle of reflection from any portion of primary beam 30 (including the portion of beam 30 from the extreme bottom of the primary reflector) will not be allowed to go above retaining wall 46.

Substantially similar types of beam patterns for secondary beam 44 could be accomplished with secondary reflectors such as shown in FIGS. 11 or 13. By utilizing flat planar sections 62 disposed along a general plane, but having each of those sections rotated along a horizontal axis, a similar effect to the segments disposed along curve C in FIG. 6 could be achieved additionally simplifying the structure for secondary reflectors 42.

FIG. 3 shows that mirrors 42 are elongated horizontally but are angularly oriented (see angle a) with respect to primary reflectors 34 and track 10 to angle and spread the light basically in front of the cars on track 10. In other words, as shown in FIG. 3, the first edge of each secondary beam 44 encountered by the cars is basically perpendicular to track 10. Mirrors 42 are angled obtusely to that first beam edge and to light source 30, which results in a spreading of the opposite edge of secondary beam 44 upstream on track 10. This is to deter potential glare to the drivers. This eliminates any glare or flash of light in the driver's eyes as they go around the track. An alternative would be to leave the mirrors fixed (for example, parallel to the track) and move the light sources to change the angle of reflection off the mirrors.

Another possible alternative for the invention with the race track embodiment would be to utilize a continuous mirrored fence around the interior of the track 10. The plurality of light sources would then shine on this continuous mirrored fence and the fence would be configured to redirect the light in a desired manner to track 10. Such a mirrored fence could serve not only as the secondary reflector, but also could block light from the primary light source that might cause glare to infield grand stand viewers or television cameras.

Figure 23:
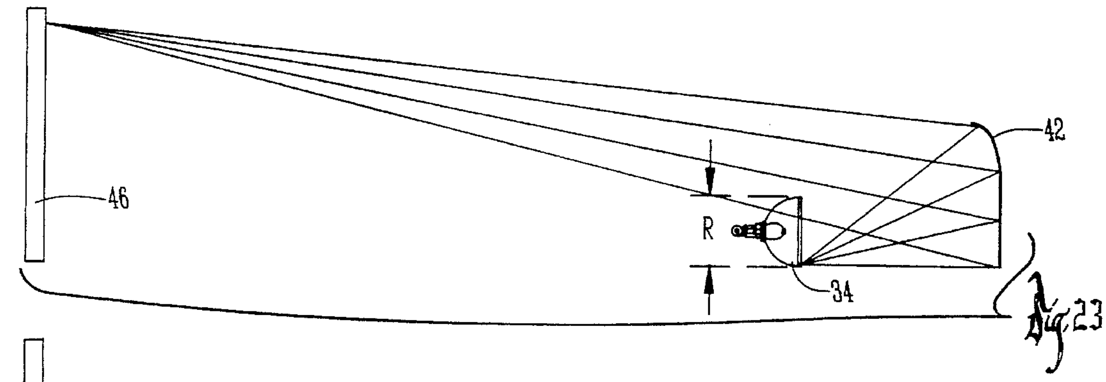
FIGS. 23–31 are diagrammatical depictions of various beam tracings generated by primary and secondary reflectors similar to those shown in FIG. 6.

FIGS. 23–31 basically illustrate how a mirror 42 like that shown in either FIGS. 6, 11, or 13, would operate. Secondary reflectors 42 in FIGS. 23–31 are shown to have a curved upper edge for the purposes of simplicity to demonstrate how the upper portion of mirrors 42 could assist in limiting the highest vertical cutoff of secondary beam 44. It is to be understood, that configuration such as shown in FIGS. 11 and 13 could also achieve similar results. FIG. 23 basically shows that light rays emanating from the very bottom edge of reflector 34 would be converged towards the top of retaining wall 46 but not allowed to go above retaining wall 46. There could be an absolute cutoff of light at retaining wall 46.

Figure 24:
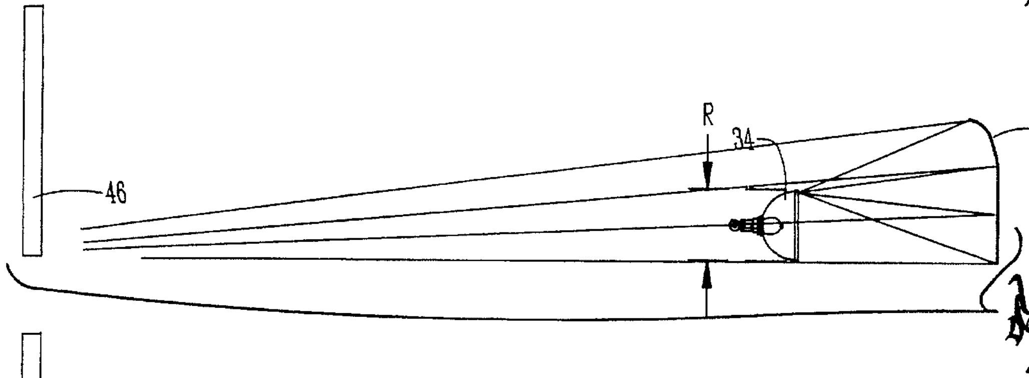

FIG. 24 shows that light emanating from the very top of reflector 34 would be reflected in various attitudes downwardly towards the lower side of track 10.

Figure 25:
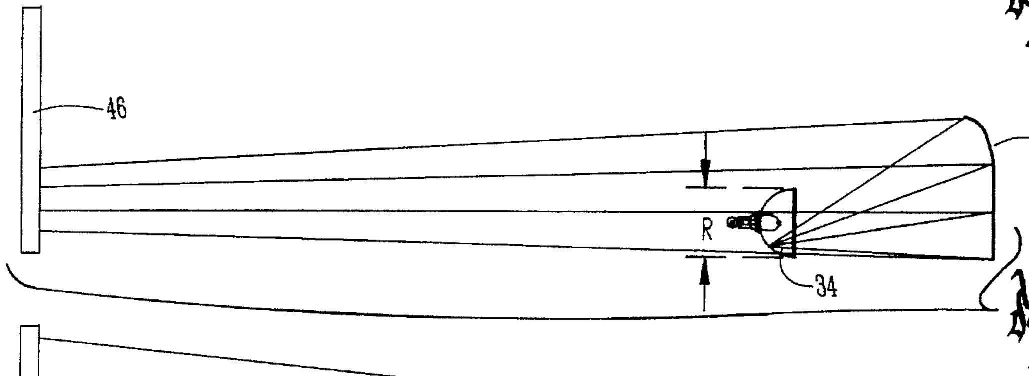

FIG. 25 shows that light emanating from reflector 34 at a position intermediate between those shown in FIGS. 23 and 24 would be directed to intermediate portions of the track or wall.

Figure 26:
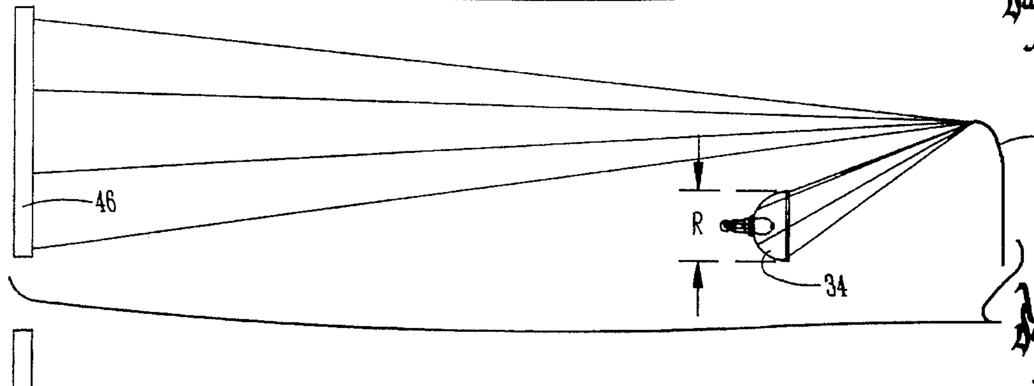
Figure 27:
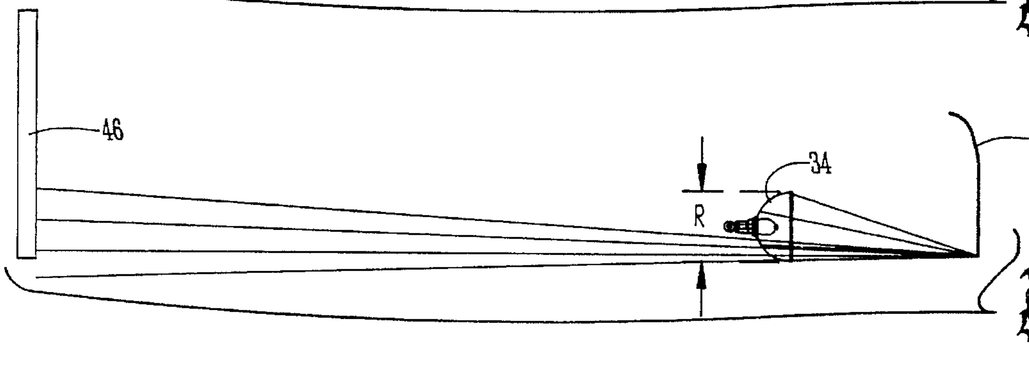

FIGS. 26 and 27 depict the perspective of reflection from one point on mirror 42. FIG. 26 shows that the top of mirror 42 would direct light from the top of wall 46 downwardly and then towards the upper part of the track. FIG. 27 shows that reflection from the bottom of mirror 42 would direct light lower on the wall and track. Of course, however, the exact way in which light energy is reflected from mirror 42 to the target location is a function of many things which are discussed throughout this description. These figures are general in nature and only attempting to show how the invention can be used to accurately control light. In this instance, a plurality of systems 22 utilizing reflectors 34 and mirrors 42 could be used to prohibit light from going over retaining wall 46, but at the same time providing sufficient light across track 10 including wall 46.

Figure 28:
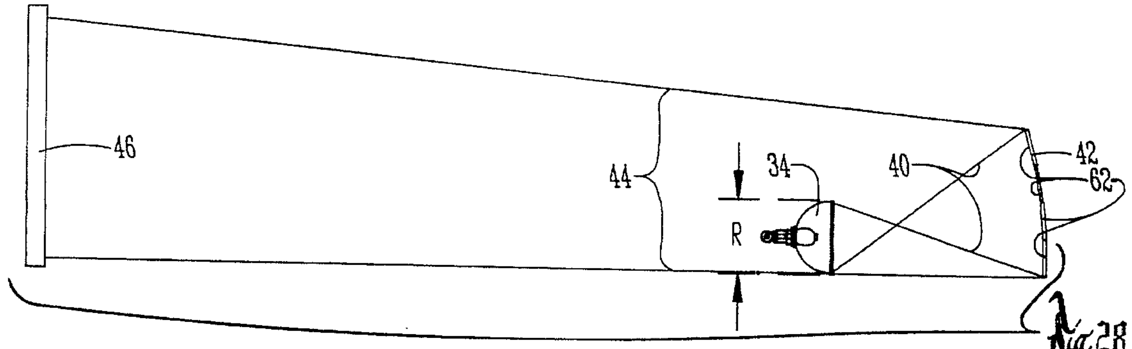

FIG. 28 simply depicts the composite shape of a primary beam 40 and secondary beam 44 for the type of secondary reflector 42 of FIGS. 23–27, showing the distinct and defined top and bottom cutoffs. Similar cutoffs for sides of beam 44 are also achieved, if desired.

Figure 29:
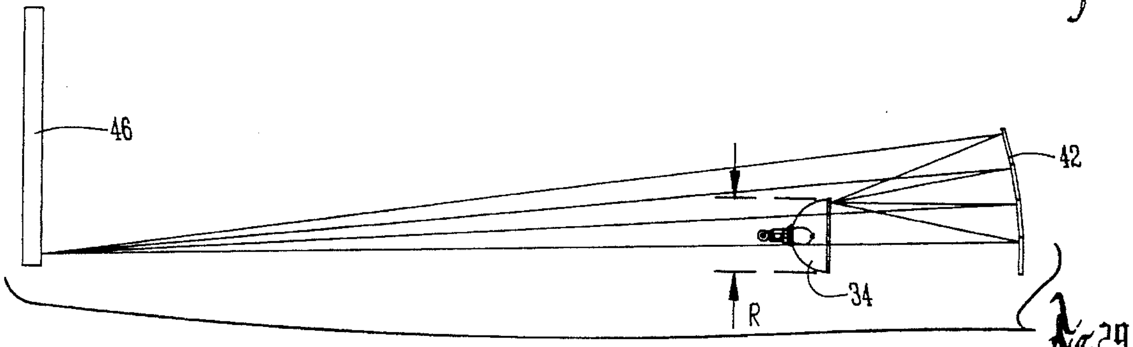
Figure 30:
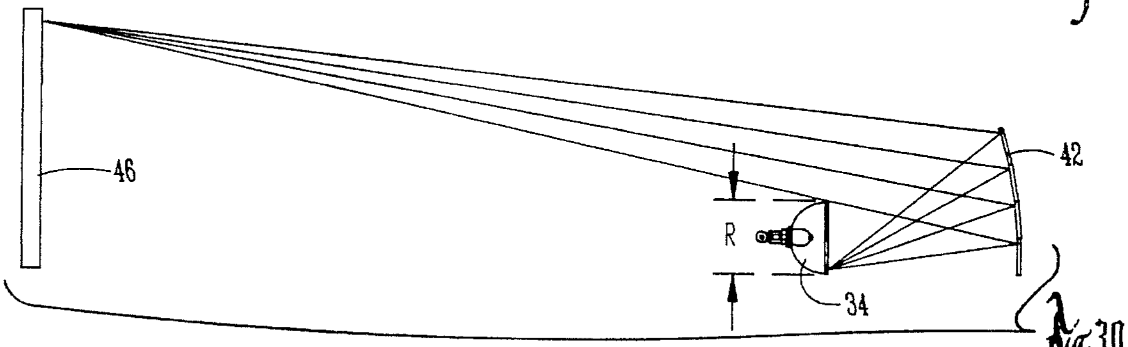
Figure 31:
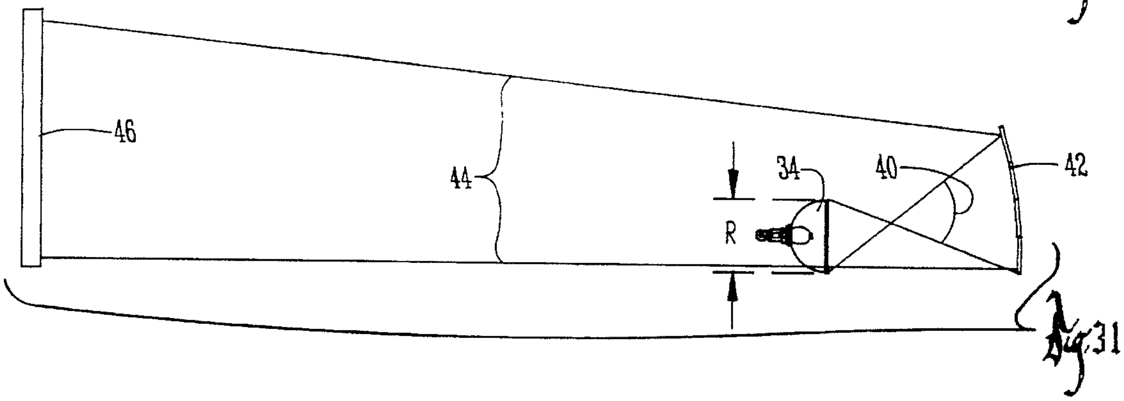
Figure 32:
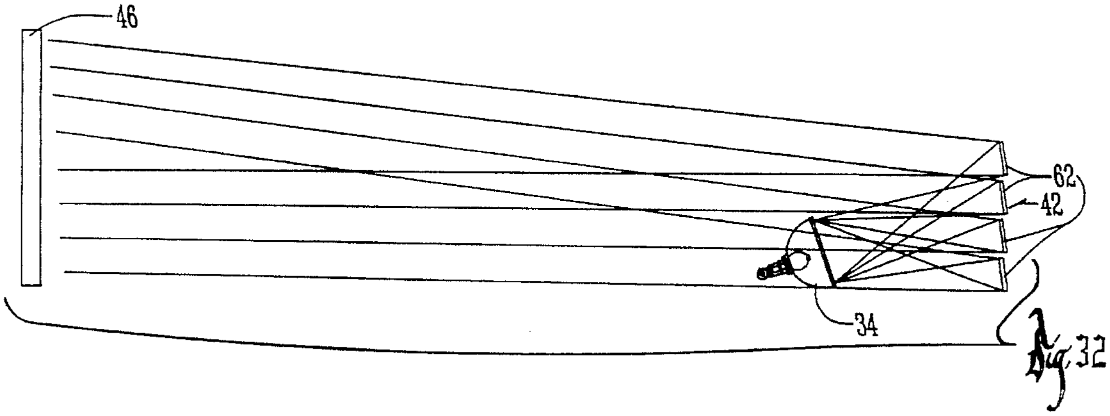
FIG. 32 is a diagrammatical depiction of beam tracings generated by primary and secondary reflectors similar to FIG. 11.

FIGS. 29–31 are similar to FIGS. 23, 24, and 28, except they show basically an equivalent secondary reflector 42 to that shown in FIGS. 23–28 operationally-wise. Instead of a continuous curved reflector, however, reflector 42 is made up of individual planar segments arranged along a curve C which is similar to the curvature of the mirror in FIG. 23. It is to be understood, however, that the individual planar elements or segments could alternatively be basically aligned or centered along a plane such as is shown in FIG. 32 and achieve a similar function to that shown in FIGS. 23–31. Each segment could be pivoted or tilted in varying vertical directions to accomplish the desired reflection of light from the secondary reflector.

Figure 33:
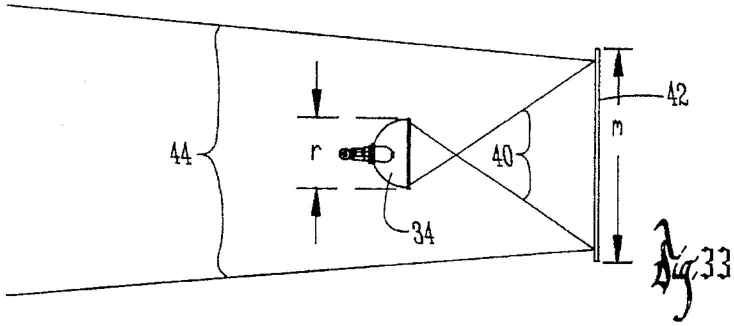
FIGS. 33, 34A, and 34B are diagrammatical depictions of various different beam patterns that can be produced by different secondary mirrors.
Figure 34A:
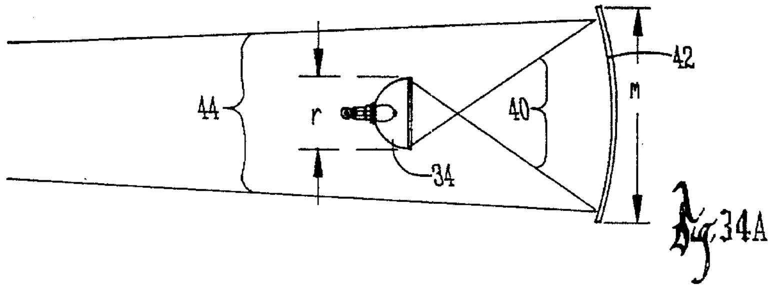
Figure 34B:
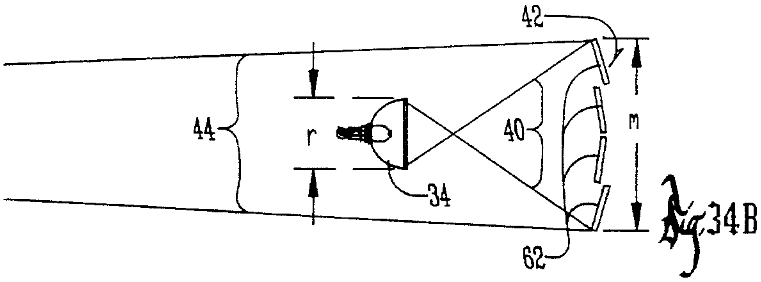

FIGS. 33, 34A, and 34B depict the differences that can occur with regard to beam spreading horizontally (for example, horizontally along track 10) if a type of secondary reflector 42 similar to that shown in FIG. 10 is used. In FIG. 34A, it can be seen that reflector 42 is curved from end to end horizontally. FIG. 34A shows that this would result in a secondary beam that is narrowed horizontally. FIG. 34B shows a similar horizontally narrowed beam if segments 62 are rotated about vertical axes as shown. FIG. 33 shows the type of horizontal beam width previously described in FIGS. 18–22 with respect to a flat mirror 42 for comparison of that of FIGS. 34A and 34B.

Figure 35A:
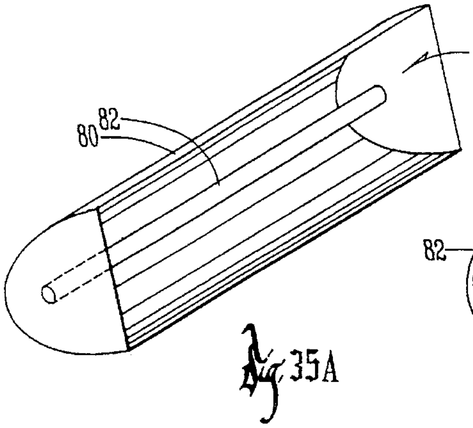
FIGS. 35A and 35B, 36A and 36B, and 37 are diagrammatical depictions of alternative light sources and primary reflectors than those shown in the other drawings, as well as diagrammatical depictions of beam patterns from such light sources and primary reflectors.
Figure 35B:
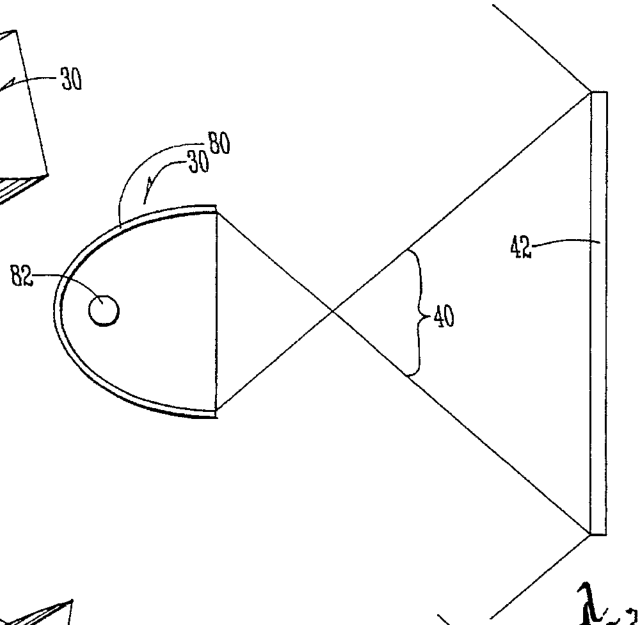

FIGS. 35A, 35B, 36A, 36B, and 37 simply illustrate the ability of the invention to utilize different types of light sources. FIGS. 35A and 35B show an asymmetrical light source 30 having a trough reflector 80 and a linear bulb 82 disposed therein such as is well known in the art. Such an asymmetrical fixture allows very good control of the light vertically, but has a long open face which does not allow as good of control horizontally. As shown in FIG. 35B, however, similar principles apply with use of secondary reflector 42, as previously discussed. The greatest angles of incidence from source 30 are from outer edges. FIG. 35B shows light rays drawn to opposite outer edges of mirror 42 to define secondary beam 44.

Figure 36A:
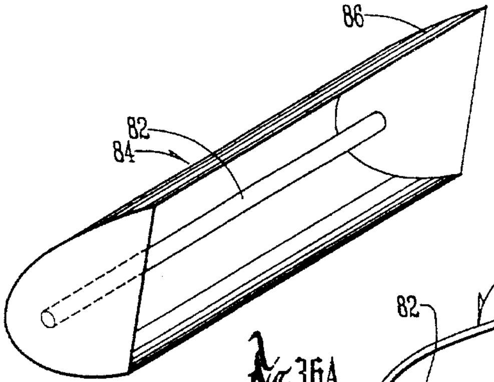
Figure 36B:
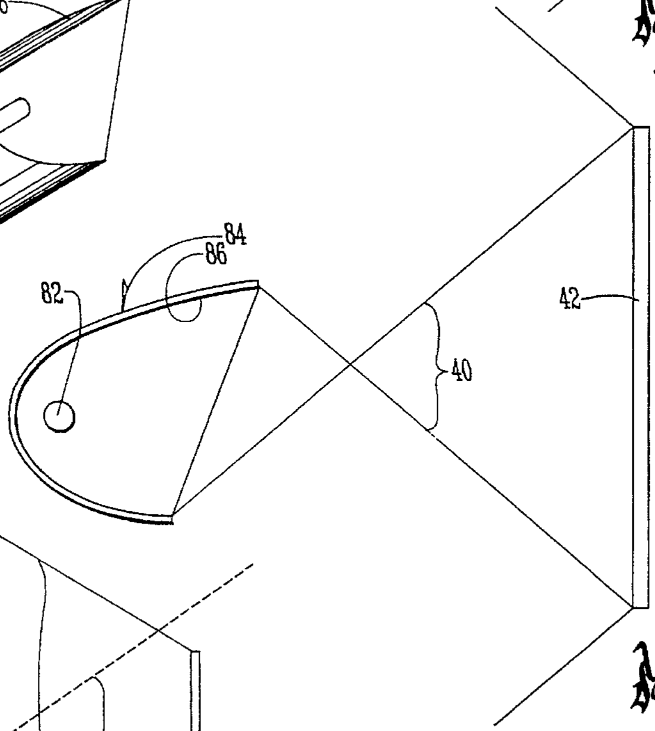

FIGS. 36A and 36B are similar to FIGS. 35A and 35B except that trough reflector 84 has a longer top portion 86 which will alter the beam pattern to secondary reflector 42 as shown in FIG. 36B.

Figure 37:
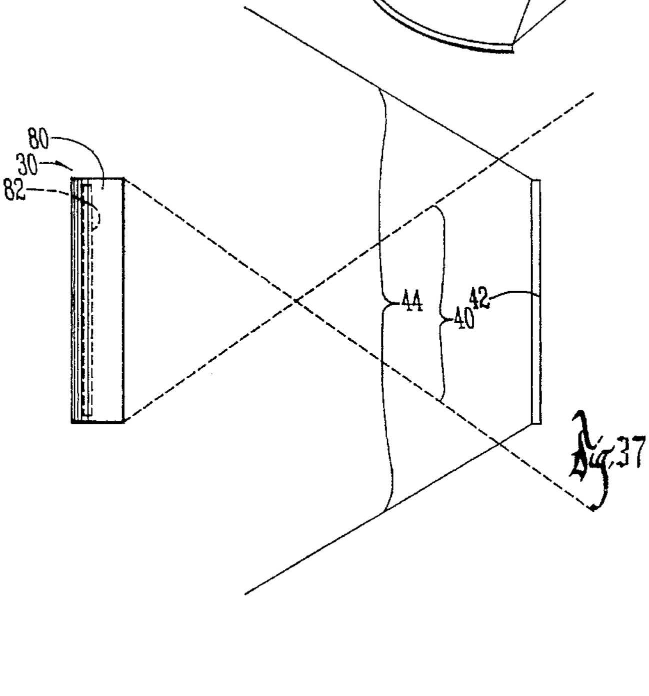

FIG. 37 shows how control can be gained of the horizontal output from a fixture like that shown in FIGS. 35A or 36B. Secondary reflector 42 can take a selected portion of light output of an asymmetrical light source and create a horizontal beam 44 having very defined limits not possible by simply using an asymmetrical fixture.

Figure 38:
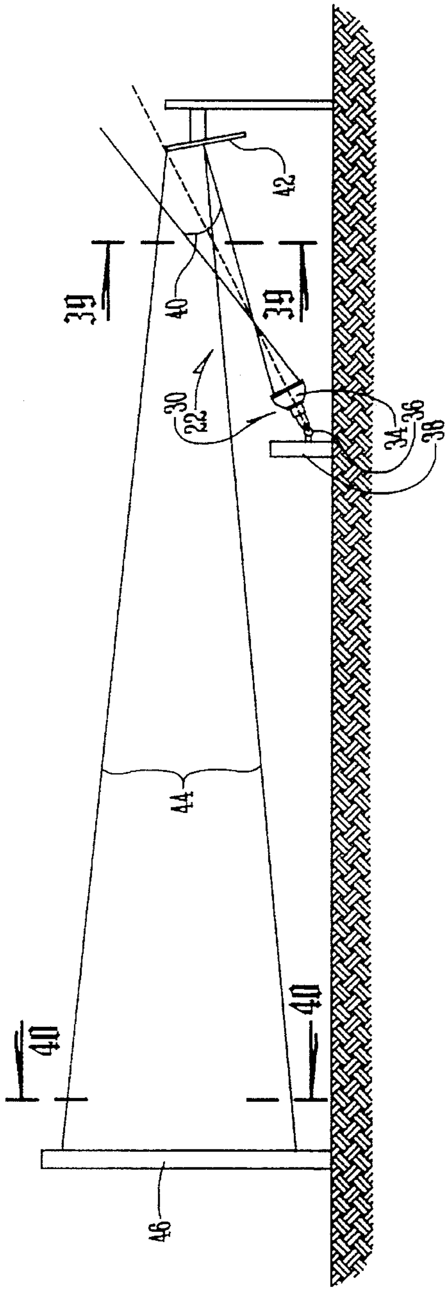
FIGS. 38–40 are diagrammatical views of a primary light source and a secondary reflector showing the reflection of only a portion of the primary light source from the secondary reflector.
Figure 39:
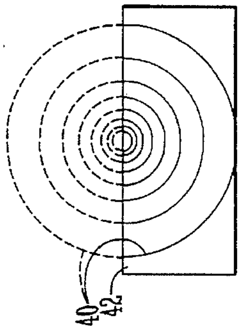
Figure 40:
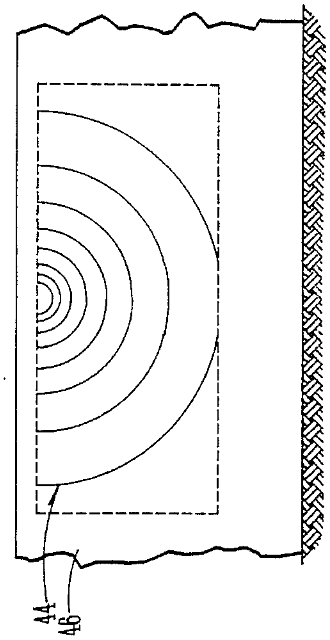

FIGS. 38–40 depict the ability of the system to utilize only selected portions of primary beam 40. In FIG. 38, light source 30 is shown directing a primary beam 40 to secondary reflector 42. As can be seen in FIG. 39, the primary beam 40 has a center portion which is of much higher intensity than outer portions. The center high intensity portion is directed to the very top of mirror 42 so that basically half of the beam impacts upon mirror 42. The top half of beam 40 therefore simply continues over mirror 42 and is not reflected (and therefore not used). It could be blocked or absorbed or simply allowed to continue on depending on whether it would cause spill or glare problems. The bottom half is reflected by mirror 42 in a shape shown in FIG. 40. Therefore, the high intensity portion of the secondary beam 44 would be at its top edge. This is the portion of secondary beam 44 that could be reflected, for example, the farthest distance away with the lower intensity portions of beam 44 being directed nearer. By doing so uniform lighting could be achieved across track 10 by utilizing the principle that light intensity decreases with distance. By selectively using these portions of the beam, different portions of the primary beam 40 can be utilized and directed to different areas.

Figure 41:
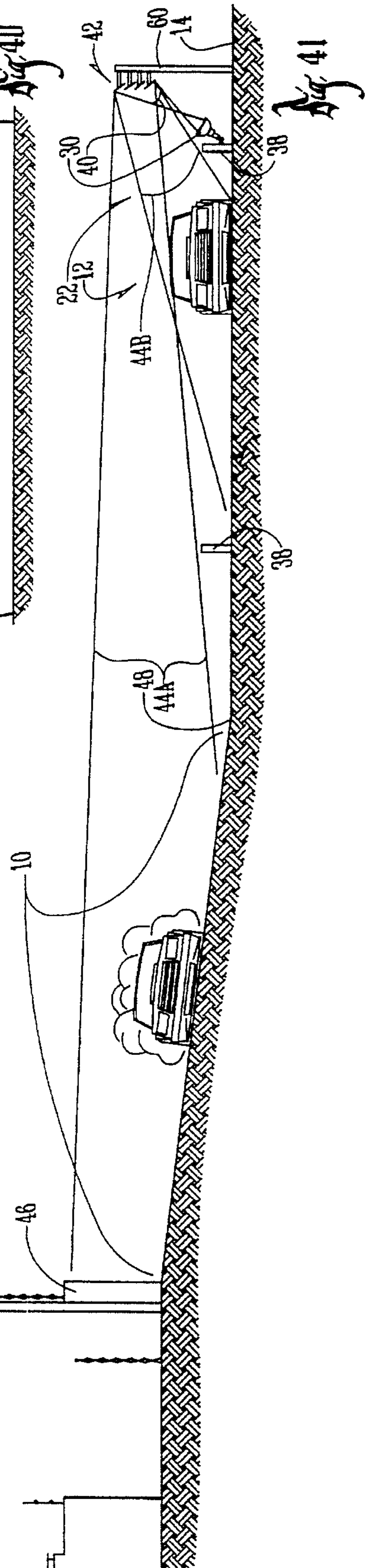
FIG. 41 is an elevational depiction of an alternative arrangement of primary and secondary reflectors, similar to those shown in FIG. 15.

FIG. 41 is an elevational view similar to FIG. 2 but illustrates the beneficial properties of the secondary reflector 42 similar to that shown in FIG. 15. As can be seen in FIG. 1, pit row 12 for the cars is in the infield 14 of the track 10. Pit row grandstand 20 (see FIG. 1) allows spectators to closely view cars while they pit in pit 12. By utilizing reflector 42K such as is shown in FIG. 15, the narrowly elongated panels 62 could be tilted appropriately to redirect light from fixture 30 in secondary beam 44A out to track 10. The side panels 69, on the other hand, could be tilted differently so as to direct light in a secondary beam 44B immediately downward to pit row 12 to illuminate the cars when in the pit. To accomplish this, normally a taller pole 60 would be used to elevate reflector 42K. This shows the flexibility of such a system and the ability to take selected light from a source 30 and direct it in a controlled manner to two distinct locations.

Figure 42:
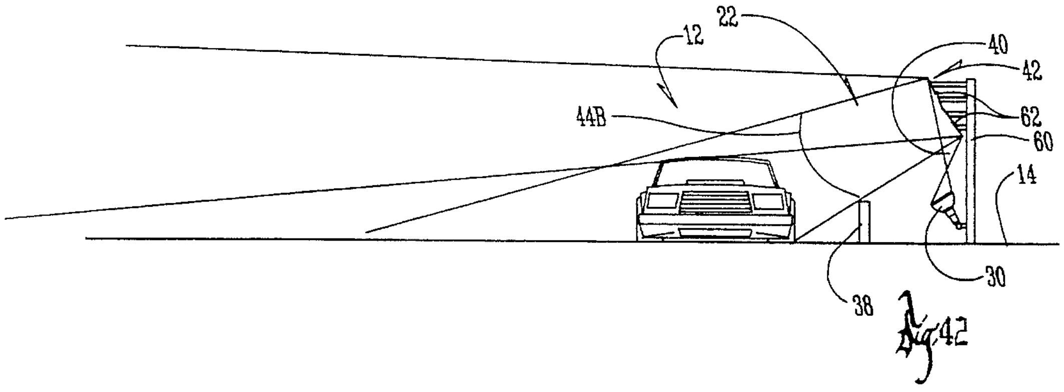
FIG. 42 is an elevational depiction of an alternative combination of primary and secondary reflectors for FIG. 41.

FIG. 42 simply shows an alternative configuration to accomplish what is shown in FIG. 41. A light source 30 could be attached directly to the bottom of the pole 60. Reflector 34 could be basically tilted almost straight up. Secondary reflector mirror 42 would be positioned almost 45° to horizontal. In this embodiment, mirror 42 would have individual segments 62 each tilted around its horizontal axis differently from one another. The top segments 62 would be tilted in such a manner to direct light in a secondary beam 44A out to track 10. One or more bottom panels 62 would be tilted to direct light in a secondary beam 44B to pit 12.

Figure 43:
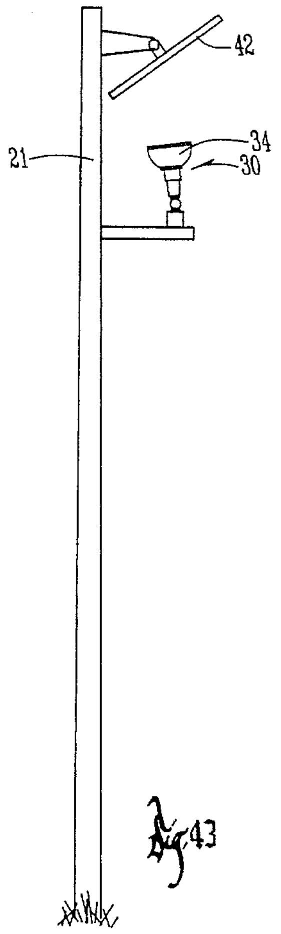
FIG. 43 is an elevational partial depiction of an alternative arrangement for primary and secondary reflectors according to the invention.

FIG. 43 is simply meant to illustrate that although the preferred embodiment utilizes light sources and secondary reflectors at or relatively near the ground, the system 22 could be installed at the top of a very tall pole 60 (such as many tens of feet tall). Similar to FIG. 42, light source 30 could be positioned below secondary reflector 42. The distance between these two components, their sizes and shapes, and other factors discussed in this description could then be designed to produce a secondary beam 44 according to desire from that high positioned top pole 60.

It can therefore be seen that the present invention provides a very flexible and beneficial way to accurately control light. It will be appreciated that the present invention can take many forms and embodiments. The true essence and spirit of this invention are defined in the appended claims, and it is not intended that the embodiment of the invention presented herein should limit the scope thereof.

The foregoing description emphasize that the light sources and secondary reflectors can be made of many different materials and in many different configurations. Additionally, a combination of light sources and secondary reflectors can be coordinated for a variety of different effects. The detailed description discusses the use of a plurality of systems 22 to provide uniform lighting for an entire NASCAR race track while precisely controlling light to diminish or eliminate glare or spill light outside of the track. The light energy contained in the secondary beams each covers a portion of the track. The secondary beams are overlapped in such a way as to completely cover the track and yet maintain a smooth, uniform lighting of the track and the space immediately above the track.

Additionally, the invention can be used to concentrate light in one or two planes respectively. In other words, light from one primary light source could be captured at least in part by a multi-segmented secondary reflector mirror, where each of the segments takes its portion of the primary beam and can overlay it with others of the sections so that a concentrated light intensity can be directed towards a target. Conversely, the segments could be utilized to spread the beam in one or two planes as required. These same types of effects can be utilized with two or more of the systems 22 using either planar mirror segments, or concave or convex shaped mirrors. FIG. 15 specifically shows that planar segments which are tilted from one another horizontally can be used to spread the beam out as desired. It can also be converged or otherwise reconfigured if needed.

The invention therefore provides a clear advantage of control of light from conventional lighting sources. If a primary lamp is used without a primary reflector, light emanates in all directions to present basically a spherical universally directional light energy which is difficult to control. If this spherical light energy is directed to a primary reflector, the light emanating from it is somewhat directional but issues in a generally hemispherical manner. This also is difficult to control exactly. With the present invention, the hemispherical light energy from the primary reflector impacts upon the secondary reflecting mirror which is spaced a distance away from the primary reflector. Therefore, the light striking the secondary reflector is relatively unilaterally directional which is much easier to control. The cumulative angles of the arc from the primary reflector to the secondary reflector, and of the secondary mirror to the primary reflector; with the ability to use multiple planars on a secondary reflector and overlay portions of the primary beam, or to converge or diverge the primary beam by use of convex or concave curves on the secondary reflector, allows a great degree of flexibility of control of the light. Additionally, the invention can utilize diffuse surfaces on the secondary reflector to generally enhance the spreading of the primary beam as it strikes the secondary reflector.

The invention therefore allows improved control of light in relation to cutoff of spill and glare light. The invention also has the advantage in that it increases energy efficiency by greater utilization of the light energy from the primary light source. For example, if only 10° of the beam from the primary light source would otherwise have been utilized on the target area, the present invention could, for example, redirect 20° of the primary beam from the secondary mirror and by use of multiple planes on the secondary mirror or curvature of the secondary mirror, can form the secondary beam into a 10° angle which would be applied to the target area while still providing the benefits of cutoff and spill and glare control. Thus, more of the available light energy would be applied to the target area through use of the secondary reflector than otherwise would have been applied with a primary reflector only.

The present invention thereby provides a system for lighting which can be used for relatively large areas at distances substantially remote from the secondary reflector. These areas can be lit with a high degree of control as to spill and glare light, as well as directional light. Additionally, greater portions of light energy can be directed to the target area than would be possible with a conventional light source and primary reflector only.

Still further, unwanted portions of the primary beam can be blocked or absorbed to prevent light energy being transmitted to undesired areas, or to utilize only portions of the primary beam as desired.

It is important to understand that while the preferred embodiment described herein applies to utilizing systems 22 for high intensity wide scale lighting at a remote distance, the principles of the invention can also be applied to quite different circumstances. For example, very small light sources of even fractions of an inch in diameter could be utilized with very small secondary reflectors positioned a small distance away from the light sources.

An application of a more intermediate scope would be utilization of this arrangement with regard to automobile headlights. A very controlled well defined headlight beam could be created which could greatly diminish or even eliminate glare and spill light. Such a result would be very beneficial for highway safety.

It is also to be clearly understood that part of the flexibility of such a system is the ability to customize individual light sources and secondary reflectors for different purposes. Not only does this apply to shapes, sizes, and distances, but also to the type of light source used, the type of primary reflector used, and the type of secondary reflector used. Included in this would be the characteristics of the reflecting surfaces of the primary and secondary reflectors. As previously mentioned, they could be specular, diffuse, or something in between. The differences in the reflecting properties could exist from section to section of any of these reflectors.

Also, included in this can be the add on features previously discussed such as visors and blocks on the primary light source 30. Also, surfaces of any of the components could be blocked or made to be absorbing by placement of an insert or by painting or otherwise making that surface light absorbing rather than reflecting.

As an example, one way to achieve a very flat definitive top of a secondary beam 44, for example, to use with the race track embodiment, would be to utilize a light source 30 such as is shown in FIG. 4 with a visor and a light block. The light block 37 in the bottom of the visor 35 relative to lamp 33 and reflector 34 would limit the amount of light from the bottom of reflector 34. This in turn would limit the amount of light and the angle of light received at the top of secondary reflector 42; in turn cutting it off to the target area—in that case being the outer wall of the race track.

Therefore, the fundamental principles of the present invention impact upon the ability to control and cut off light as well as the ability to improve the efficiency of use of light. The invention allows the utilization of light which otherwise would have been spill light. It allows selective reconfiguration of a primary beam to reduce or eliminate spill and glare. It allows the cutoff of light in such ways to improve the efficiency of light by being able to control the intensity of the source with respect to the target. It also allows selection and reconstruction of the primary beam into a secondary beam that may be larger or smaller, greater or lesser, in luminance intensity, or different in shape or direction.

To highlight these advantages, a brief description of the specific application of the method and the means of the invention will be discussed with regard to race track 10. Such a discussion can show the advantages and the ability to cut off and define light, efficiently use light, and control the intensity of light.

FIG. 1 shows that systems 22 are disbursed around track 10, with special orientation with regard to pit row. In the preferred embodiment the preferred form of reflector 42 is one having four horizontally elongated segments with each segment disposed in generally a plane. Any segment is tiltable with respect to that plane. Two foot in diameter round-faced reflectors are placed on or near the ground by the inner guard rail. Some issue symmetrical beams towards mirrors 42, others are configured to issue asymmetrical beams. The mirrors 42 are generally four foot tall by six foot wide, although some are different for different purposes. They are placed generally ten feet away from the primary reflectors.

These systems 22 must light banked track 10 which is approximately 50 foot wide. The outer wall 46 of track 10 is approximately 100 feet away from the inner guard rail and primary reflector. With regard to the pit rows systems 22, track 10 may be even farther away (about 300 feet away). The outer fence 46 is approximately four foot tall.

At this point it is important to emphasize that one of the advantages of the invention is the fact that systems 22 can be basically placed at or near the ground. This eliminates many viewing problems for spectators and television or film coverage. It also eliminates some of the design, construction, and installation problems associated with placing lighting sources on top of tall poles. It also impacts very favorably on maintenance on these fixtures.

It can not be underestimated how systems 22 according to the invention can be flexibly adapted to function where conventional fixtures would not adequately function because of physical limitations or other factors. The preferred embodiment of the invention gets the lights basically out sight while also taking care of glare and spill problems. Moreover, the present invention actually allows a gain in efficiency for the lighting even though it is applied to the target from at or near the ground and over a long distance.

The beam from the primary reflectors can be between 25° and 30° wide. The primary reflectors are directed towards the secondary reflectors. However, not all of the light energy from the primary light source is necessarily utilized by the secondary reflectors. Selected portions are used, redirected and/or reconfigured. Undesired portions are blocked, absorbed, or simply not used.

Each primary and secondary reflector combination is adjusted to produce the desired lighting. One way to do this is to place the primary light source in position, construct the secondary reflector in a general configuration, and then individually tilt the individual segments of the secondary reflector until the highest point of the reflected light energy from the secondary reflector of each segment goes no farther than the top of the outer wall 46 of track 10. By doing this one assures that there will be no spill or glare light outside of track 10. Then, because each segment of the mirror 42 is vertically at different heights than other segments with regard to the light source 30, the angle of reflection for the various portions of each segment will spread light down from the top of wall 46 and across track 10 towards its inner edge. By basically using the different segments in this manner, the primary beam will actually be somewhat overlaid to additively send light energy towards the outer wall 46 of the track. Because wall 46 is farther away, and because light energy diminishes over distance, this actually will produce the advantage of producing a relatively uniform light level across the track.

Not only does the vertical height of the mirrors 42 and control vertical cutoff of light, the horizontal width also allows control of the horizontal spread of the light energy. Therefore, by using six foot wide secondary reflectors 42, secondary beams 44 can be spread out a significant distance along track 10. In the preferred embodiment, four hundred systems 22 are spaced apart around one and a half mile track 10. They are spaced every 15 to 20 feet. As previously described, some angular orientation of mirrors 42 with respect to light sources 30 are made so that there is no glare both to the spectators and to the drivers as they proceed around the track. Some overlapping is also done with each of the secondary beams to create the desired intensity of light through the space at and above the track 10.

The pit row systems 22 allow placement of some light directly on the pit row as well as back out to the track 10. In this case, secondary reflectors 42 are placed on 15 foot high poles so that they are farther away from light sources 30 to create a narrow secondary beam to track 10, as well as put directly down on the cars in the pit 12.

Some of the fixtures are customized by using specific types of blocks, visors, or black paint for various purposes. Some of the reflecting surfaces are varied in specularity. Some of the systems 22 are configured to overlay light to a certain location and to increase the amount of light to that location over what would be possible with a conventional fixture. Others are adjusted so as to spread the light.

These components of systems 22 can therefore be adjusted to adjust the secondary beam with regard to distance, size, and intensity. By considering the factors associated with the invention, one can basically predict what sort of beam is needed and what sort of beam can be produced. It is again emphasized that the precise control of the beams with the invention can allow virtual cutoff of light in any direction. In this case, over a 100 foot distance to the outer wall 46, there would be approximately 95% change in light intensity over one foot or less. Thus, the track could be fully illuminated whereas spectators in the first row behind retaining wall 46 would have virtually no light fall on them. Additionally, the invention allows control of glare for the spectators and drivers.

Some of the specific factors that can be used when designing each system 22 are as follows. The shape of the secondary reflector can change the primary beam. If concave it reduces the image of the primary light source. If convex it expands the image. If flat it generally reproduces the image. A segmented flat secondary reflector allows alteration of the direction of the image of the primary source for each segment. Still further, by using various curvatures of convex and concave nature for the secondary reflector, systems 22 can direct various parts of the primary beam to be spread out or concentrated to targets by specific design. Secondary mirrors or any segmented portion thereof can be adjusted about vertical or horizontal axes, or any combination thereof. Flat and curved sections can also be combined in a secondary reflector.

In selecting the size of the secondary mirror, it is to be remembered that size of that mirror has the following affect. The wider the mirror the bigger the angle of contact with the primary light beam. As can be understood, as one moves to different points of location on the secondary reflector, the angle light is received at that point from the primary light source changes. Therefore, the angle of light received from a primary reflector 34 at the opposite edges of the six foot width of a secondary reflector would be different than the opposite edges of the four foot height of the secondary reflector, if the aiming axis of reflector 34 were directly in the center of the secondary reflector.

Other examples of the adaptability and flexibility of the present invention are described below with respect to FIGS. 44–49.

Figure 44:
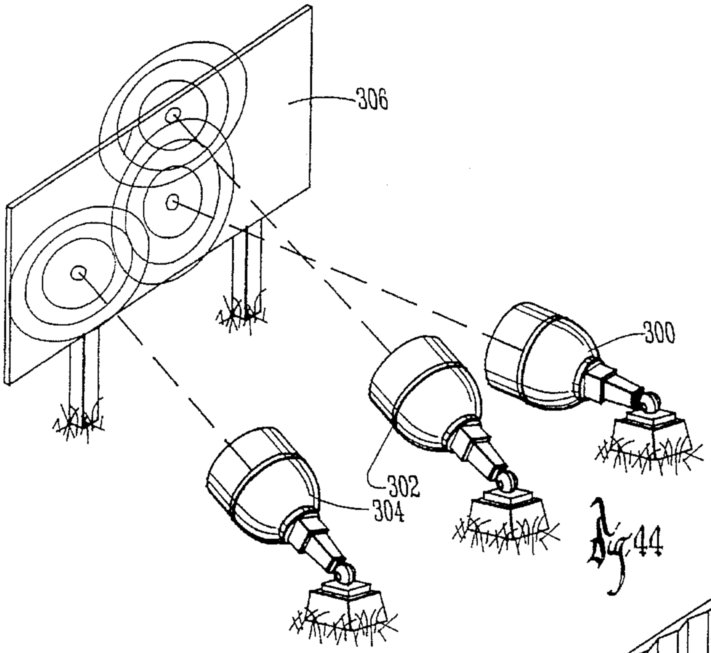
FIG. 44 is a perspective depiction of multiple light fixtures utilizing one secondary reflector.

FIG. 44 illustrates the primary light sources 300, 302, and 304. A secondary reflector 306 is spaced apart from sources 300, 302, and 304. Multiple light sources therefore can utilize one secondary reflector. Light energy from the primary sources can be directed to certain locations on secondary reflector 306 to either reflect light to substantially independent areas, or the light energy can be overlapped to more or less combine light energy to the same area. The relative relationship of distance, angle, and placement of beam of sources 300, 302, and 304, on secondary reflector 306 will determine the type of light output from reflector 306. These concepts have been previously described.

This arrangement increases the flexibility of the invention. A plurality of light sources without modification can use reflector 306 and its light controlling properties. This is an economical and efficient use of light.

Figure 45:
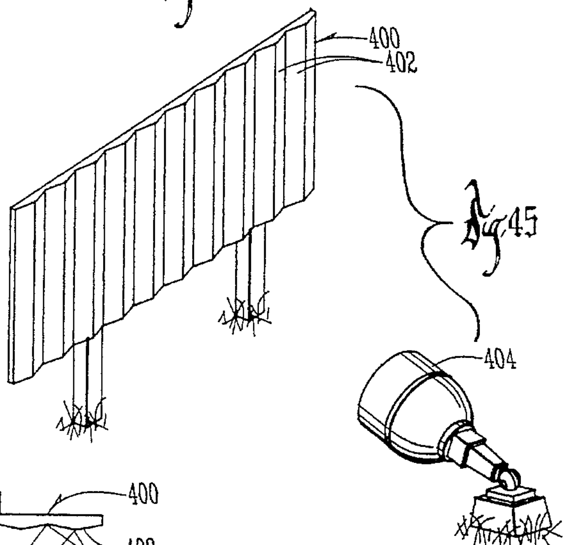
FIG. 45 is a perspective depiction of an alternative embodiment for the structure of the secondary reflector.
Figure 46:
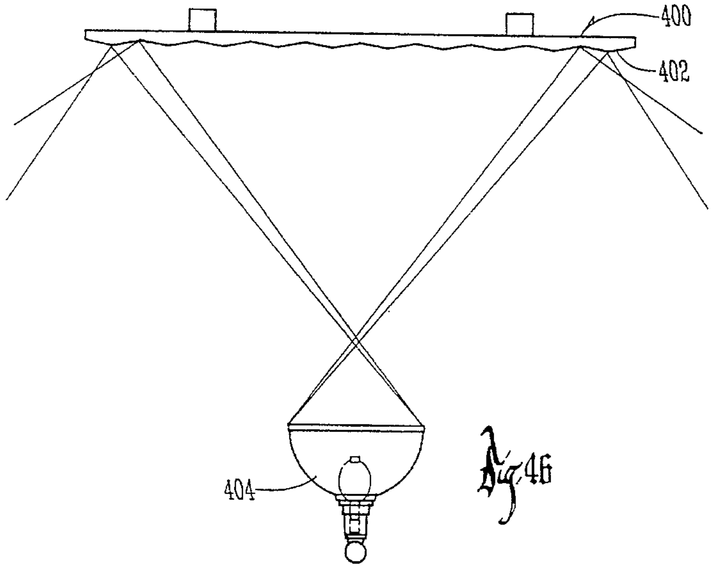
FIG. 46 is a top view of the embodiment of FIG. 45 also illustrating how some of the light from a lighting fixture would be redirected by that secondary reflector.
Figure 47:
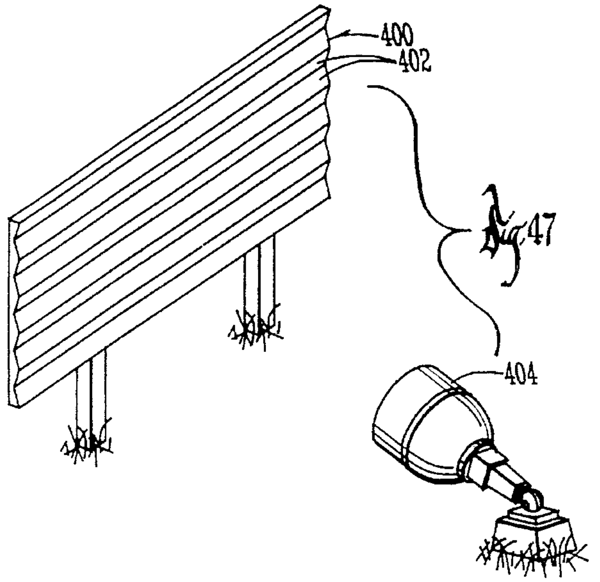
FIG. 47 is a perspective depiction of a secondary reflector similar to FIG. 45.

FIGS. 45–47 depict an alternative form for secondary reflector. In FIG. 45 secondary reflector 400 has a reflecting surface 402 (can be diffuse, specular, or anything between). Surface 402 is basically corrugated to provide alternating ridges and groves. In this configuration every other vertical panel surface 402 is directed one way. Intermediate panels are directed in another. Light from fixture 404 would then be reflected substantially in two directions. By making surface 402 substantially diffuse, a specific type of light output can be created from reflector 400. If substantially specular, a different light output can be created. Reflector 400 would still allow a good control of reflected light such as been previously described.

FIG. 46 simply shows in diagrammatical form how surface 402 would affect light from fixture 404.

FIG. 47 simply illustrates that the corrugation can be vertical instead of horizontal if desired.

Figure 48:
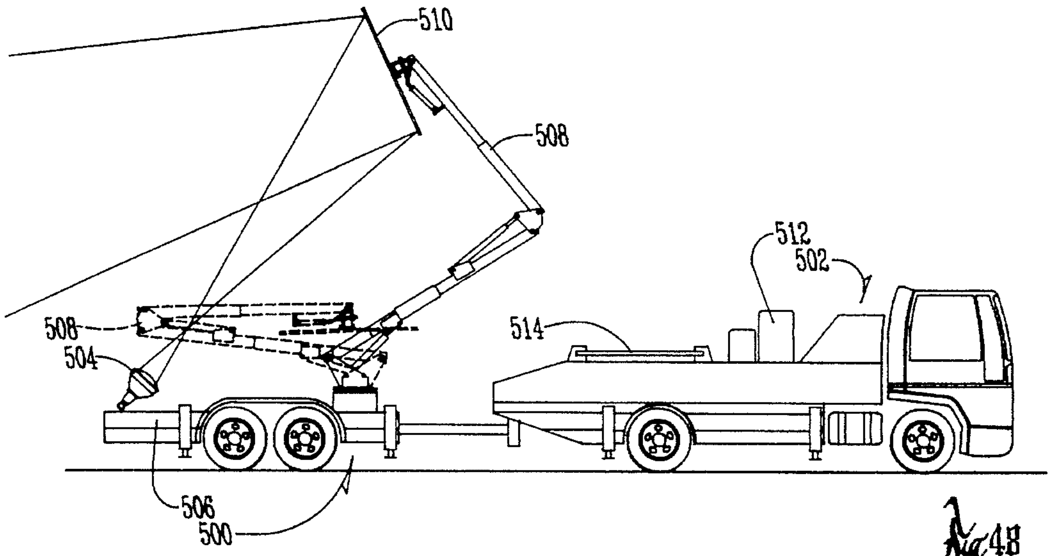
FIG. 48 is a perspective depiction of a portable lighting system according to the present invention.

FIG. 48 illustrates another advantageous and flexible configuration for the present invention. Trailer 500 hitchable to a vehicle 502 can portably carry a lighting system according to the present invention. Lighting fixture 504 could be secured to the bed 506 of trailer 500 and be easily manipulatable. It can also be substantially protected from damage. An extendable arm 508 can also be anchored in bed 506 and have secondary reflector 510 attachable to its outer end. As shown in ghost lines in FIG. 48, the system can be transported by folding arm 508 and securing arm 508 and reflector 510 to the trailer 500. Once in position, arm 508 can be manipulated to elevate reflector 510 to desired orientation, fixture 504 can be oriented and powered from a generator 512, and highly controllable lighting can be provided.

As described elsewhere, a primary advantage of this system would be the ability to control glare and spill light. This could be highly valuable for example in highway construction portable lighting. The high level of light could be directed to repair work on one half of the highway while cutting off any light to the other half of the highway. This would eliminate spill and glare light which can be very dangerous to cars traveling at highway speeds with construction workers and equipment only several feet away.

FIG. 48 also shows an alternative secondary reflector 514 carried in vehicle 502. This is simply to indicate that such a system could allow for quick interchangeability of secondary reflectors for different lighting affects. Fixtures 504 could also be interchangeable. Additionally, the distance between fixture 504 and secondary reflector 510 can also be changed to affect the reflected light from reflector 510.

It is to be understood that alternatively the system of FIG. 48 could be instead placed on the bed of a truck, or on some other supporting surface. Still further, it is to be understood that this embodiment would be useful for many different things. Other examples are the lighting of golf courses. By eliminating tall poles, glare from elevated fixtures to other fairways would be eliminated. Other examples are temporary lighting of soccer fields or other athletic fields. Still further, the system could be used for temporary lighting of parking lots to eliminate or greatly diminish glare problems for traffic on adjoining roadways or businesses or houses nearby.

Figure 49:
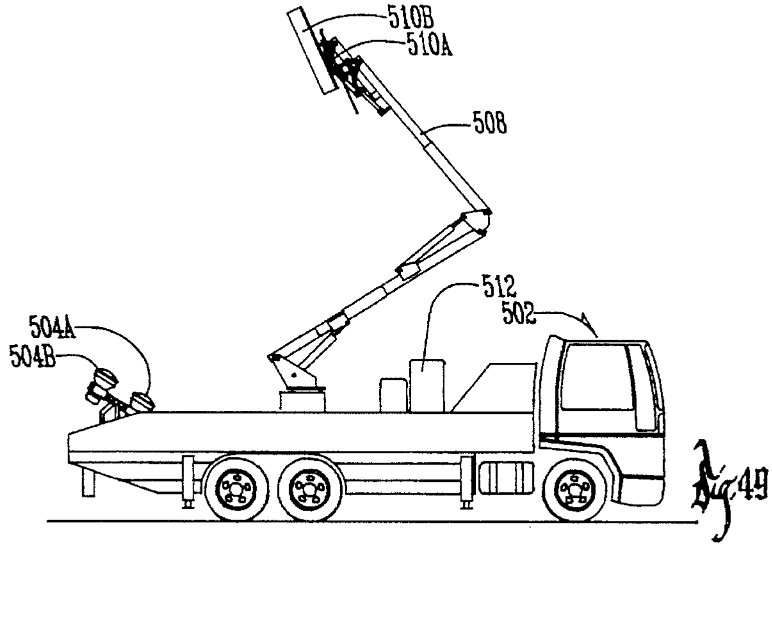
FIG. 49 is a perspective depiction of an alternative embodiment similar to that of FIG. 48.

Still further, as shown in one fashion in FIG. 49, the same concept with regard to a moveable trailer such as with FIG. 48 can be used with either multiple secondary reflectors 510 A & B and/or multiple lighting fixtures 504 A & B. The fixtures and secondary mirrors could be independently configured and moveable to create illumination in different ways of different areas or the same area. Still further, mirrors and fixtures could be interchanged with other mirrors or fixtures to create different lighting effects. Various combinations of types of secondary reflectors and lighting fixtures, including but not limited to those specifically disclosed in this detailed description, can be used in various configurations or ways according to the invention.

Following will be a discussion of various enhancements, options, and alternatives that can be utilized with the basic concept of utilization of a primary light source and a secondary reflector.

For ease of understanding, throughout this description the same reference numeral or letter will be used to identify substantially similar components. For example, all light poles will be referred to as "P". All primary light sources will be identified by "L". All secondary reflectors by "R".

1. Highway Lighting

Figure 50:
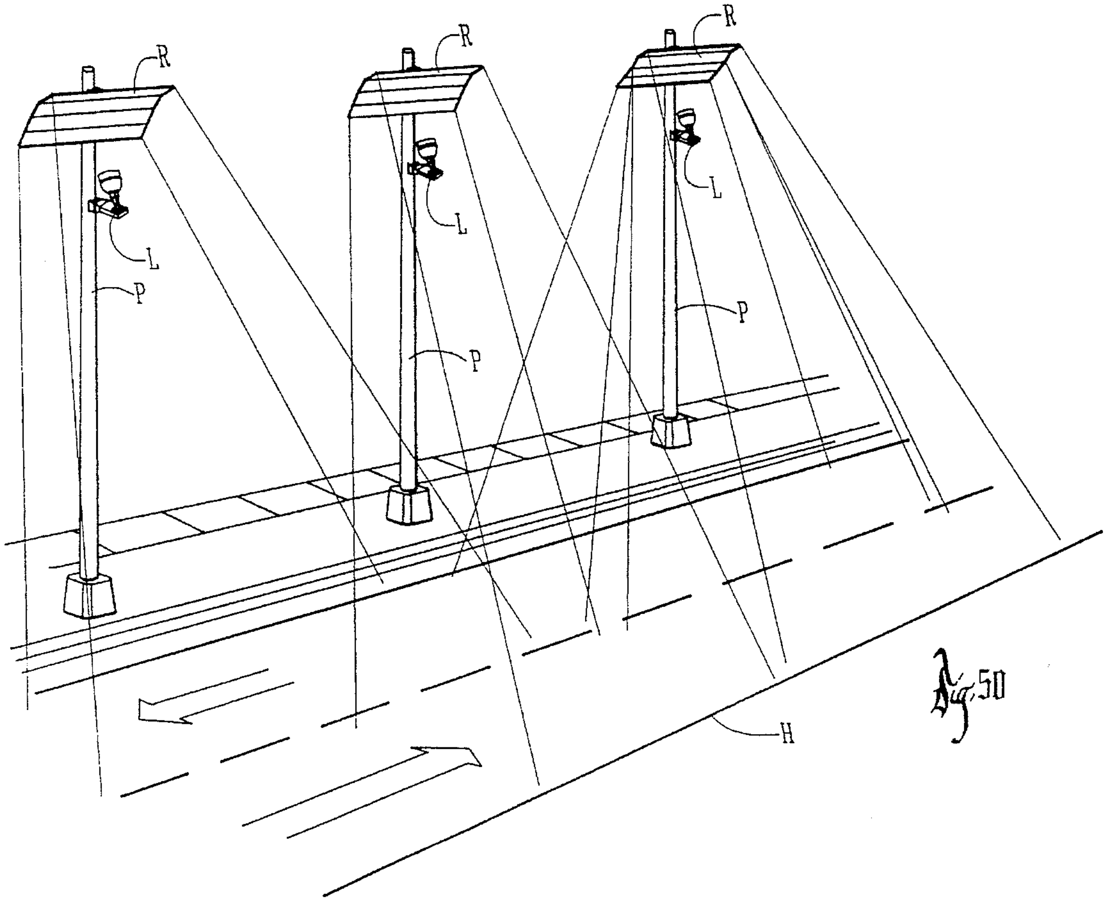
FIG. 50 is a perspective view of an embodiment of the invention utilized for street lighting.

FIG. 50 illustrates the utilization of a plurality of poles P along a roadway H having two lanes. Each pole P has a light source L and secondary reflector R elevated along its vertical height. As can be seen, reflector R can be configured to precisely and control light from fixture L to desired portions of road H.

Figure 51:
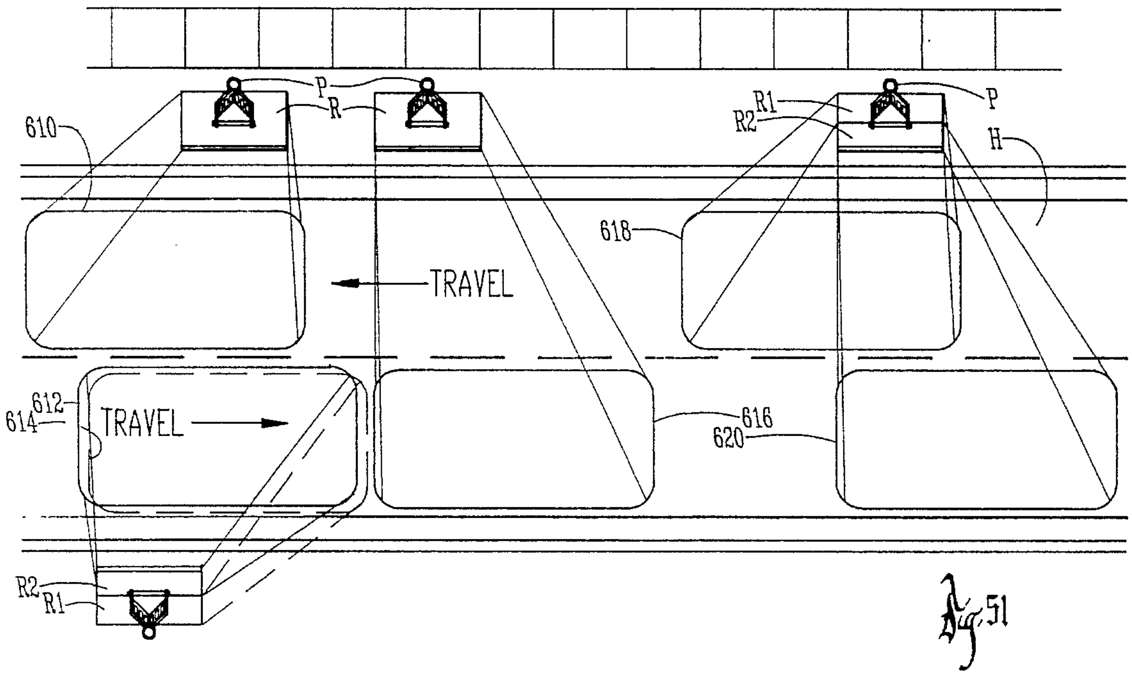
FIG. 51 is a top plan view of the lighting system of FIG. 1 illustrating lighting patterns projected onto the roadway.

FIG. 51 shows how, depending on the configuration of components L and R, light can be either directed to one side, the other side, or both sides of road H.

As explained previously in this application, the utilization of light source L and a secondary reflector R can achieve very precise control of light. Light from these fixtures for lighting the street therefore could have very carefully defined boundaries. The light issuing from each pole could therefore be controlled to light only roadway H and eliminate any significant degree of light falling or spilling outside roadway H. This in turn would allow most cases more efficient use of light. Without significant spill light, the dark areas outside of roadway H would contrast better with the lighted roadway H. Therefore, less amounts or intensities of lights for any given location may be needed. Generally less amount or intensity of light decrease the amount of power utilized and therefore increase the economy of such a lighting system.

Still further, with such precise lighting requirements, economies may be achieved by reducing the amount of light fixtures, the height poles or the spacing between poles (may be able to be increased).

It can be seen in FIG. 51 that precise control of each fixture can allow not only precise cut off but projection of the light in an advantageous direction. As shown in FIG. 51, the top left most lighting fixture could project light in a pattern 610 that eliminates the right side of the road but also is projected away from or along the direction of travel of cars on the right hand of highway H so that no light will be entering the eyes of those drivers and yet the beam will be cut off at the center line and not enter the eyes of oncoming traffic. The middle top most fixture on the other hand could direct light to the opposite side or lower side of highway H in a direction with the flow of that traffic. The right top most fixture shows that one fixture could project light to both sides of the highway in the appropriate directions out of the eyes of either lane.

The bottom left most fixture of FIG. 51 shows that one fixture could also use first and second secondary reflectors R1 and R2 to essentially overlap portions of or most of beam 612 and 614 over one another to increase the intensity of light at a given area of the highway, all while precisely controlling light. The precise control and cut off of light would also minimize the amount of light that would be bounced off the pavement to create glare.

Figure 52:
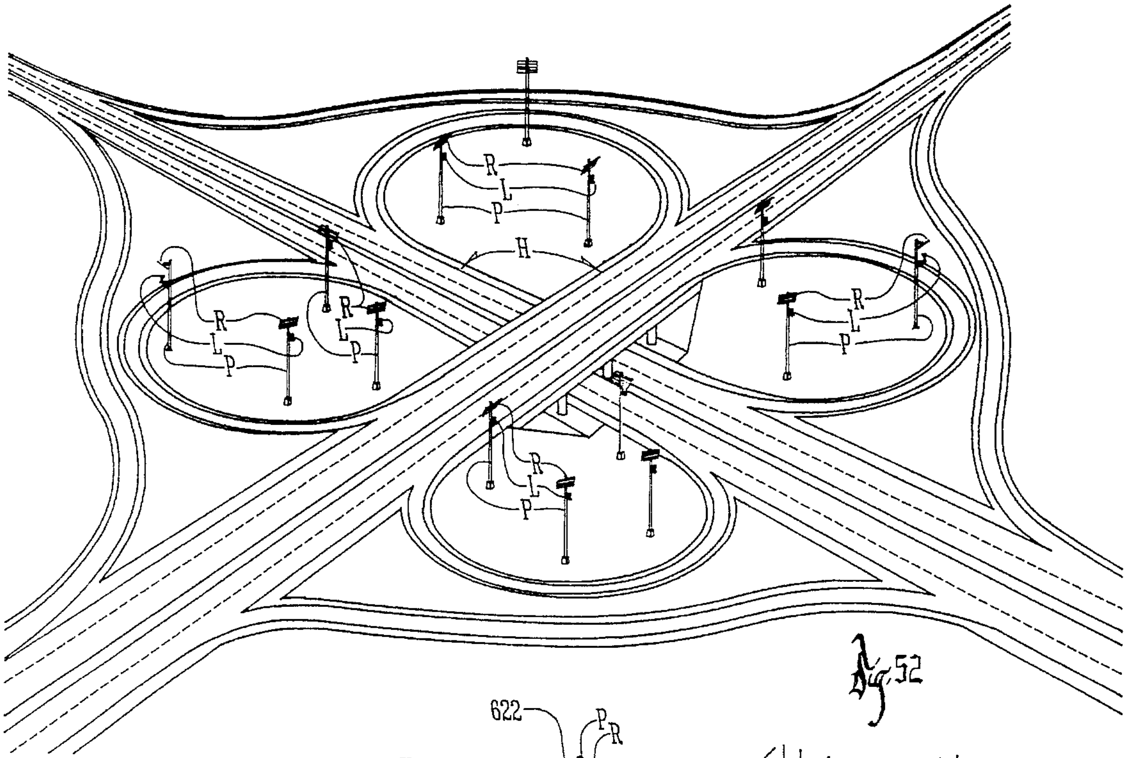
FIG. 52 is a perspective view of a highway interchange illustrating utilization of lighting structures according to the present invention.
Figure 53:
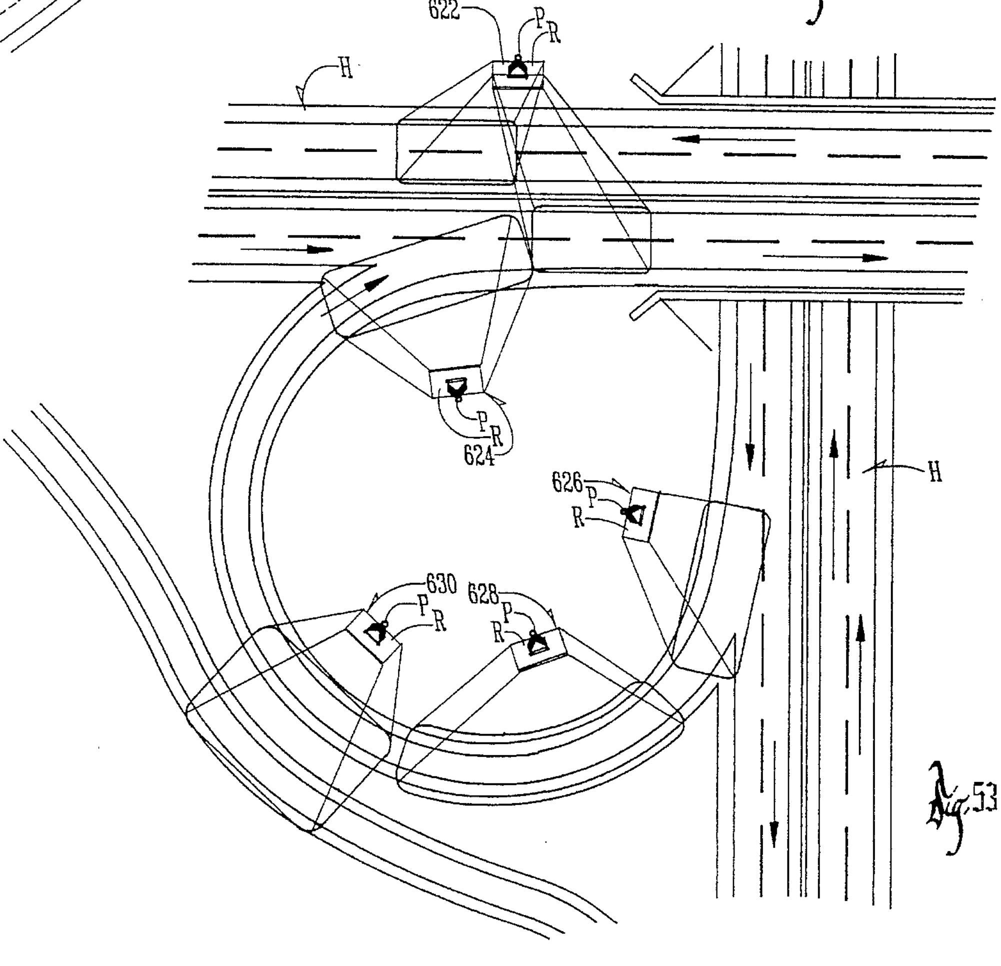
FIG. 53 is an enlarged partial top plan view of FIG. 52 illustrating the light patterns for several of the lighting fixtures.

FIGS. 52 and 53 show an application of this type of structure to an interchanges or road H. The prior art typically uses a large number of lighting fixtures to basically cover the entire interchange (both roadways and adjoining areas) in light. Therefore, there is not a high contrast between the roadway and the areas adjacent to the roadway. Consequently, a higher level of light must be generated to allow safe driving.

In the embodiments of FIGS. 52 and 53, light sources L and secondary reflectors R according to the present invention can be used to direct light and control it so that it is projected precisely to portions of the interchange roadways. Substantial reduction of spill light to areas adjacent of the roadway would allow motorists to sharply discern the roadway versus areas adjacent to the roadway. This in turn would allow less light energy to be used for safe lighting of interchange.

As can be seen in FIG. 53, lighting fixtures could be used as needed to light opposite sides of highway H while retaining precise cut off and control of light but aiming light in the direction of the respective direction of travel each side of the road (see Reference numeral 622). Alternatively, as with FIG. 6 fixture 624, a portion of highway H and a portion of the exchange ramp could be lighted. Fixture 626 shows a similar situation where light is directed in the direction of travel for both the main highway and an off ramp. Fixture 628 shows that light could be flexibly manipulated such that it could be controlled to follow a precise curve of an off ramp. This could be accomplished by varying the shape of the secondary reflector and adjusting the orientation and distance between the light source and the secondary reflector. Fixture 630 shows that sections of two parts of the interchange could be lighted by one fixture.

2. Sign and Building Lighting

Figure 54:
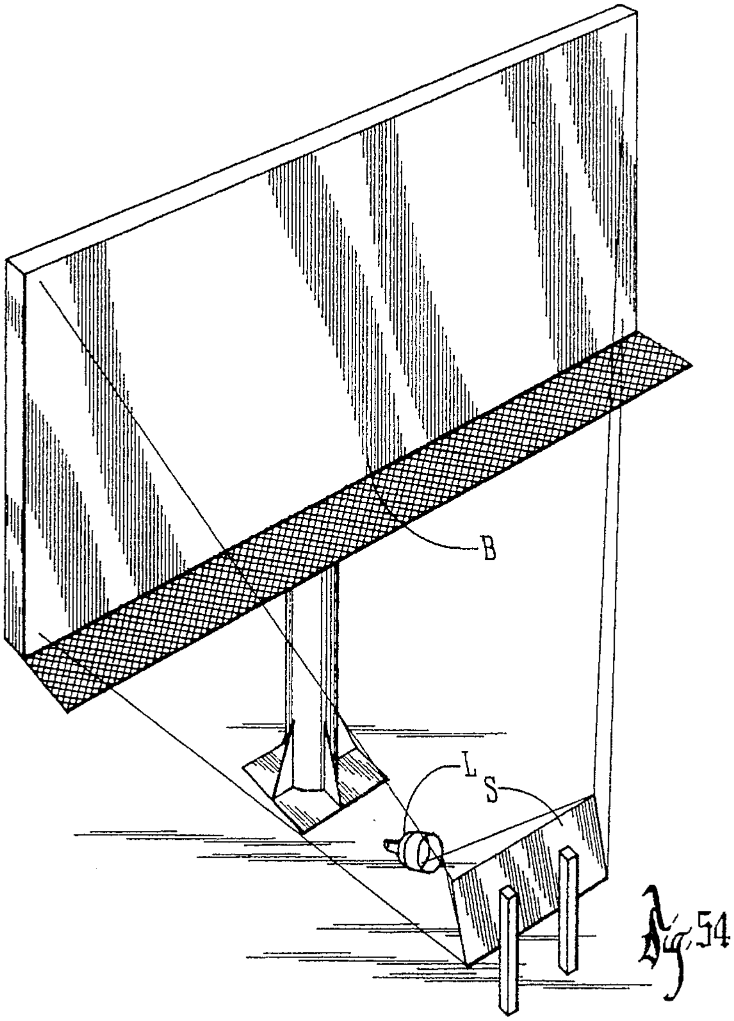
FIG. 54 is a perspective view of a lighting combination according to the invention utilized for lighting a billboard.

FIGS. 54–58 depict various embodiments for lighting billboards. In FIG. 54, light sources L and secondary reflectors R can be positioned near or on the ground to control light to illuminate billboard B without spill light or glare.

Figure 55:
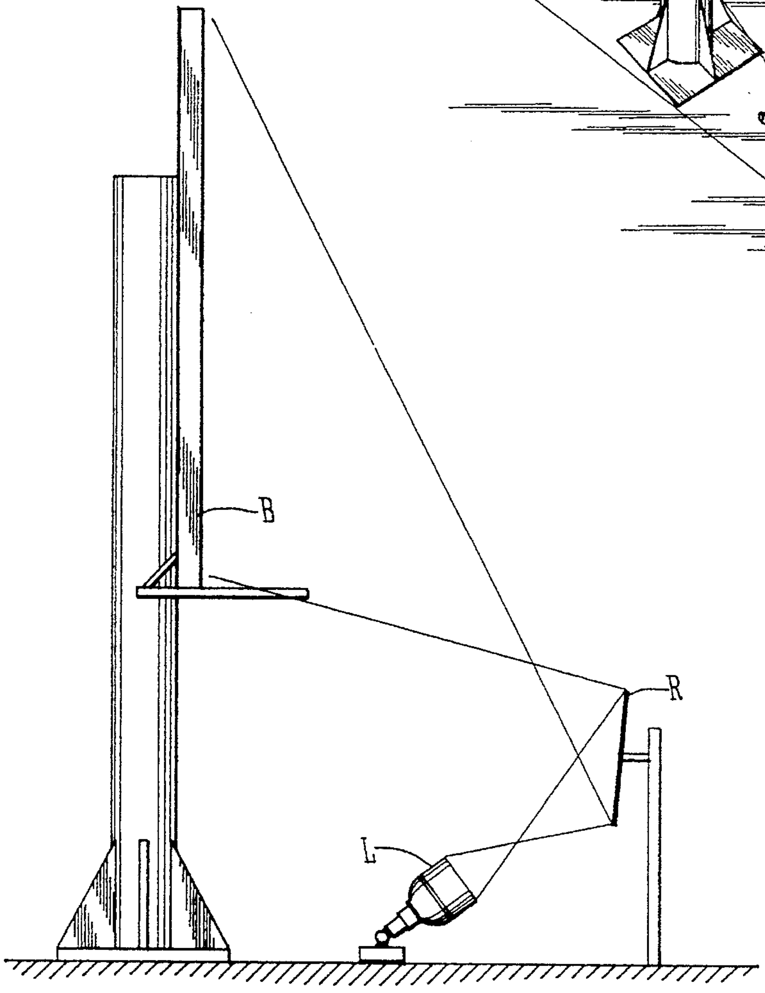
FIG. 55 is a side elevation view of FIG. 54.
Figure 56:
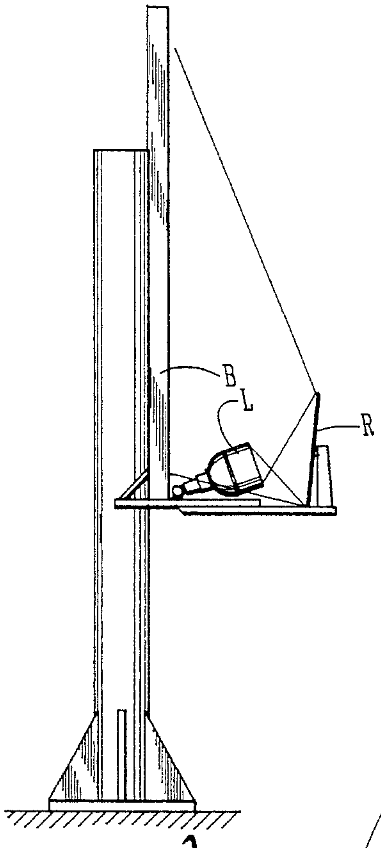
FIG. 56 is similar to FIG. 55 except showing the lighting source and secondary reflector mounted partially up the billboard.

FIG. 55 is similar to FIGS. 54 and 56 except that light source L and secondary reflectors R are placed on structure on billboard B.

Figure 57:
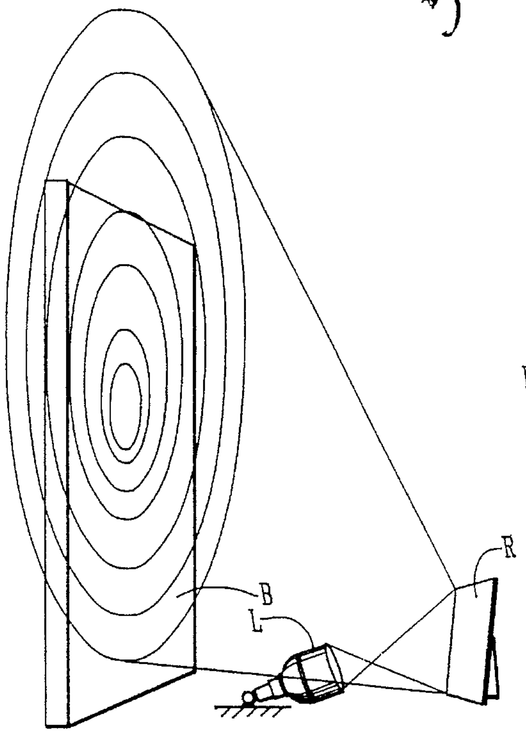
FIG. 57 is a perspective view of an embodiment of the invention illustrating the ability to control placement of light energy on a large structure such as a billboard.
Figure 58:
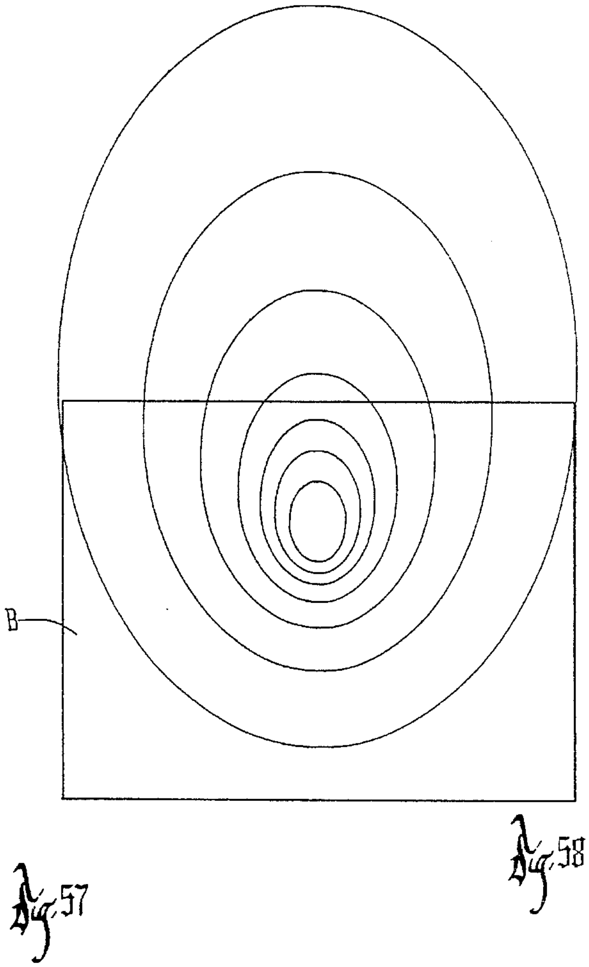
FIG. 58 is a front elevational view relative to FIG. 57 showing a beam pattern possible with the present invention.

FIGS. 57 and 58 simply illustrate that the highly controllable nature of light from the combination of light source L and reflectors R can be used to project different lighting effects on billboards B. In FIG. 57, the center and most intense part of the light beam from reflectors R is generally centered on billboards B. In FIG. 58, however, it is centered somewhere near the top of B. Sufficient amount of light then passes over B, but this allows flexibility and lighting effect for these systems.

Figure 64:
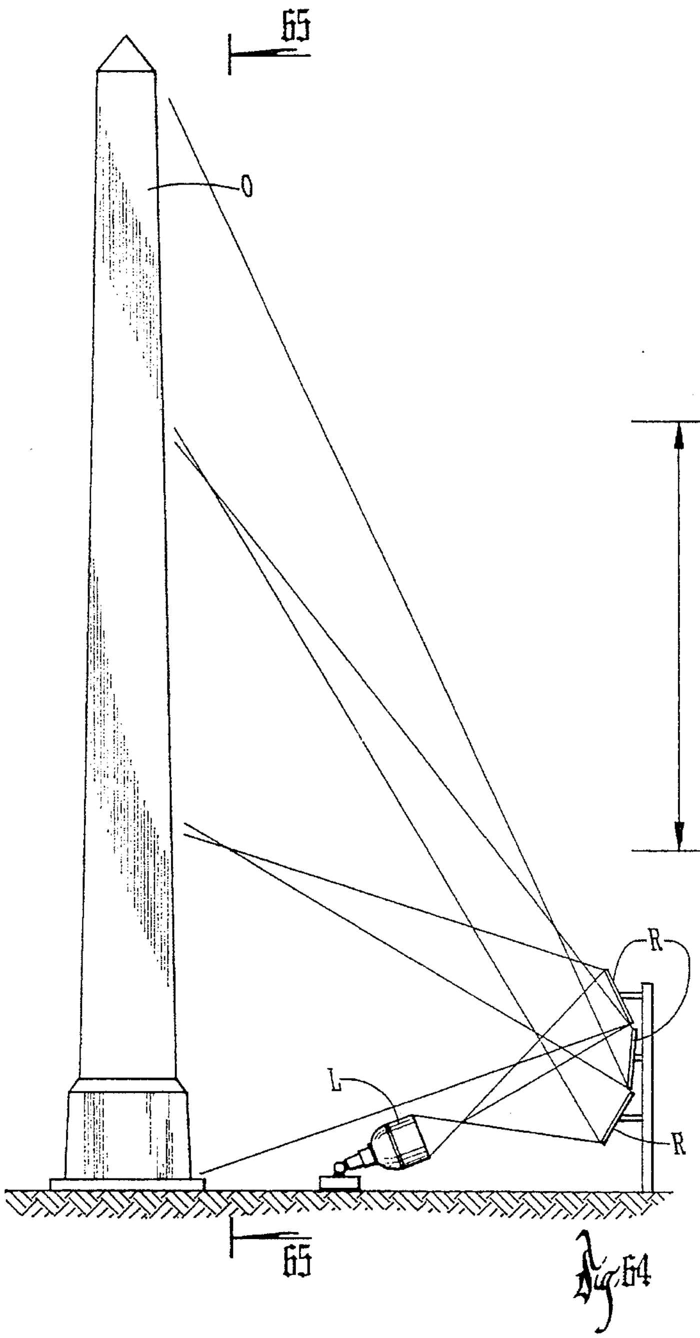
FIGS. 64 and 65 depict utilization of lighting devices according to the present invention for lighting large or tall objects, such as a building.
Figure 65:
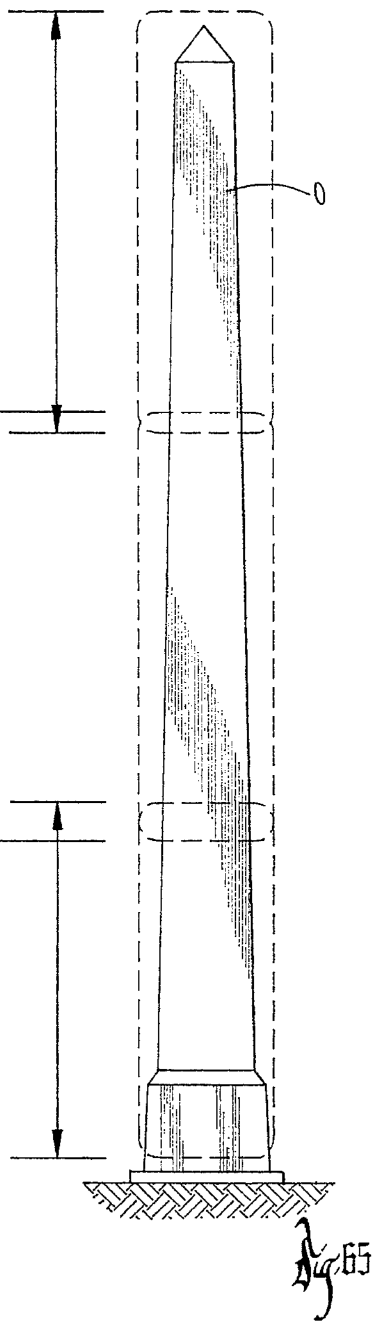

FIGS. 64–65 illustrate utilization of L and R with regard to lighting a tall building O. By projecting the central most intense portion of the beam the farthest distance up the building, a more uniform lighting of the building can be achieved. Additionally, utilizing the combination of L and R would allow precise control of lighting.

As can be understood, utilization of secondary reflectors are which issue a very controlled vertically narrow beam could advantageously light building O with no or a minimum amount of stray light. As can further be understood, by utilizing secondary reflectors segments R, the most intense portion of the beam from light source L could be directed the farthest distance away (towards the top of building O) while the less intense portions of the beam from light fixture L are directed to the closer portions of the building. This would assist in evening out the intensity of light all along the building even though the top of the building O could be many hundreds of feet away from light source L whereas the bottom of the building O could be only 10s of feet away. So further it could be understood that segments of secondary reflector R could be used to consolidate or overlap light for example towards the top of building O to even out light along building O even though only one light source L is used.

3. Up Lighting

Figure 59:
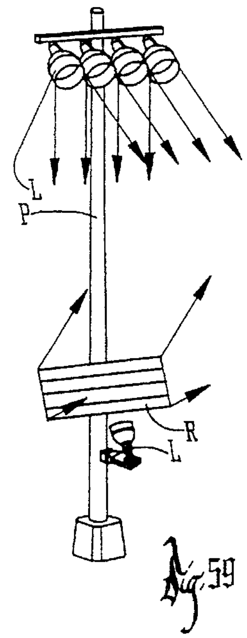
FIGS. 59, 60, 61 are perspective views of alternative lighting combinations whereby down lighting is achieved by light fixtures at or near the top of a light pole, and up lighting is achieved by a lighting combination or lighting fixture near the bottom of the pole.
Figure 60:
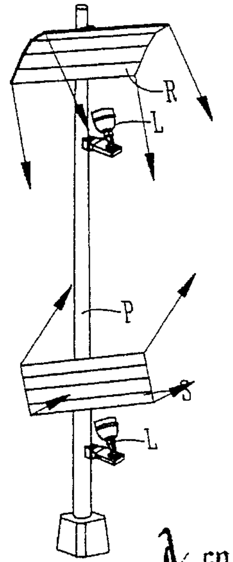
Figure 61:
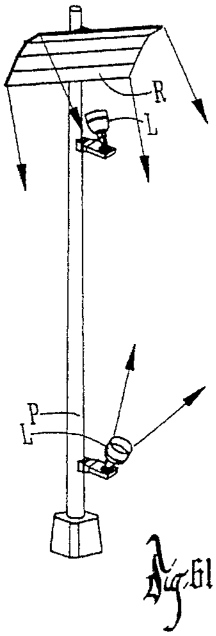

FIGS. 59–61 illustrate another concept. In some applications it is desirable to project light up into the air. A light source L and secondary reflector R combination L and R, could be placed nearer the bottom of pole P, such as in FIGS. 59 and 60, and project a highly controllable pattern of light into the air to compliment the down light created by conventional light fixture L at the top of pole P in FIG. 59, or the combination of L and R at the top of P in FIG. 60. As a still further alternative, the conventional light could simply be angled upwardly in orientation near the bottom of P as in FIG. 61. The combination of L and R, or just conventional light fixtures, could provide down light.

The FIGS. 59–61 show only with approximation the relative direction of light patterns from each of the fixtures whether conventional or utilizing light source L and a secondary reflector R. Depending on the shape, configuration and orientation of secondary reflector R, that light can be highly controlled and in a fine beam pattern.

4. Double-mirror

Figure 62:
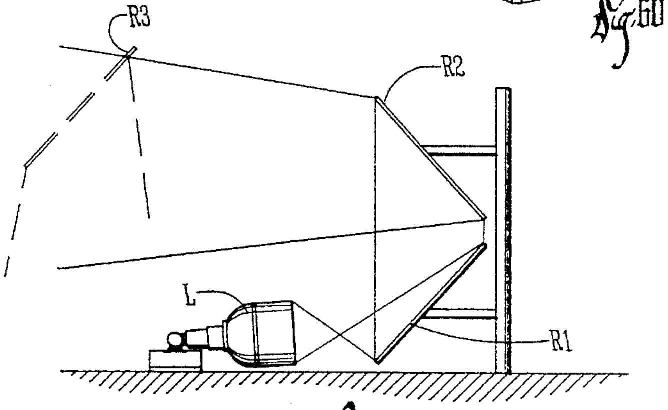
FIGS. 62 and 63 illustrate additional embodiments of the present invention utilizing one light source projecting light energy onto a first secondary reflector which in turn projects light onto a second secondary reflector.
Figure 63:
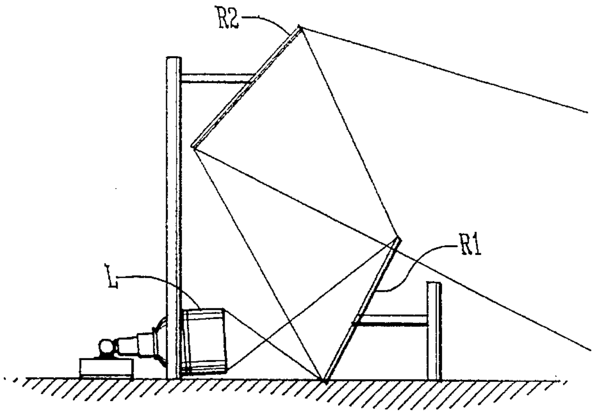

FIGS. 62 and 63 show a still further feature or embodiment according to the present invention. Light from a light source L could be directed to a first secondary R1. At least a portion of the light reflected from R1 could be directed to a second secondary R2. This would allow further flexibility and control of light. In the example of FIG. 62, light could be directed generally opposite to the direction it issues from L. In the example of FIG. 63, however, light could be directed in substantially the same direction as originally issued from L.

FIG. 62 illustrates in ghost lines that more than the first and second secondary reflector R1 and R2 can be used. A third or even more secondary reflectors could also be utilized advantageously if desired. The utilization of multiple secondary reflectors can function somewhat like a periscope. It can be used to condense and consolidate light for beneficial purposes.

5. Inside/Outside Lighting

Figure 66:
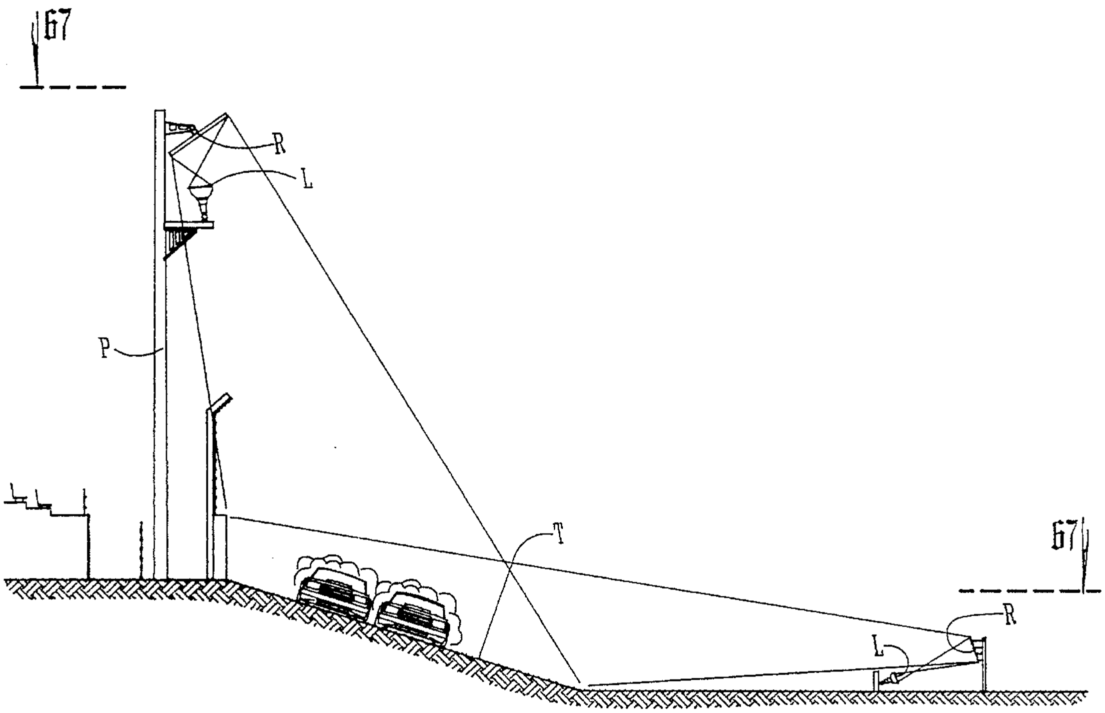
FIG. 66 is a perspective view according to the present invention utilizing lighting components according to the present invention on both the inside and outside of a track or roadway.
Figure 67:
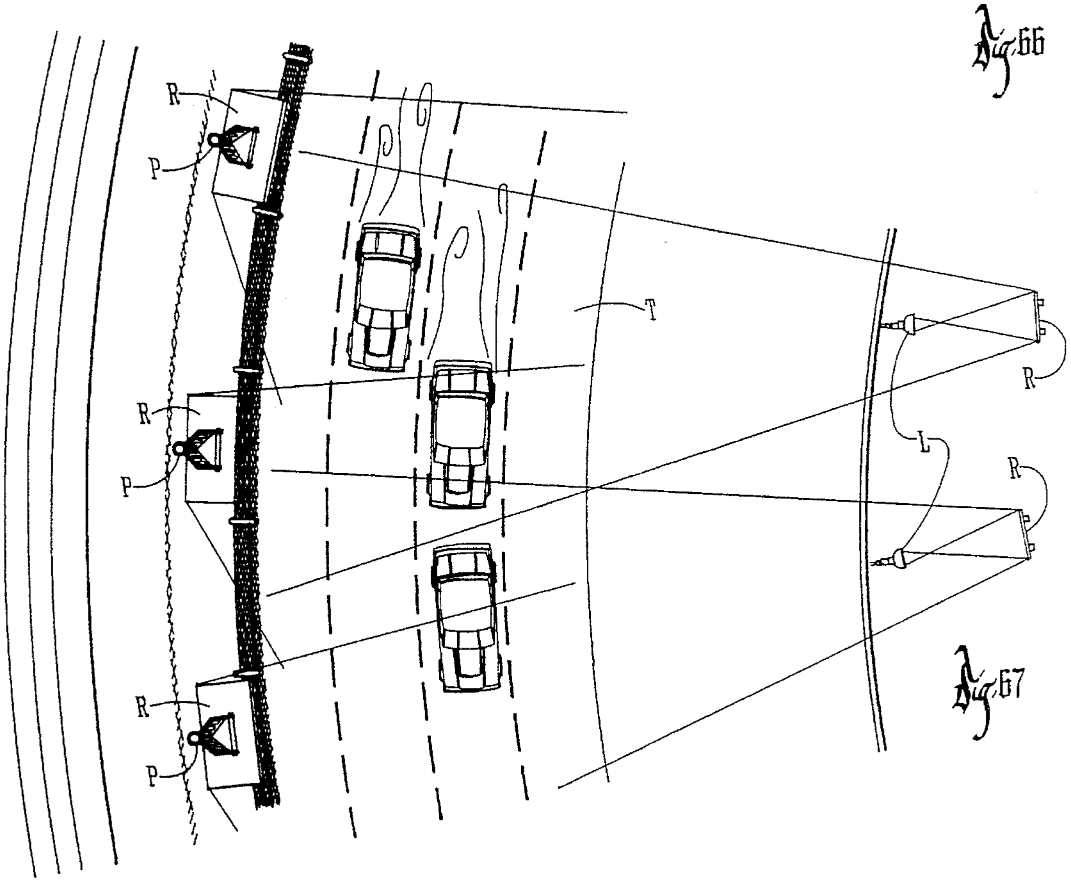
FIG. 67 is a top plan view of FIG. 66.
Figure 68:
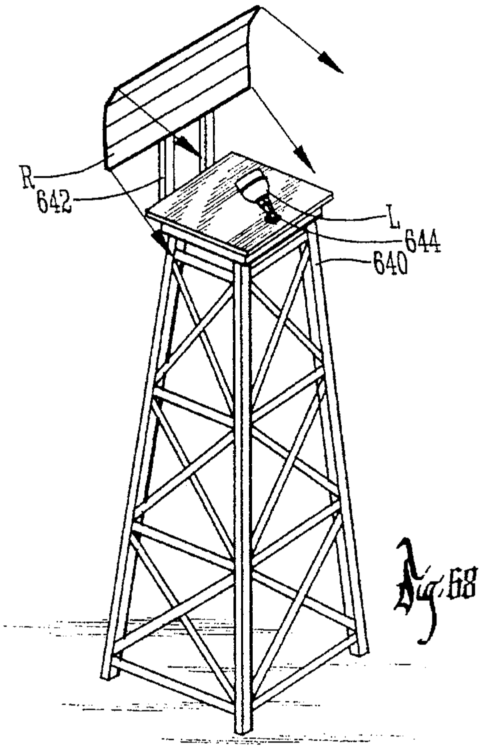
FIG. 68 is a diagrammatical side elevational depiction of a semi-permanent or portable construction site tower utilizing lighting components according to the present invention.

FIGS. 66 and 67 illustrate the utilization of Ls and Rs on the inside, or at least on one side, of a roadway or a race track T. In this instance, these combinations on the inside of track T are on the ground. They would provide light to track T from inside out. Additionally, combinations of L and R could be positioned on the opposite side of track T. In this instance, they are elevated on pole P and can provide light from outside in. This could be advantageous to eliminate shadows and to provide the best possible lighting for television use.

6. Construction Lighting

As can be appreciated, by placing a light source L and secondary reflector R on top of a portable or semi-permanent scaffold or tower 640, lighting of such things as construction sites can be effectively, efficiently and economically accomplished. A manipulative or adjustable arm 642 could be used to position reflector R relative to light source L (which also could be placed on a manipulative arm or mount 644).

7. Special Effects Lighting

Figure 69:
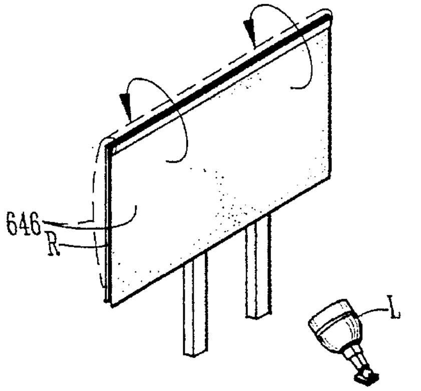
FIG. 69 is a perspective diagrammatical depiction of the primary light source and a secondary reflector according to the present invention but including a cover which can be moved to block the surface of the secondary reflector to allow on-off of the beam issuing from the combined fixture.
Figure 70:
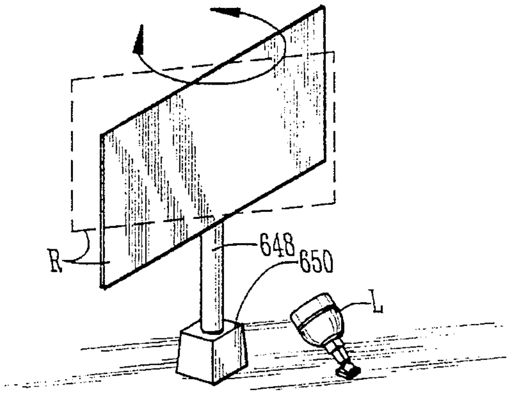
FIG. 70 is a perspective diagrammatical view similar to FIG. 69 but showing a secondary reflector which can be rotated or osculated to provide highly controlled but movable lighting.
Figure 71:
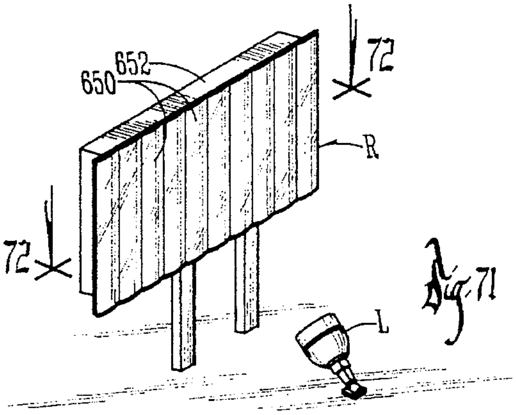
FIG. 71 shows in perspective a primary light source and secondary reflector where the secondary reflector is made up of individually adjustable segments and the whole secondary reflector is adjustable as to shape or configuration.

As shown in FIGS. 69 and 70, a light source L could be utilized either with a secondary reflector R which has a cover 646 that hingeably can cover or uncover the reflective surface of reflector R for an on-off effect (FIG. 69) or a secondary reflector R that is attached to a pole 648 which in turn is attached to either a manually turnable or mechanically operated rotational device 650 which allows secondary mirror R to rotate or osculate for special lighting effects including on-off, or some sort of scanning, or just to allow some quick adjustment of the beam pattern from the combination, 8. Adjustable and Flexible Lighting FIGS. 71–75 illustrate a further aspect according to the invention. As shown in FIG. 71, a light source L as previously described could be used with a secondary reflector R that is comprised of a plurality or a set of secondary mirror segments 650 aligned side by side along secondary reflector R. A housing 652 supports each of the individual mirror segments 650.

Figure 72:
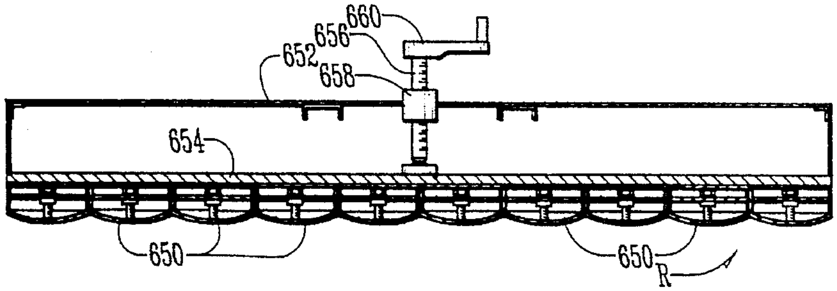
FIG. 72 is a sectional view taken along line 72—72 of FIG. 71, showing further the individual segments of the secondary reflector and showing the entire set of individual components aligned along basically a plane.
Figure 73:
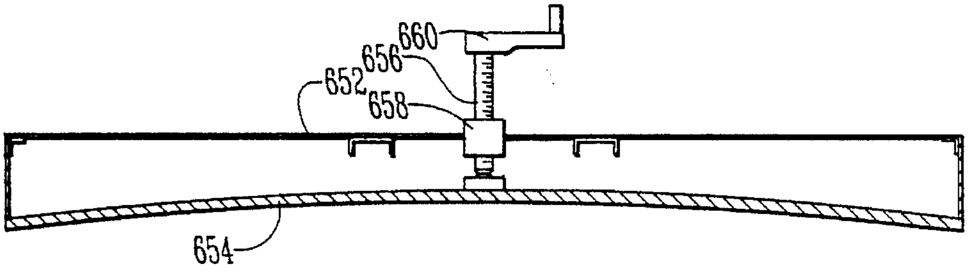
FIG. 73 is similar to 72 but showing adjustment of the secondary reflectors so that the set of segments are aligned along a concave axis.
Figure 74:
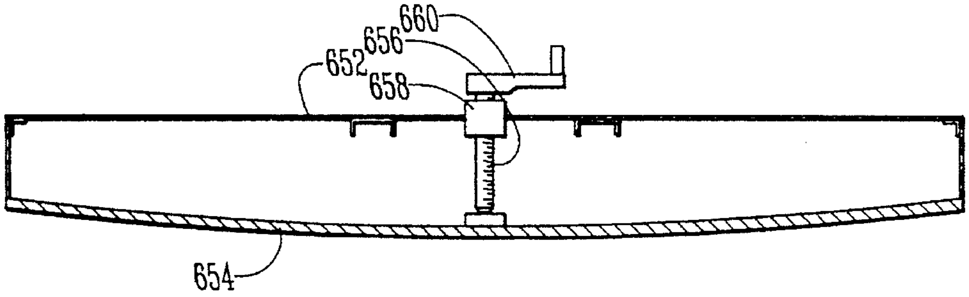
FIG. 74 is similar to FIG. 73 but showing the segments aligned along a convex axis.

As shown in FIGS. 72–74, the housing 652 is rigid but has a portion 654 which is flexible. A threaded rod 656, for example, could be pivotably or rotationally attached to flexible portion 654 and pass through a threaded aperture 658 in housing 652. By turning handle 660 rigidly attached to threaded rod 656, the middle of flexible portion 654 (to which are attached each of the individual mirror segments 650) could be drawn inwardly (see FIG. 73) to create a concave shape for the set of mirror segment 650, or pushed out (FIG. 74) to provide an over all convex shape for the set of segments 650. This of course is but one way in which the collection of segments 650 could be adjusted between a more convex or more concave overall shape compared to the more or less plainer configuration of FIG. 72. This would allow the secondary mirror R to have immediate adjustment for horizontal beam width. The concave shape of FIG. 73 would narrow the beam, the convex shape would widen the beam.

Figure 75:
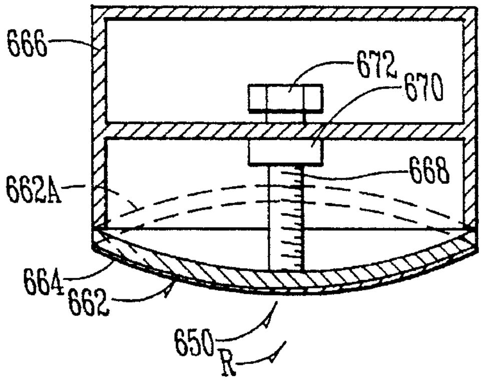
FIG. 75 is an enlarged isolated view of one of the segments of the secondary reflector of FIG. 71 and 72 but showing how each segment can be adjusted from a basically plainer shape to either a convex or concave shape along its length.

FIG. 75, on the other hand shows that each mirror segment 650 would have a specular or mirror portion 662 mounted on a flexible backing 664 which in turn is connected at its sides to a housing 666. Housing 666 is what is attached to flexible part 654 shown in FIG. 72. Again a threaded rod 668 could be rotatably attached to backing 664, pass through a threaded aperture 670 in housing 666 and have a handle 672 which can be turned to either push the center of each mirror segment 650 outwardly or inwardly (as shown by ghost lines 662A and 662B respectively in FIG. 75). By using such a method, the shape of each segment could be changed along its vertical axis to change the beam width. Alternatively, this method could be used along each mirror segment 650 or with respect to the entire set of mirror 650 to change the shape of those respective portions with respect to a horizontal plane through secondary reflector R to in turn widen or narrow the beam pattern vertically.

This arrangement therefore shows that each secondary reflector R could be adjustable on site to produce a variety of beam patterns and fine tune the beam shape and configuration. Many other methods could be used to produce such adjustability of each reflector or a portion of a secondary reflector R. For example, a planar sheet of reflective material could comprise the entire secondary reflector R and mechanisms could be used to allow the shape of that planar mirror to be changed.

These are simply examples of various combinations that than be used according to the principles of the present invention. These examples are by no means comprehensive or inclusive of all different configurations possible. It can be seen that each of the embodiments or aspects of the invention discussed above utilizes the concept of a primary light source in combination with at least one secondary reflector. These combinations can take a variety of different forms and embodiments. All of these forms and embodiments, however, advantageously utilize the combination of light source and secondary reflector to achieve a highly controllable use of light. As explained above, beam patterns can be generated with such systems with defined common distinct cutoff and direction. For example, cutoff can be as precise as dropping from full intensity to less than one percent of intensity within less than six inches. Alternatively, a decrease from full intensity to less than one percent could be made along a smooth continuum. Variations in between these two examples or customized variations different from these examples can be made all by choice by utilizing a combination of a primary light source and secondary reflector.

a. Airplane Lighting

In reference to the drawings, the problem in the prior art is shown in FIG. 776. As can be seen, a scaffolding 710 is positioned below an airplane wing 712. The wing 712 can be up to thirty feet or more above the floor. Conventionally lights 728 are placed many tens of feet up and above the ground and many tens of feet out in front of the airplane to attempt to light the underside of the airplane. For example, a conventional situation would have lights 728 on the order of 60 feet up in the air and 75 feet out in front of plane 730.

Figure 76:
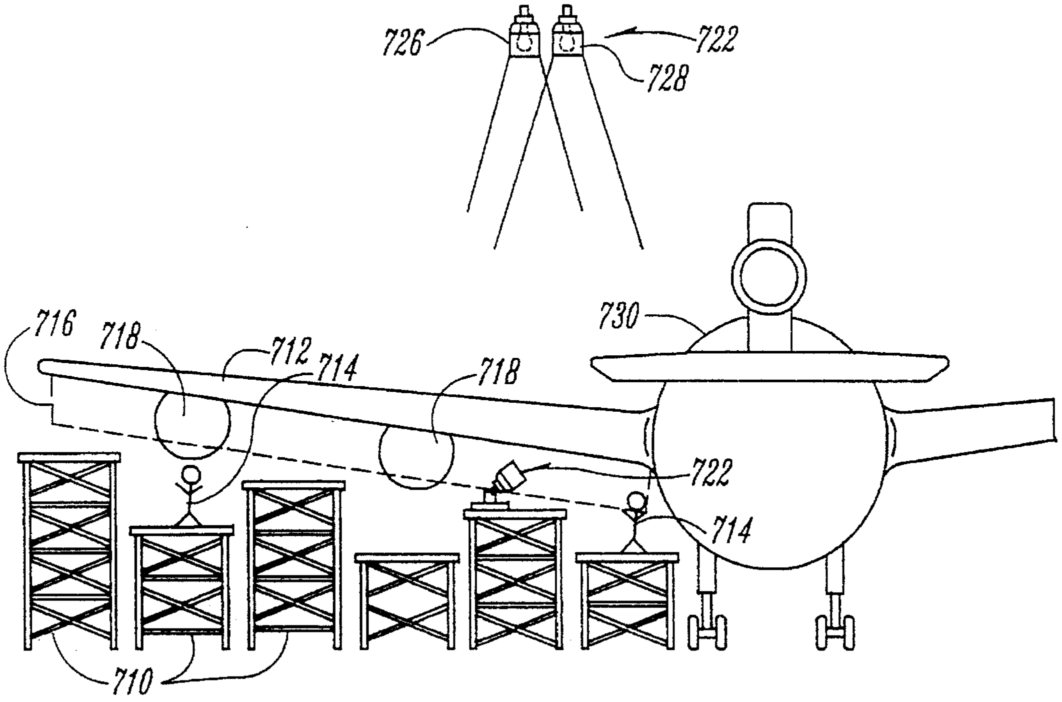
FIG. 76 is a partial front elevational view of a conventional arrangement for painting an airplane wing.

While painters 714 work on the underside of the airplane wing 712, portions of the airplane wing 712 many times may be draped with a masking material 716 to prevent paint from escaping the work area or running or splashing onto, for example, leading or trailing wing edges. As shown in FIG. 76, this draped material 716 further cuts off the area underneath the wing from light projected from lights 728 or light existing in the hanger. It may leave only a few feet between the top of the scaffold and the bottom of masking material 716 for light to pass.

A wing engine 718 may become an additional obstruction for the painter 714 underneath the wing 712. Engines 718 can hang up to seven feet or more below wing 712. As previously mentioned this makes construction of scaffolding difficult (it may present several different elevations of scaffolding which presents a worker's safety issue or at least makes it more burdensome to move from location to location along scaffolding 710). It also makes it cumbersome for placement and maneuvering of any lighting equipment if such were placed on the scaffold 710. Lighting equipment sufficient to light the underside of such big wings would normally be cumbersome as far as size and weight, making it difficult to move such lighting from place to place on the scaffolding.

It is to be appreciated, however, that any light or lighting apparatus placed underneath the masking material 716 would expose the painter 714 to the potential of explosion. It is therefore not normally desired to have electrical apparatus such as high intensity lights underneath the plane wing while painting. Even the electrical cords that would provide electrical power to such lights could present a risk. Lighting units that are supposedly explosion proof are expensive and cumbersome to move around scaffolding. Therefore, the area underneath the wing 712, or the work area, is poorly illuminated as a result of the various obstructions and safety concerns.

Figure 77:
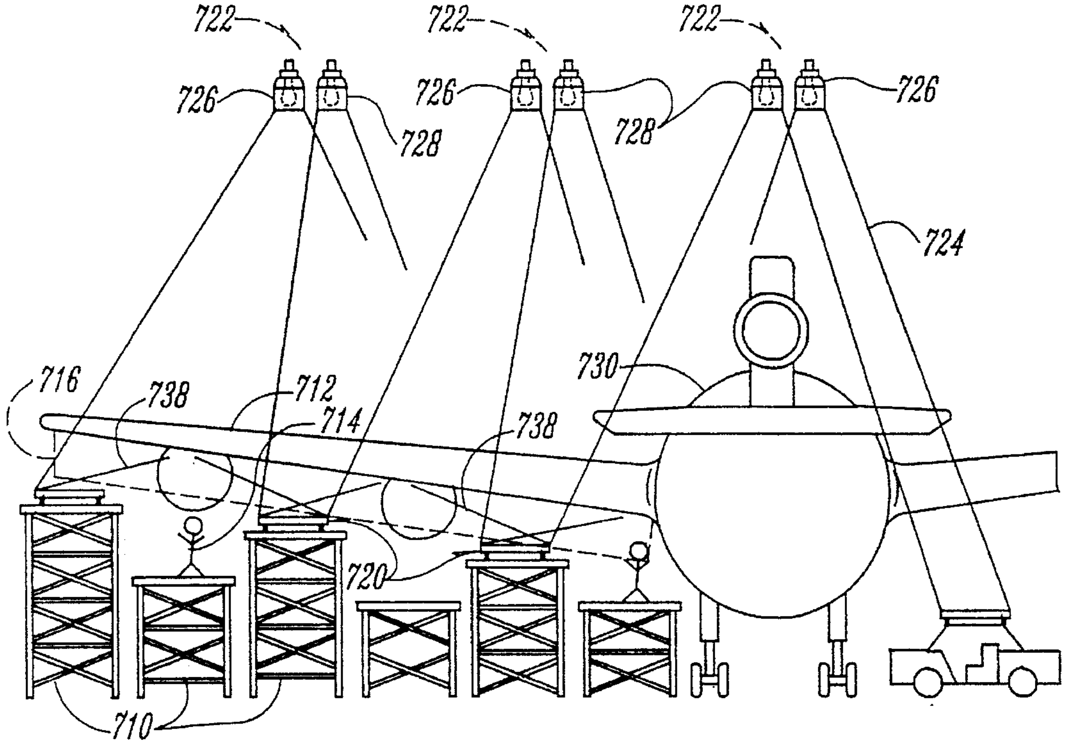
FIG. 77 is a front elevational view similar to FIG. 76 sharing a preferred embodiment according to the invention.
Figure 78:
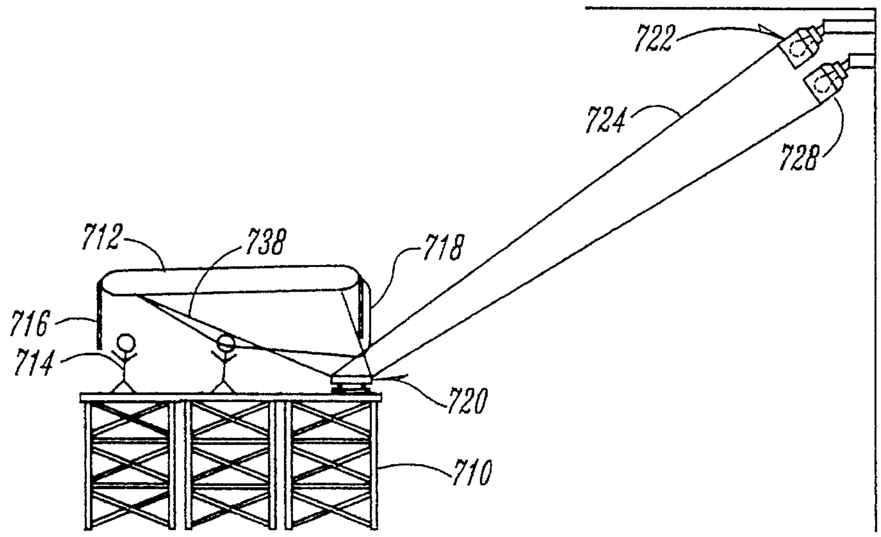
FIG. 78 is a side elevational view of the arrangement of FIG. 77.

FIGS. 77 and 78 demonstrate a preferred embodiment of the means and method for illuminating an airplane wing in accordance with the invention. The means and method consists of what are called secondary reflectors 720 positioned in such a manner that the light source has primary reflectors 726 which project the light from light source 722 in a beam 724 onto the secondary reflectors 720, which in turn reflect the light 724 onto the underside of the airplane wing 712. By positioning the light source 722 at a safe distance outside of the masking material 716, and positioning secondary reflectors 20 on the scaffolding 710, a painter 714 can paint the underside of an airplane wing 712 without the danger that explosive paint will come in contact with the light source 722. Additionally, secondary reflectors 720 in this embodiment are comprised of a lightweight reflecting surface 732 (see FIG. 82 for example) mounted on a lightweight base 734 (for example an aluminum framework preferably with a nonstatic substance to eliminate static electricity). Secondary reflectors 720 therefore can be easily slid around each section of scaffolding and easily raised or lowered to another section of scaffolding.

Reflecting surface 732 is preferred to be substantially diffuse to reduce glare and to provide a smooth light to the underside of the wing 712.

In the preferred embodiment, reflecting surface 732 can simply consist of a several feet by several feet sheet of material having a characteristic of diffuse reflection. It can be quickly and easily attachable or detachable from base 734 for either cleaning or replacement. It is to be understood that in the example of painting the wings, over spray, splashing, or other things can occur to hinder optimal operation of reflecting surface 732. There are instances where it is not possible to completely remove substances or clean surface 732. By making each surface of an economical material easily removable from base 734, substitution of reflecting surfaces 732 can be easily and economically accomplished in a safe and efficient manner.

As shown better in FIG. 78, a secondary reflector 720 can be quickly and easily positioned by a painter 714 to be in light beam 724 from light sources 722. This is true even though there is not much room between the bottom of masking material 716 and the top of scaffolding 710. By virtue of the fact that light sources 722 are quite a distance away at a height elevated above airplane wing 712, using well known physics principles regarding reflection of light, secondary reflector 720 can convert light beam 724 into a nice smooth diffuse reflected pattern 738 onto the bottom of wing 712.

All painters 714 have to do is essentially push base 734 around on skids 736 (see FIG. 82 for example) to position the reflected pattern 738 to their liking. As shown in FIG. 77, the plurality of secondary reflectors 720 can be positioned along the entire scaffold 710 or only one can be used depending on needs and desires. Different secondary reflectors 720 can have different size, configurations, and reflecting properties.

FIGS. 79–85 illustrate examples of some of the different configurations for the light source and/or secondary reflector or reflectors 720.

Figure 79:
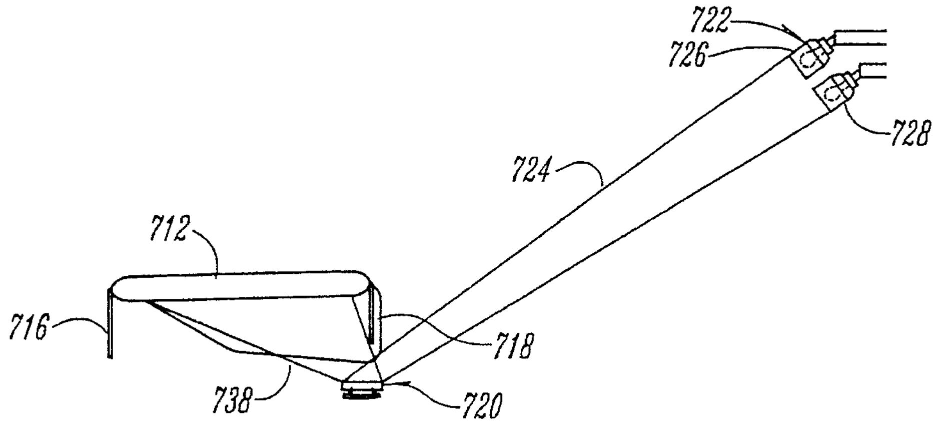
FIG. 79 is a simplified diagrammatic elevational view of a lighting system according to the invention.
Figure 80:
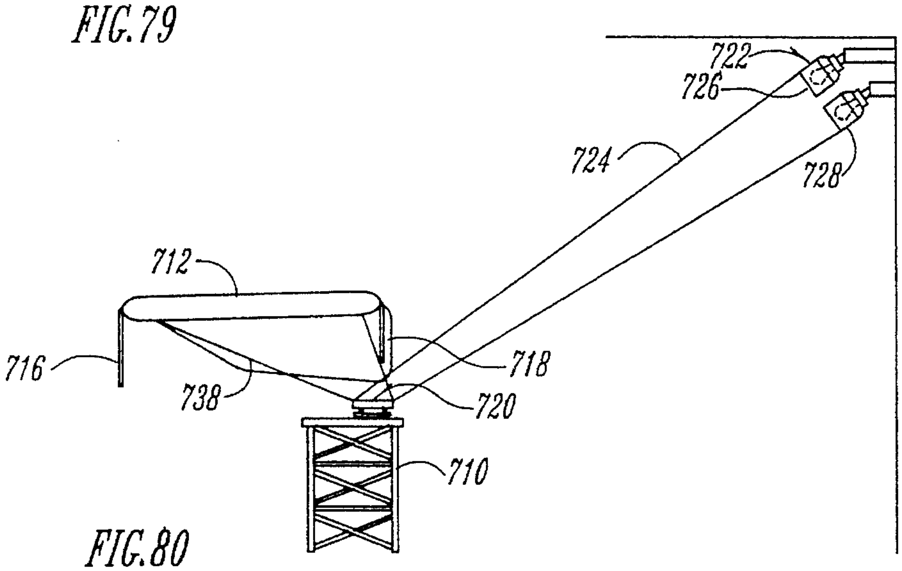
FIG. 80 is a simplified side elevational view of a lighting system according to the invention.

FIG. 79 is an isolated elevational view showing a wing 712, a light source 722, and a secondary reflector 720. Light 724 travels from light source 722, to reflector 720, and on to the wing 712. FIG. 80 incorporates the positioning of scaffolding 710 and masking material 716 over the wing 712 to demonstrate that a light source 722 can be positioned in almost any manner so long as the light source 722 remains at a safe distance from the painting area.

Figure 81:
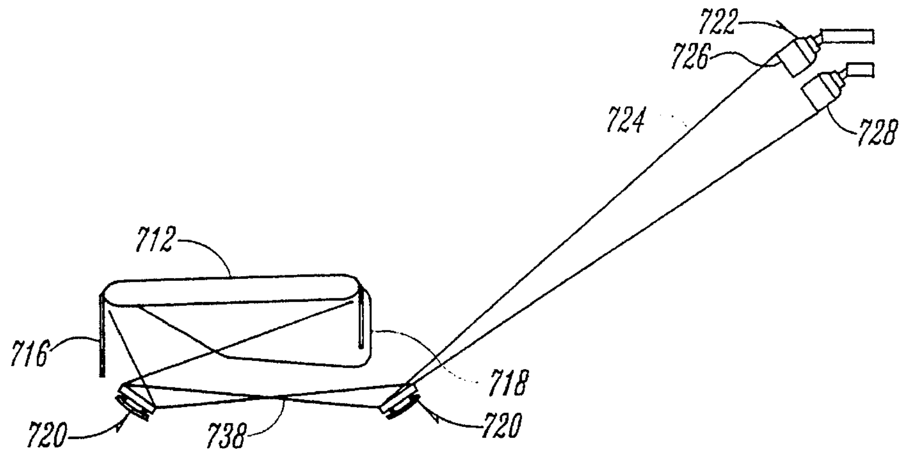
FIG. 81 is an additional simplified isolated side elevational view of an alternative embodiment according to the invention.
Figure 82:
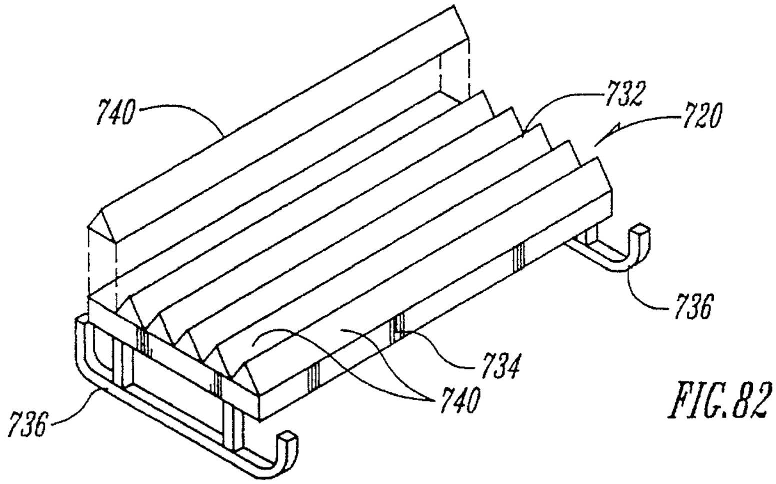
FIG. 82 is an isolated enlarged view of one embodiment of a secondary reflector according to the present invention.

An alternative embodiment demonstrates that multiple secondary reflectors 720 may be used. FIG. 81 shows a light source 722 and multiple secondary reflectors 720 reflecting light 724 onto the underside of the wing 712. Any number of secondary reflectors 720 or light sources 722 can be utilized, as long as the objectives of the invention are satisfied. Additional discussion of light sources, primary reflectors, secondary reflectors, and combinations thereof can be found in previous description and drawings. FIG. 82 illustrates a secondary reflector 720 on a base 734 with skids 736. In this embodiment, reflecting surface 732 is comprised of a collection of V-shaped panels 740 which can be removably connected to base 734 by means well within the skill of one of those of ordinary skill of the art. As shown in FIG. 82 in ghost lines, each panel 740 would be removable for replacement or maintenance. By utilizing such a reflecting surface 732 (a king of corrugated suriace), a diffuse reflected pattern can be created. To make such a pattern further diffuse, the actual reflecting surface can be diffuse such as by avoiding highly specular surfaces in favor of for example what is called a hammer tone finish.

Figure 83:
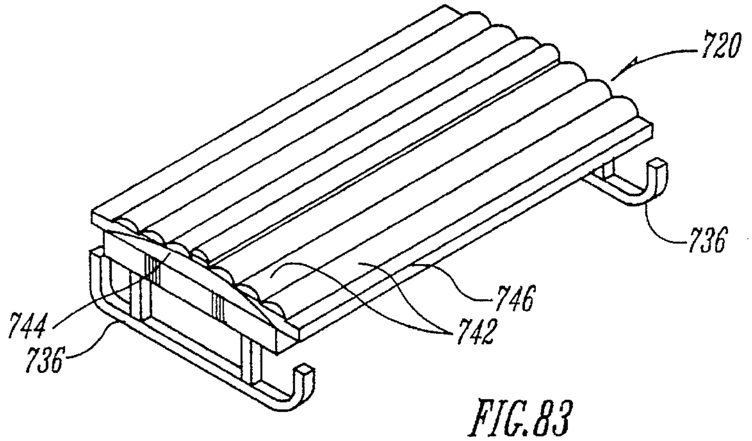
FIG. 83 is an isolated and enlarged perspective view of another embodiment for a secondary reflector.
Figure 84:
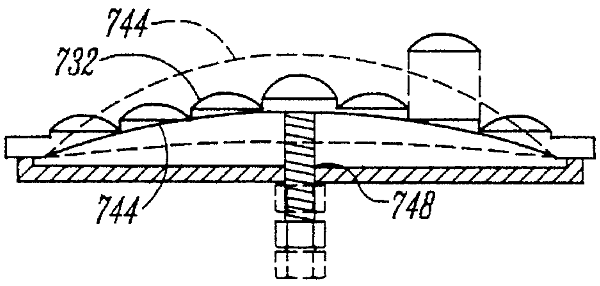
FIG. 84 is a still further enlarged and isolated perspective view of another embodiment for a secondary reflector.

FIGS. 83 and 84 illustrate a further embodiment for a secondary reflector 720. In this example, individual panels are aligned along a flexible backing 744 (see FIG. 84) and removably attached there by means well within the skill of those of ordinary skill in the art. FIG. 84 shows in ghost lines that each panel 742 can be individually removable for replacement or maintenance. A housing or frame 746 (shown generally) completes the structure of this embodiment of secondary reflector 720.

As shown in FIG. 84, a camming screw or threaded rod 748 could be used to push or pull the middle of reflector 720 inwards or outwards to change the general curvature of reflecting surface 732. Therefore, the beam spread of reflected pattern could be adjusted for each secondary reflector 720.

In particular, FIG. 84 shows construction to provide a diffuse beam. Variations in the convex shape of various of the panels 742 can work to provide such a diffuse reflected pattern. By using flat panels 742 at the edges, precise control cutoff of the reflected pattern can be maintained.

Figure 85:
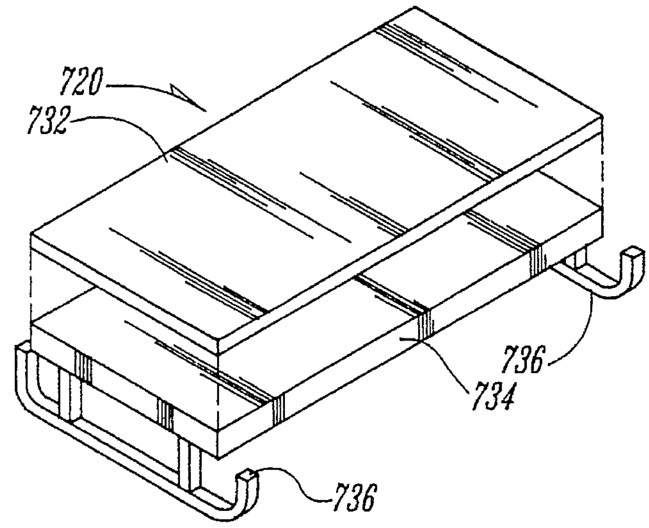
FIG. 85 is a partial perspective, partial diagrammatic view of an embodiment of a light source and secondary reflector positioned with respect to an airplane wing.

FIG. 85 illustrates a basically planar reflecting surface 732 that is removably fittable into a base 734 on skids 736. As previously discussed, it is most times preferred that reflecting surface 732 be such that it issues a diffuse reflected pattern. However, some instances may require more specular reflecting properties. It is to be noted that while skids 736 are an effective and economical method of supporting base 734 and reflecting surface 732, other options are possible such as wheels, rollers, and the like. It is also possible to mount a base 734 to a fixed holder that will allow adjustment of orientation of reflecting surface 732, if desired.

Figure 86:
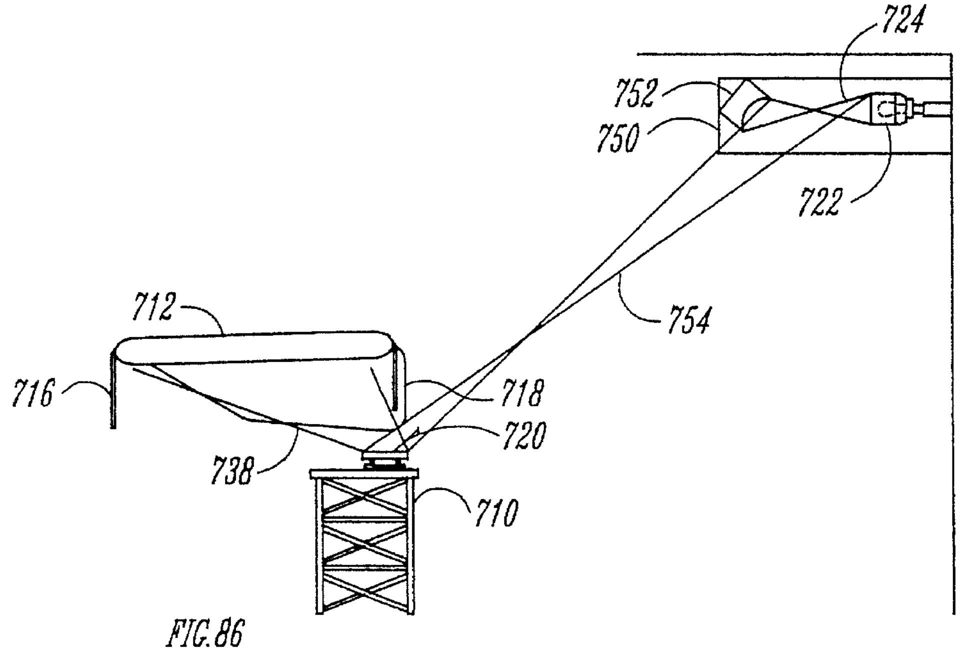

FIG. 86 illustrates a still further embodiment according to the present invention. A housing 750 surrounds two light sources 722 such as have previously been described (including a lamp and reflector). In housing 750 is contained a reflector 752 consisting of a reflecting surface of the defined shape. Reflector 752 reflects at least a portion of light 724 from light sources 722 in a highly controlled defined pattern 754 to secondary reflector 720, which in turn reflects a reflected pattern 738 in a controlled defined manner to the underside of wing 712, in this example.

It is to be appreciated that the included preferred embodiments are given by way of example only. The present invention can take many forms and embodiments. The true essence and spirit of this invention is defined in the appended claims, and it is not intended that the embodiment of the invention presented herein should limit the scope thereof.

What is claimed is:

1. A means for lighting an underside of an airplane comprising:

a light source positioned at a substantial distance from said airplane, said light source having a primary reflector positioned adjacent thereto; and a secondary reflector positioned to receive at least a portion of light from said light source and oriented to reflect at least a portion of said light from said light source onto said underside of said airplane.

2. The means of claim 1 wherein said light source is elevated relative to the secondary reflector.

3. The means of claim 1 wherein a single light source is used in combination with a single secondary reflector.

4. Means of claim 1 wherein the secondary reflector comprises a base, a reflecting surface, and mounting components to detachably mount the reflecting surface to the base.

5. The means of claim 4 wherein the base further comprises positioning components to allow the base to be moved across the surface.

6. The means of claim 5 wherein the positioning components consist of skids attached to the base.

7. The means of claim 5 wherein the positioning components comprise wheels.

8. The means of claim 4 wherein the reflecting surface consists of a surface which issues a defuse light pattern.

9. The device of claim 4 wherein the reflecting surface consists of a plurality of side-by-side elongated segments.

10. The means of claim 9 wherein each segment is V-shaped.

11. The means of claim 9 wherein several of the sections have a convex shaped surface.

12. A means for lighting an underside of an airplane comprising:

a light source positioned at a substantial distance from said airplane, said light source having a primary reflector positioned adjacent thereto; and a first secondary reflector; and a second secondary reflector, said first secondary reflector positioned to receive at least a portion of light from said light source and reflect at least a portion of light onto said second secondary reflector, said second secondary reflector positioned to receive at least a portion of light from said first secondary reflector and reflect at least a portion of light onto said underside of said airplane.

13. A method of lighting the underside of an airplane comprising:

directing a relatively controlled light source at a substantial distance from an airplane wing towards the plane;

positioning and orienting a secondary reflector so that at least a portion of light from the light source is reflected from the secondary reflector to at least a portion of the underside of the airplane.

14. A method of claim 13 further comprising the step of configuring the secondary reflector to reflect light in a direction away from pilots and workmen.

15. A method of claim 13 further comprising the step of placing the secondary reflector means on a scaffold underneath the airplane.

16. The method of claim 13 comprising placing a plurality of light sources a substantial distance from an airplane and utilizing a plurality of secondary reflectors positioned nearer the airplane.

17. The method of claim 13 wherein the secondary reflector issues a diffuse beam.

18. The method of claim 13 wherein the secondary reflector consists of a plurality of elongated side-by-side segments.

19. The method of claim 17 wherein segments have a reflecting surface configured so that compositely a diffused beam pattern is issued with the perimeter of the beam pattern being sharply controlled and defined.

20. A method of lighting the underside of an airplane comprising:

placing a light source a substantial distance away from and above an airplane, the light source directing a relatively controlled light beam towards the underside of the plane;

reflecting the light beam from the light source at a location near the underside of the plane in a controlled and defined reflected pattern.

* * * * *